(12) United States Patent
Yoshikawa

(10) Patent No.: US 8,827,482 B2
(45) Date of Patent: Sep. 9, 2014

(54) LIGHTING DEVICE, DISPLAY DEVICE AND TELEVISION RECEIVER

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 297 days.

(21) Appl. No.: 13/386,565

(22) PCT Filed: Jun. 15, 2010

(86) PCT No.: PCT/JP2010/060087
§ 371 (c)(1),
(2), (4) Date: Jan. 23, 2012

(87) PCT Pub. No.: WO2011/013454
PCT Pub. Date: Feb. 3, 2011

(65) Prior Publication Data
US 2012/0120324 A1    May 17, 2012

(30) Foreign Application Priority Data
Jul. 29, 2009  (JP) ................................ 2009-176926

(51) Int. Cl.
*G09F 13/08*     (2006.01)
*G02F 1/1335*   (2006.01)
(52) U.S. Cl.
CPC .... *G02F 1/133603* (2013.01); *G02F 1/133608* (2013.01)
USPC ................... 362/97.4; 362/97.2; 362/249.01; 362/382
(58) Field of Classification Search
USPC ............ 362/97.1, 97.2, 97.4, 249.01, 249.07, 362/249.1, 382, 418, 427; 348/739
See application file for complete search history.

(56) References Cited

U.S. PATENT DOCUMENTS

| 7,658,534 B2 * | 2/2010 | Azuma et al. ................. 362/634 |
| 2009/0046445 A1 | 2/2009 | Namiki et al. |
| 2009/0154139 A1 | 6/2009 | Shin |

FOREIGN PATENT DOCUMENTS

| JP | 52-97377 U | 7/1977 |
| JP | 8-93734 A | 4/1996 |
| JP | 2007-180006 A | 7/2007 |
| JP | 2007-317423 A | 12/2007 |
| JP | 2008-198398 A | 8/2008 |

OTHER PUBLICATIONS

Official Communication issued in International Patent Application No. PCT/JP2010/060087, mailed on Jul. 13, 2010.

* cited by examiner

*Primary Examiner* — Meghan Dunwiddie
(74) *Attorney, Agent, or Firm* — Keating & Bennett, LLP

(57) ABSTRACT

A backlight unit 12 according to the present invention includes LEDs 17 as light sources, an LED board 18 mounting the LEDs 17 thereon, a chassis 14 that stores the LED board 18 therein and includes an attachment hole 14e, a body portion 24 that sandwiches the LED board 18 between the body portion 24 and the chassis 14 and holds the LED board 18, and a board holding member 20 including an attachment portion 25 that is protruded from the body portion 24 toward the chassis 14 to be inserted into the attachment hole 14e, and the board holding member 20 is configured to be rotatable along a plate surface of the chassis 14 between a holding position at which the attachment portion 25 overlaps with an edge of the attachment hole 14e in a plan view and sandwiches the edge of the attachment hole 14e between the attachment portion 25 and the body portion 24 and a non-holding position at which the attachment portion 25 does not overlap with the edge of the attachment hole 14e in a plan view and attaching and detaching of the attachment portion 25 from the attachment hole 14e is allowed.

6 Claims, 87 Drawing Sheets

FIG.1
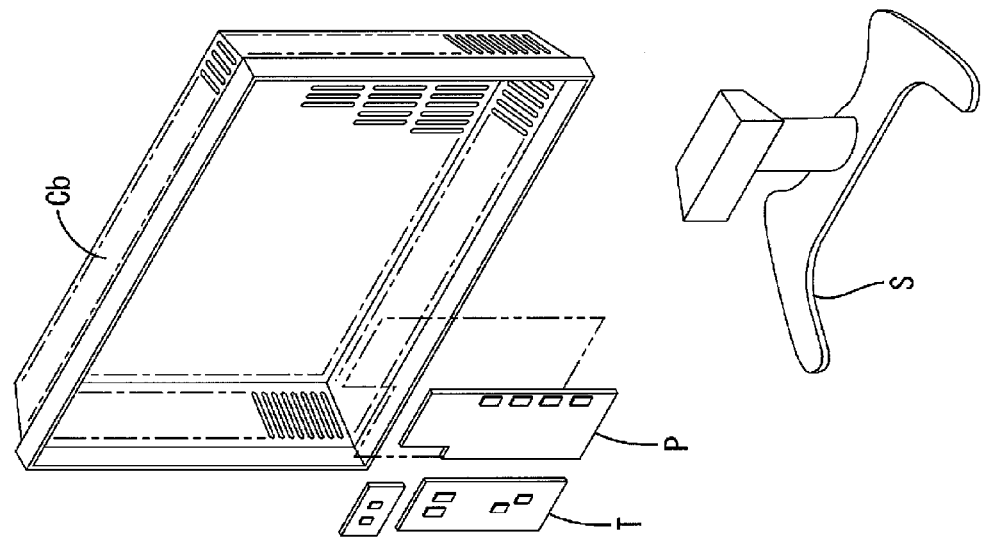
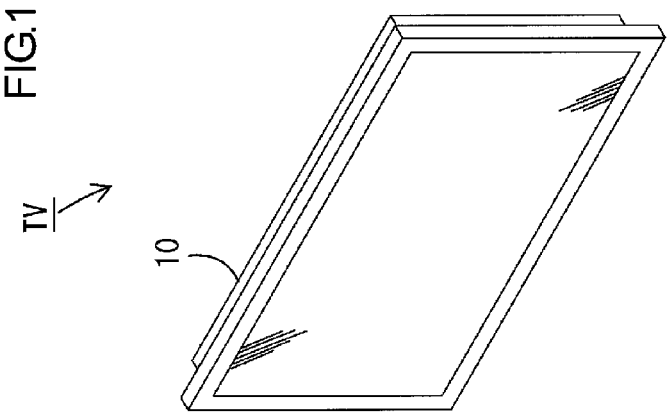
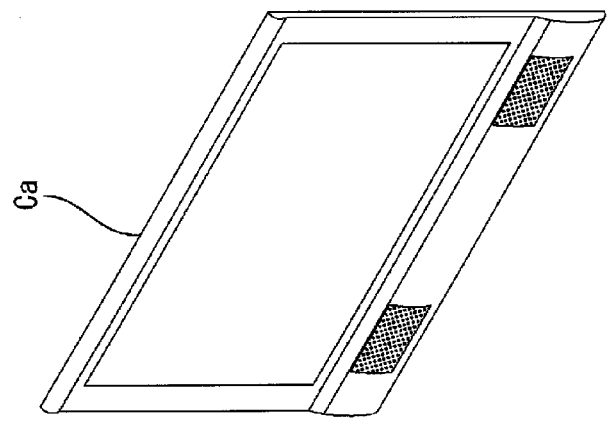

FIG.28
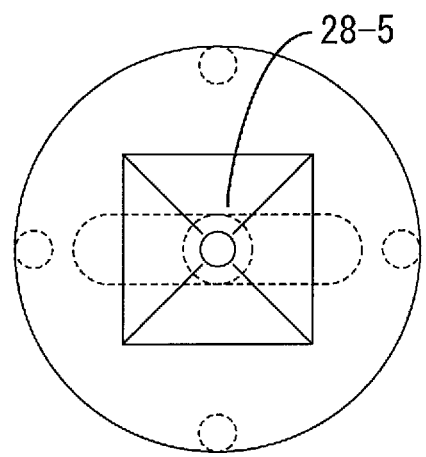
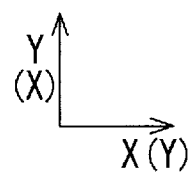

FIG.34
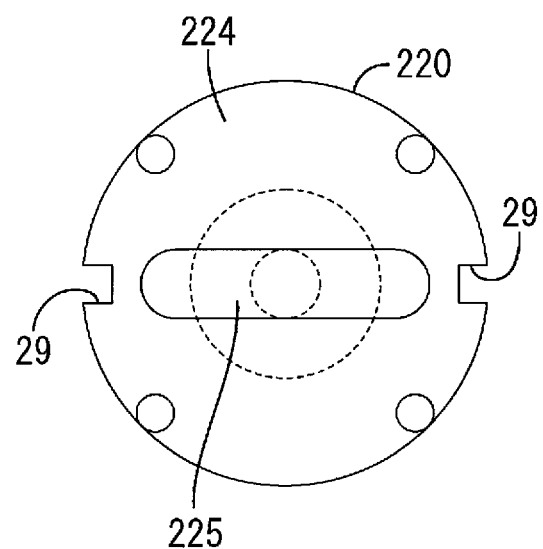
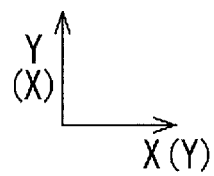

FIG.35
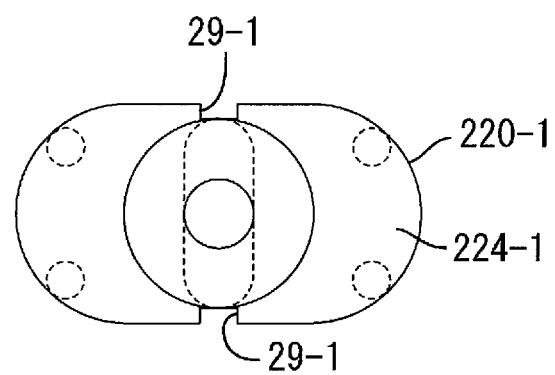
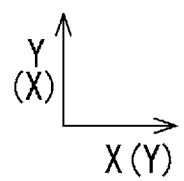

FIG.36
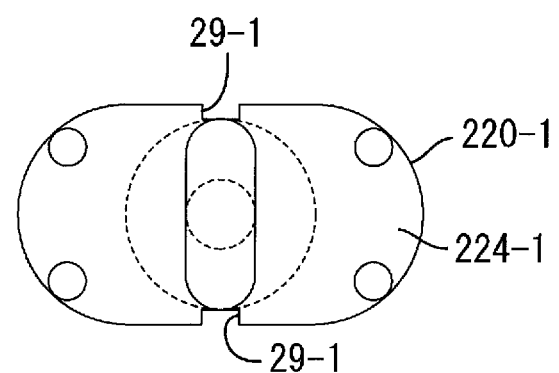
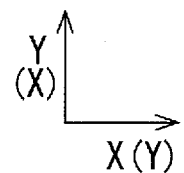

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The backlight unit is installed on a back side of the liquid crystal panel (side opposite to a display surface) and includes a chassis, a surface of which is opened on the side of the liquid crystal panel, a light source stored in the chassis, a reflection sheet that is arranged along an inner surface of the chassis and reflects light on the side of the opening of the chassis, and an optical member (diffuser sheet, etc.) that is arranged on the opening of the chassis and efficiently discharges light emitted from the light source to the liquid crystal panel side. Among the above-mentioned components of the backlight unit, in some cases, an LED for example, is adopted as the light source and in such case, an LED board that mounts the LED thereon is stored in the chassis.

An example of the backlight unit using the LED as the light source is described in Patent Document 1.

PRIOR ART DOCUMENT

Patent Document

Patent Document 1:
Japanese Unexamined Patent Publication No. 2007-317423

Problem to be Solved by the Invention

In fixedly attaching the LED board to the chassis, a screw has been generally used, and in attaching and detaching the LED board to/from the chassis, an operation of attaching and detaching the screw is needed. However, in the case of adopting a fixation method by use of the screw, the workability in the screw attaching and detaching operation itself is poor and a lot of screws are required to stably fix the LED board. As a result, disadvantageously, the number of components and the number of times of screw attaching and detaching operation increase, thereby degrading the workability. Especially, as the number of the LED boards increases with an increase in screen size of a liquid crystal display device, the number of screws used and the number of times of screw attaching and detaching works increase and accordingly, the above-mentioned problem becomes more prominent.

DISCLOSURE OF THE PRESENT INVENTION

The present invention is made based on the above-mentioned circumstances and intends to improve the workability in attaching the LED board to the chassis.

Means for Solving the Problem

A lighting device of the present invention includes a light source, a light source board, a chassis, and a board holding member. The light source is mounted on the light source board. The chassis stores the light source board therein and has an attachment hole. The board holding member includes a body portion and an attachment portion. The body portion holds the light source board such that the light source board is sandwiched between the body portion and the chassis. The attachment portion protrudes from the body portion toward the chassis and arranged inside the attachment hole. The board holding member is configured to be rotatable between a holding position and a non-holding position along a plate surface of the chassis. At the holding position, the attachment portion overlaps an edge of the attachment hole in a plan view and the edge of the attachment hole is sandwiched between the attachment portion and the body portion. At the non-holding position, the attachment portion does not overlap the edge of the attachment hole in a plan view and attaching and detaching of the attachment portion from the attachment hole is allowed.

With this configuration, to attach the light source board to the chassis, in the state where the light source board is stored in the chassis, the attachment portion of the board holding member is inserted into the attachment hole of the chassis, and the board holding member located at the non-holding position is rotated along the plate surface of the chassis. Then, the board holding member reaches the holding position, and the attachment portion overlaps with the edge of the attachment hole in a plan view and sandwiches the edge of the attachment hole between the attachment portion and the body portion, resulting that the board holding member is held to be attached to the chassis. In this state, the light source board is sandwiched between the body portion of the board holding member and the chassis, thereby being held to be attached to the chassis. Conversely, to detach the light source board from the chassis, the board holding member located at the holding position is rotated such that the attachment portion is located at the non-holding position at which the attachment portion does not overlap with the edge of the attachment hole in a plan view. At the non-holding position, since detaching of the attachment portion from the attachment hole is allowed, the board holding member can be detached from the chassis. As a result, since the holding state of the light source board by the board holding member is released, the light source board can be detached from the chassis.

Conventionally, since the light source board is screwed, the workability in the screw attaching and detaching operation itself is poor and therefore, workability tends to degrade. However, according to the present invention, by rotating the board holding member along the plate surface of the chassis between the non-holding position and the holding position, the board holding member can easily hold the light source board and the holding state can easily be released. Thus, the workability in attaching and detaching the light source board is excellent.

Since the board holding member according to the present invention holds the light source board between the board holding member and the chassis, for example, when the light source mounted on the light source board has a failure and replacement or repair of the light source board is required, it is needed to detach each of the board holding member and the light source board from the chassis. On the contrary, in the case of a lamp clip holding a cold-cathode tube, only the detaching operation of the cold-cathode tube is required. As compared to the case of the lamp clip, the frequency of the detaching operation of the board holding member tends to be higher. Furthermore, since the number of light source boards used tends to increase with an increase in the lighting device in size, the number of light source boards used and the number of times of the attaching and detaching operation of the board holding member tend to increase. In consideration of such circumstances, by improving the workability in attaching and detaching the board holding member holding the light source board, the workability in repairing the lighting device as well as the workability in the case of upsizing of the lighting device can be remarkably improved.

BRIEF DESCRIPTION OF THE DRAWINGS

FIG. 1 is an exploded perspective view showing a schematic configuration of a television receiver according to a first embodiment of the present invention;

FIG. 28 is a sectional view showing a supporting portion in a fifth modification example of the first embodiment;

FIG. 34 is a bottom view showing a board holding member according to a first modification example of the second embodiment;

FIG. 35 is a plan view of the board holding member;

FIG. 36 is a bottom view of the board holding member;

BEST MODE FOR CARRYING OUT THE INVENTION

<First Embodiment>

Figure 3:
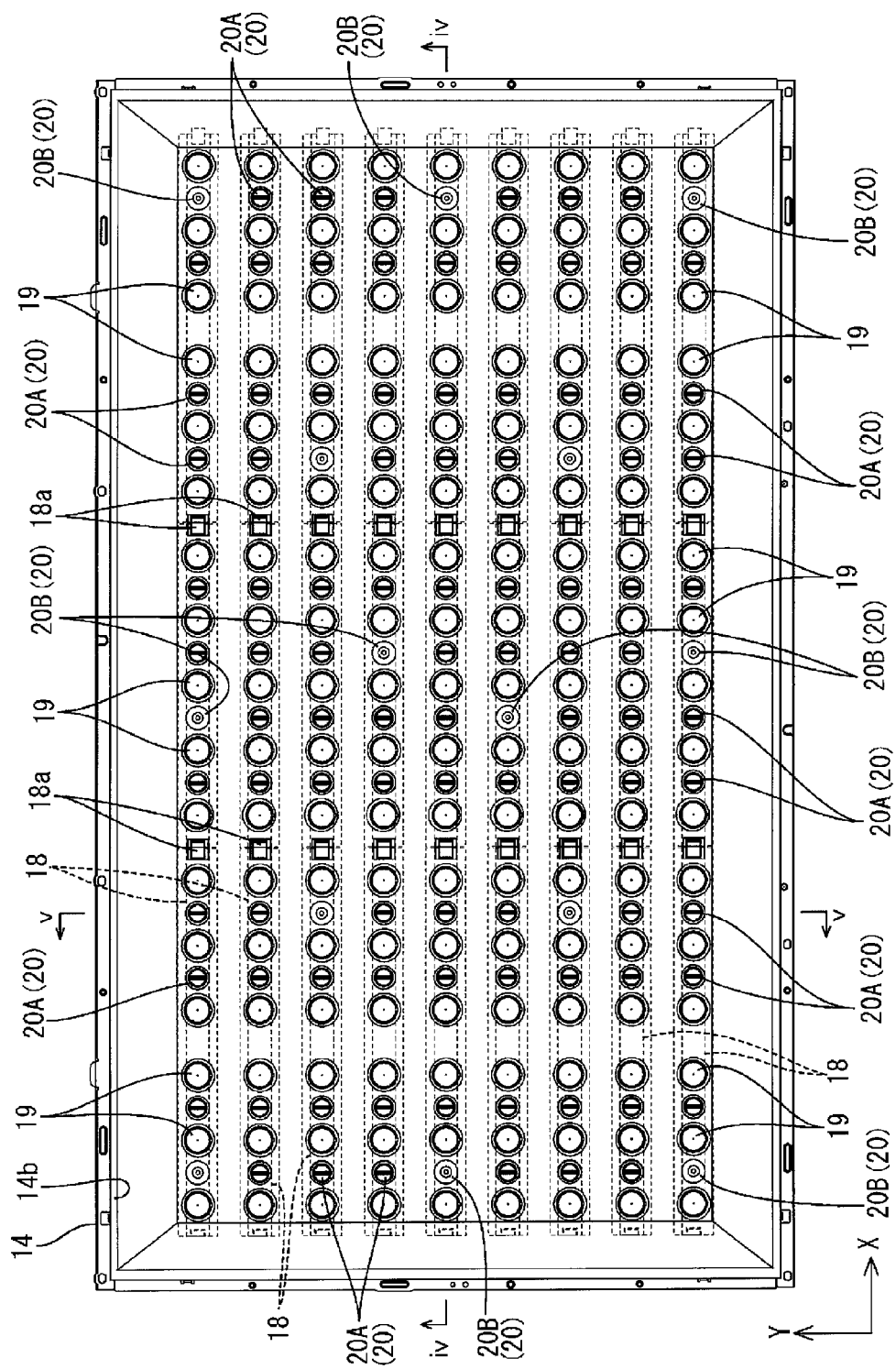
FIG. 3 is a plan view showing an arrangement of LED boards and board holding members in a chassis of the liquid crystal display device.
Figure 4:
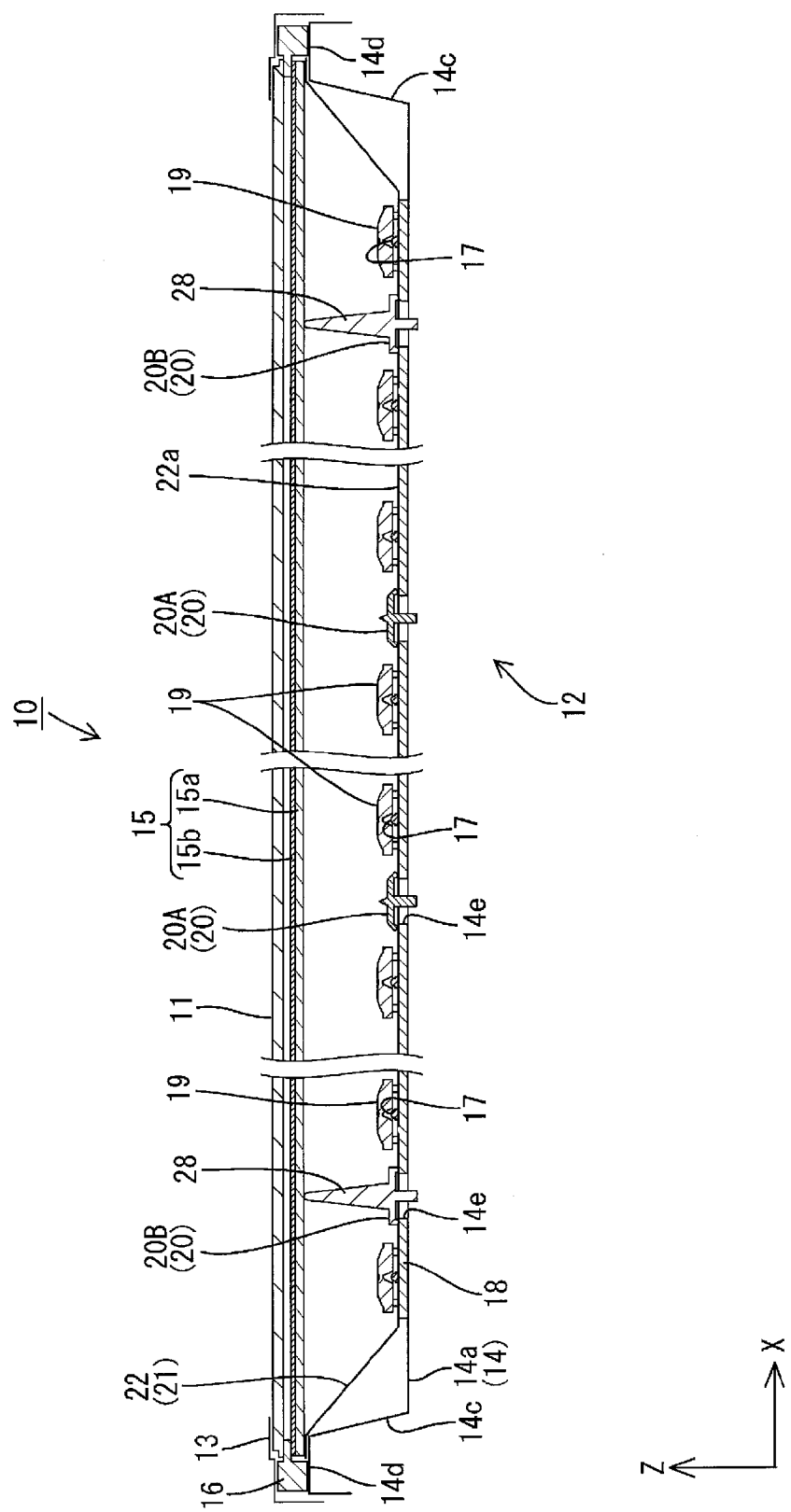
FIG. 4 is a sectional view taken along line iv-iv in FIG. 3 of the liquid crystal display device.
Figure 5:
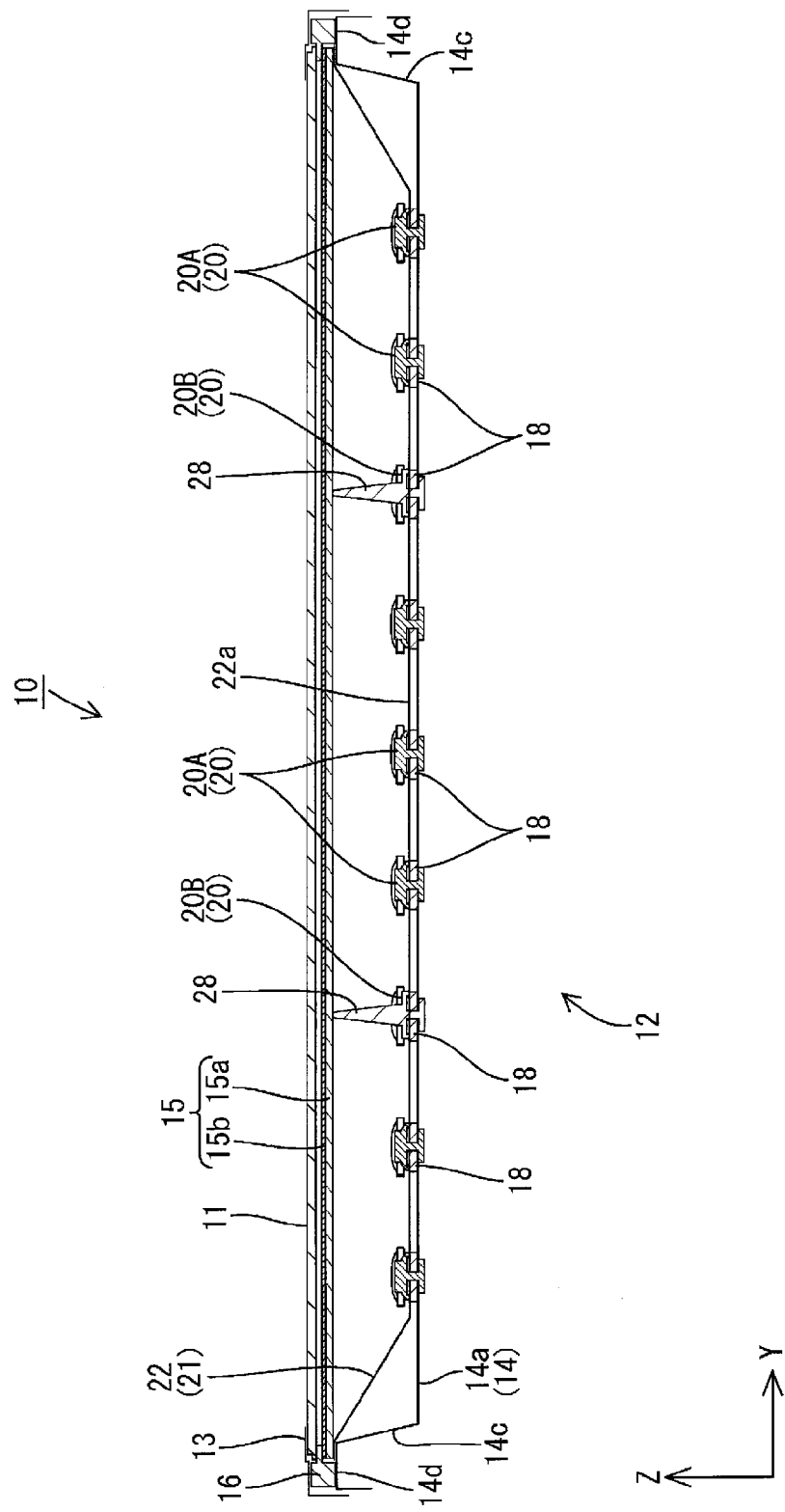
FIG. 5 is a sectional view taken along line v-v in FIG. 3 of the liquid crystal display device.

A first embodiment of the present invention will be described with reference to FIGS. 1 to 21. In this embodiment, a liquid crystal display device 10 is used as an example. A part of each figure shows an X-axis, a Y-axis and a Z-axis, and a direction of each axis is represented in each figure. It is given that an upper side in FIGS. 4 and 5 is a front side and a lower side in these figures is a back side.

Figure 2:
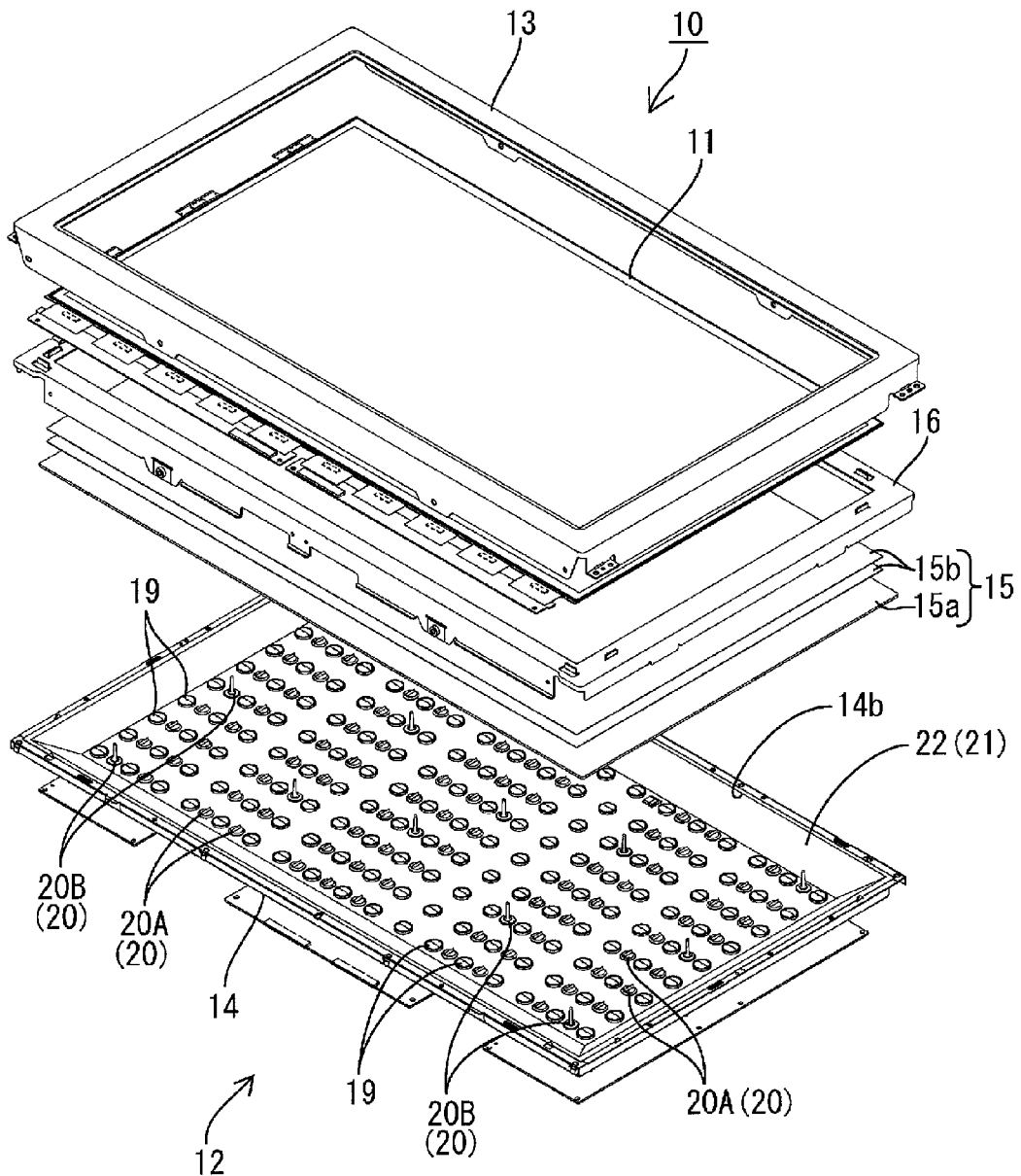
FIG. 2 is an exploded perspective view showing a schematic configuration of a liquid crystal display device provided in the television receiver.

A television receiver TV according to this embodiment includes, as shown in FIG. 1, the liquid crystal display device 10, front and back cabinets Ca and Cb that store the liquid crystal display device 10 therebetween, a power source P, a tuner T and a stand S. The liquid crystal display device (display device) 10 is shaped like an oblong quadrangle as a whole (rectangular) and is stored in a vertically mounted state. The liquid crystal display device 10 includes, as shown in FIG. 2, a liquid crystal panel 11 as a display panel and a backlight unit (lighting device) 12 as an external light source, and these components are integrally held by a frame-like bezel 13 or the like. In this embodiment, it is assumed that a screen size is 42 inches and an aspect ratio is 16:9.

Next, the liquid crystal panel 11 and the backlight unit 12 that constitute the liquid crystal display device 10 will be successively described. The liquid crystal panel (display panel) 11 among them is rectangular in a plan view, and is formed by sticking a pair of glass boards to each other with a predetermined gap therebetween and filling a liquid crystal between the both glass boards. One glass board has a switching component (for example, TFT) connected to a source wiring and a gate wiring that are orthogonal to each other, a pixel electrode connected to the switching component and an alignment film and the like, and the other glass board has a color filter in which color sections of R(red), G (green), B (blue) are arranged in a predetermined pattern, a counter electrode and an alignment film and the like. Polarizing plates are provided outside of the both boards.

Subsequently, the backlight unit 12 will be described in detail. The backlight unit 12 includes, as shown in FIG. 2, a substantially box-like chassis 14 having openings 14b on the side of a light emitting surface (the side of the liquid crystal panel 11), an optical member group 15 (a diffuser (light diffusing member) 15a, and a plurality of optical sheets 15b arranged between the diffuser 15a and the liquid crystal panel 11) arranged so as to cover the openings 14b of the chassis 14, and a frame 16 that is arranged along an outer edge of the chassis 14 and holds an outer edge of the optical member group 15 between the frame 16 and the chassis 14. In the chassis 14, as shown in FIGS. 3 to 5, LEDs 17 (Light Emitting Diode) as light sources, LED boards 18 that mount the LEDs 17 thereon and diffuser lenses 19 attached at positions corresponding to the LEDs 17 on the LED boards 18 are provided. The chassis 14 further includes board holding members 20 configured to hold the LED boards 18 between the board holding members 20 and the chassis 14 and a reflection sheet 21 that reflects light in the chassis 14 toward the optical member 15. In the backlight unit 12, the side of the optical member 15, not the LEDs 17, is set as a light emitting side. Hereinafter, each component of the backlight unit 12 will be described in detail.

The chassis 14 is made of metal, and as shown in FIGS. 3 to 5, consists of a rectangular bottom plate 14a as in the case of the liquid crystal panel 11, side plates 14c rising from outer ends of sides of the bottom plate 14a and receiving plates 14d extending outward from rising ends of the respective side plates 14c, and is shaped like a shallow box (shallow dish) opened toward the front side as a whole. In the chassis 14, its long-side direction corresponds to the X-axis direction (horizontal direction) and its short-side direction corresponds to the Y-axis direction (vertical direction). The frame 16 and the optical member 15 described below can be mounted on each receiving plate 14d of the chassis 14 from the front side. The frame 16 is screwed into each receiving plate 14d. The bottom plate 14a of the chassis 14 includes attachment holes 14e opened for attaching the board holding members 20. The plurality of attachment holes 14e in the bottom plate 14a corresponding to attachment positions of the board holding members 20 is arranged. Details of the attachment hole 14e, such as shape, will be described later.

As shown in FIG. 2, like the liquid crystal panel 11 and the chassis 14, the optical member 15 is shaped like an oblong quadrangle (rectangular) in a plan view. As shown in FIGS. 4 and 5, the optical member 15 covers the openings 14b of the chassis 14 by placing its outer edge on the receiving plates 14d, and is interposed between the liquid crystal panel 11 and the LEDs 17. The optical member 15 consists of the diffuser 15a arranged on the back side (the side of the LEDs 17, the side opposite to the light-emitting side) and the optical sheets 15b arranged on the front side (the side of the liquid crystal panel 11, the light-emitting side). The diffuser 15a is formed by dispersing multiple diffusing particles in a substantially transparent resin base member having a predetermined thickness and has a function of diffusing transmitted light. The optical sheet 15b is shaped like a thinner sheet than the diffuser 15a and two sheets are laminated (FIGS. 7 to 10). Specific examples of the optical sheets 15b include diffuser sheets, lens sheets, reflection type polarizing sheets, and it is possible to select and use any of these sheets as appropriate.

As shown in FIG. 2, the frame 16 is shaped like a frame along outer circumferences of the liquid crystal panel 11 and the optical member 15. The outer edge of the optical member 15 is configured to be pinched between the frame 16 and each of the receiving plates 14d (FIGS. 4 and 5). The frame 16 is configured to receive the outer edge of the liquid crystal panel 11 from the back side and pinch the outer edge of the liquid crystal panel 11 between the frame 16 and the bezel 13 arranged on the front side (FIGS. 4 and 5).

Figure 7:
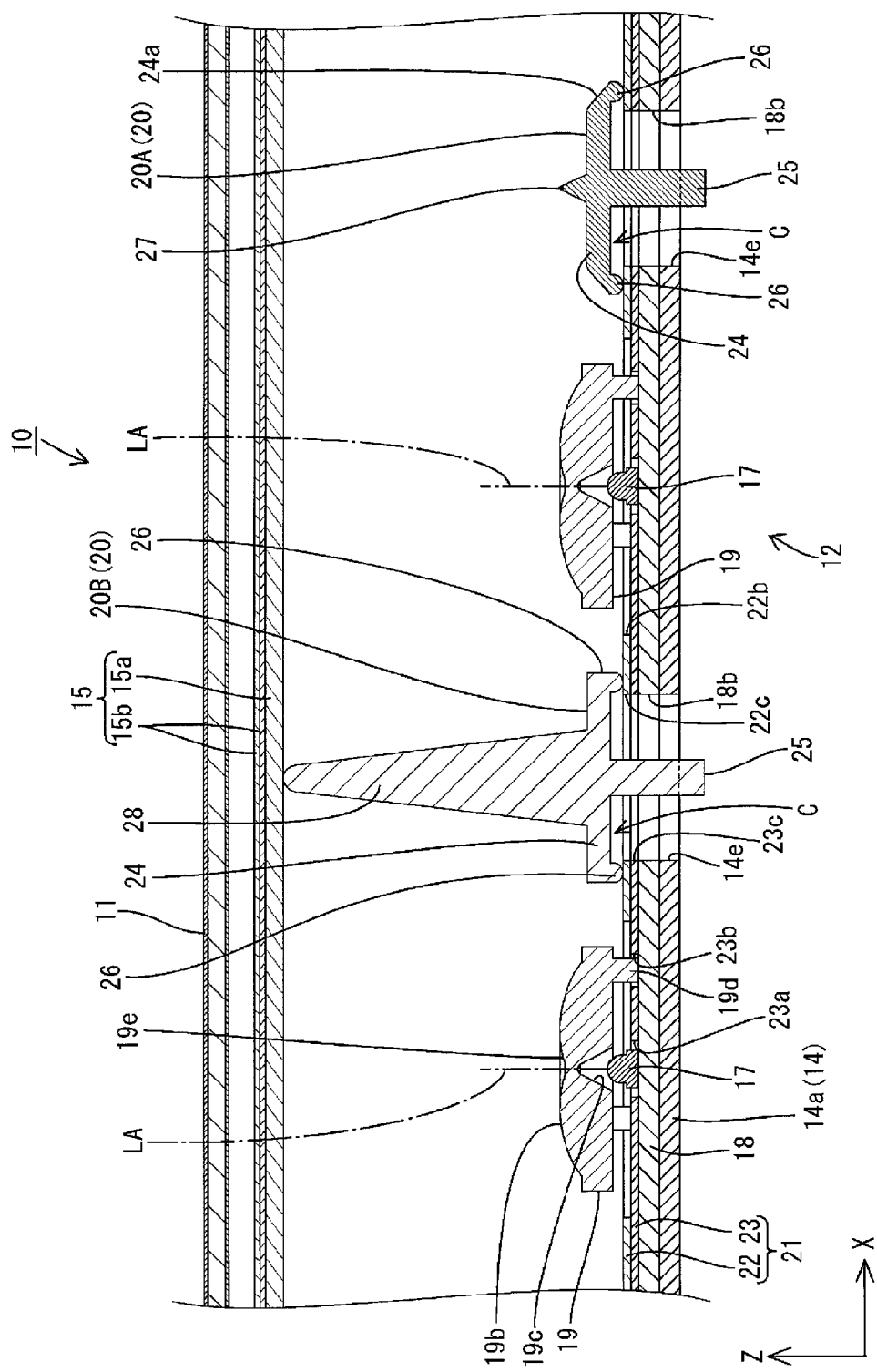
FIG. 7 is a sectional view taken along line vii-vii in FIG. 6.
Figure 8:
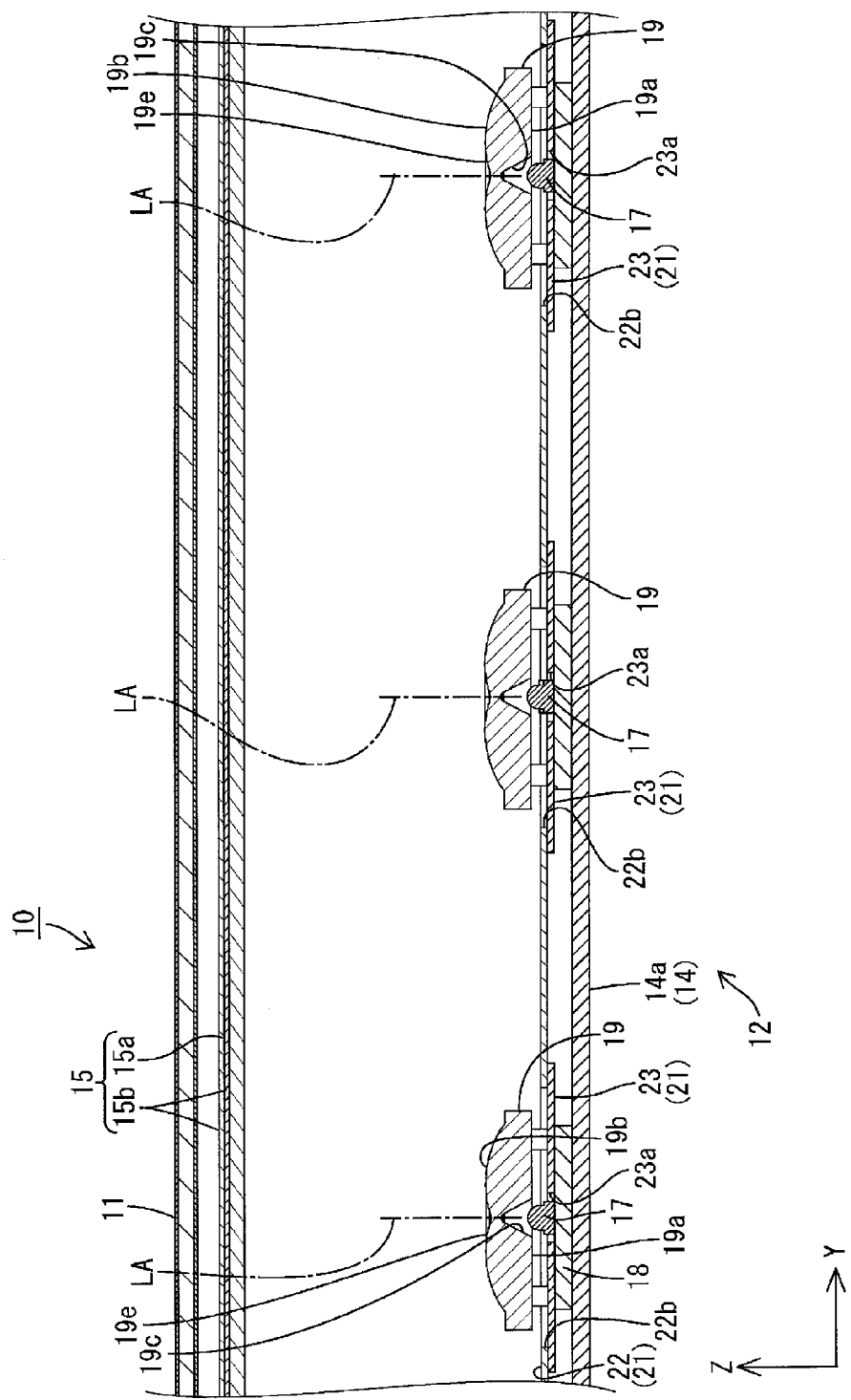
FIG. 8 is a sectional view taken along line viii-viii in FIG. 6.
Figure 11:
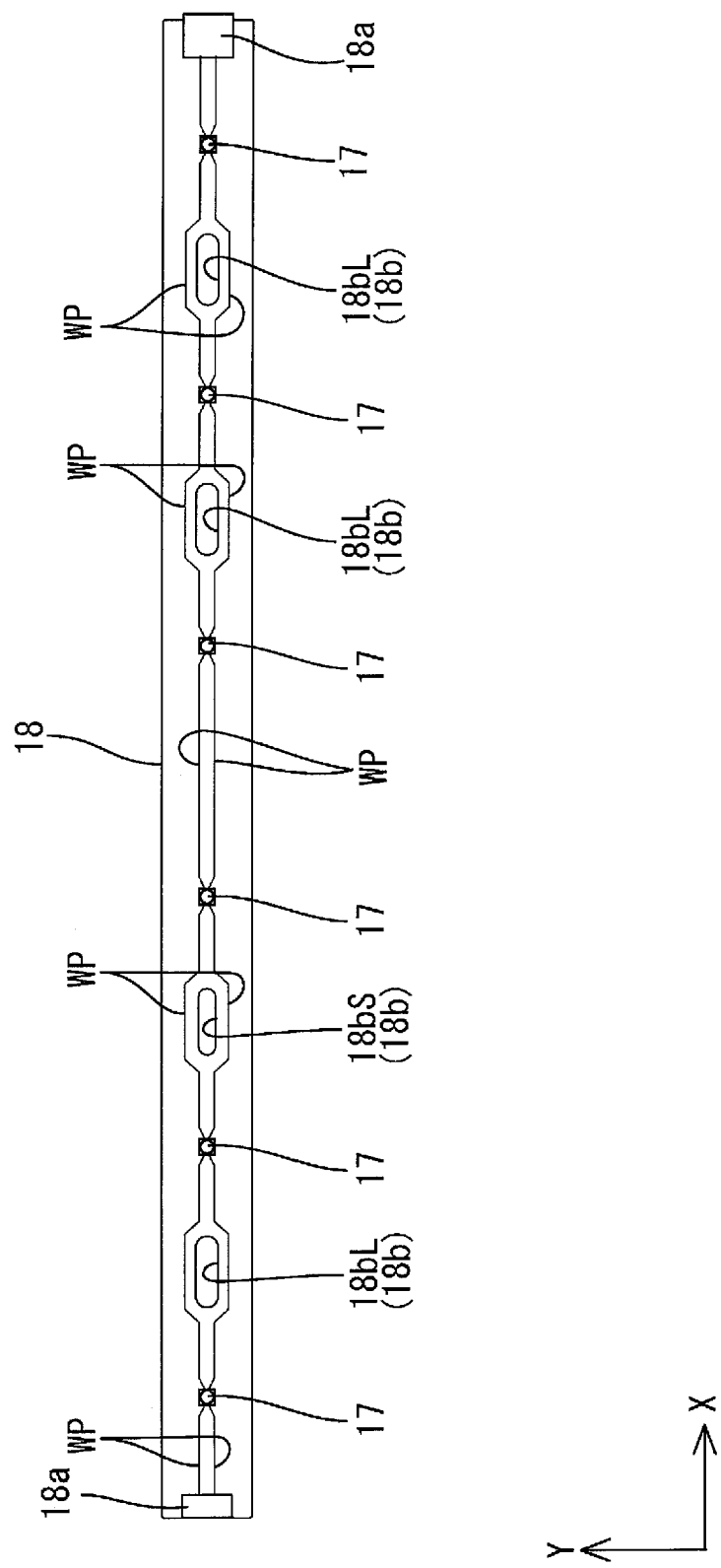
FIG. 11 is a plan view of the LED board.

Next, the LEDs 17 and the LED boards 18 that mount the LEDs 17 thereon will be described in detail. As shown in FIGS. 7, 8, and 11, each of the LEDs 17 is formed by sealing an LED chip on a board portion fixedly attached to the LED board 18 with a resin material. The LED chip mounted on the board portion has one type of main light-emitting wavelength, and specifically, emits blue light only. Meanwhile, phosphors converting blue light emitted by the LED chip into white light are dispersedly mixed in the resin material sealing the LED chip. Thereby, the LED 17 can emit white light. This LED 17 is a so-called top type in which a surface on the side opposite to the mounting surface of the LED board 18 acts as a light-emitting surface 17. An optical axis LA in the LED 17 substantially corresponds to the Z-axis direction (the direction orthogonal to the liquid crystal panel 11 and a main plate surface of the optical member 15). Light emitted from the LEDs 17 spreads radially to some extent about the optical axis LA within a predetermined angular range in a three-dimensional way, and has a higher directivity than light from a cold cathode tube. That is, the light emission intensity of the LED 17 becomes remarkably high in a direction along the optical axis LA and rapidly lowers as inclination angle relative to the optical axis LA is larger.

As shown in FIG. 11, the LED board 18 has a rectangular (longitudinal) base material in a plan view, extends along the bottom plate 14*a* and is stored in the chassis 14 so that its long-side direction matches the X-axis direction and its short-side direction matches the Y-axis direction (FIG. 3). The base member of the LED board 18 is made of metal such as aluminum material as in the case of the material for the chassis 14, and has a surface on which a wiring pattern formed of a metal film such as a copper foil is formed via an insulating layer. Insulating materials such as ceramic can be used as the material for the base member of the LED board 18. As shown in FIGS. 7, 8, and 11, the LEDs 17 having the above-mentioned configuration are mounted on a surface facing the front side (surface facing the optical member 15 side) among surfaces of the base member of the LED board 18. The plurality of LEDs 17 is linearly arranged along the long-side direction of the LED boards 18 (X-axis direction) in parallel, and is serially connected according to the wiring pattern formed on the LED boards 18. The alignment pitch of the LEDs 17 is almost constant, that is, the LEDs 17 are arranged at regular intervals. Wiring patterns WP extend in the X-axis direction of the LED board 18, that is, in the long-side direction of the LED board 18 and the arrangement direction of the LEDs 17. The pair of wiring patterns WP corresponding to an anode and a cathode of the LED chip of the LED 17 are arranged in parallel with each other with a predetermined interval therebetween. A connector 18*a* connected to each end of the wiring patterns WP is provided at each end of the LED board 18 in the long-side direction.

As shown in FIG. 3, the LED boards 18 having the above-mentioned configuration is arranged in the chassis 14 in each of the X-axis direction and the Y-axis direction so that the LED boards 18 are aligned in the long-side direction and the short-side direction in parallel. Specifically the LED boards 18 and the LEDs 17 mounted thereon are arranged in the chassis 14 in a matrix having the X-axis direction (the long-side direction of the chassis 14 and the LED board 18) as a row direction and the Y-axis direction (the short-side direction of the chassis 14 and the LED board 18) as the column direction. Specifically, the three LED boards 18 in the X-axis direction x the nine LED boards 18 in the Y-axis direction, that is, 27 LED boards 18 in total are arranged in the chassis 14 in parallel. In this embodiment, two types of LED boards 18 having different long-side dimensions and the number of mounted LEDs 17 are used. Specifically, a six-mounted type of the LED board 18 that mounts the six LEDs 17 thereon and has a relatively long long-side dimension and a five-mounted type of the LED board 18 that mounts the six LEDs 17 thereon and has a relatively short long-side dimension are used as the LED boards 18, and one six-mounted type of the LED board 18 is arranged at each end of the chassis 14 in the X-axis direction and one five-mounted type of the LED board 18 is arranged at the center in the same direction. As described above, the LED boards 18 aligned in one row in the X-axis direction are electrically connected to each other by fitting the adjacent connector portions 18*a* with each other, and the connector portions 18*a* located at both ends of the chassis 14 in the X-axis direction are each electrically connected to an external control circuit not shown. Thereby, the LEDs 17 arranged on the LED board 18 forming one row are serially connected to one another, so that lighting-on and off of the multiple LEDs 17 contained in the one row can be controlled together by one control circuit, which enables reduction in costs. Even the different types of LED boards 18 having different long-side dimensions and the number of mounted LEDs 17 have the substantially identical short-side dimension and alignment pitch of the LEDs 17.

By preparing plural types of LED boards 18 having different long-side dimensions and the number of mounted LEDs 17 and appropriately using the different types of LED boards 18 in combination, following effects can be obtained. In other words, various types of liquid crystal display devices 10 of different screen sizes can easily be manufactured by appropriately selecting use/nonuse of each type of the LED board 18 and changing the number of each type of the LED boards 18 according to each screen size. As compared to the case where the dedicated LED board having the same long-side dimension as the long-side dimension of the chassis 14 is prepared for each screen size, the number of types of necessary LED boards 18 can be significantly reduced and therefore, manufacturing costs can be reduced. Specifically, by adding an eight-mounted type LED board that mounts eight LEDs 17 thereon to the above-mentioned two types of LED boards 18 (the five-mounted type and the six-mounted type) and appropriately using the three types of LED boards 18 in combination, each of the liquid crystal display devices 10 having the screen size of 26 inches, 32 inches, 37 inches, 40 inches, 42 inches, 46 inches, 52 inches and 65 inches can easily be manufactured.

Figure 12:
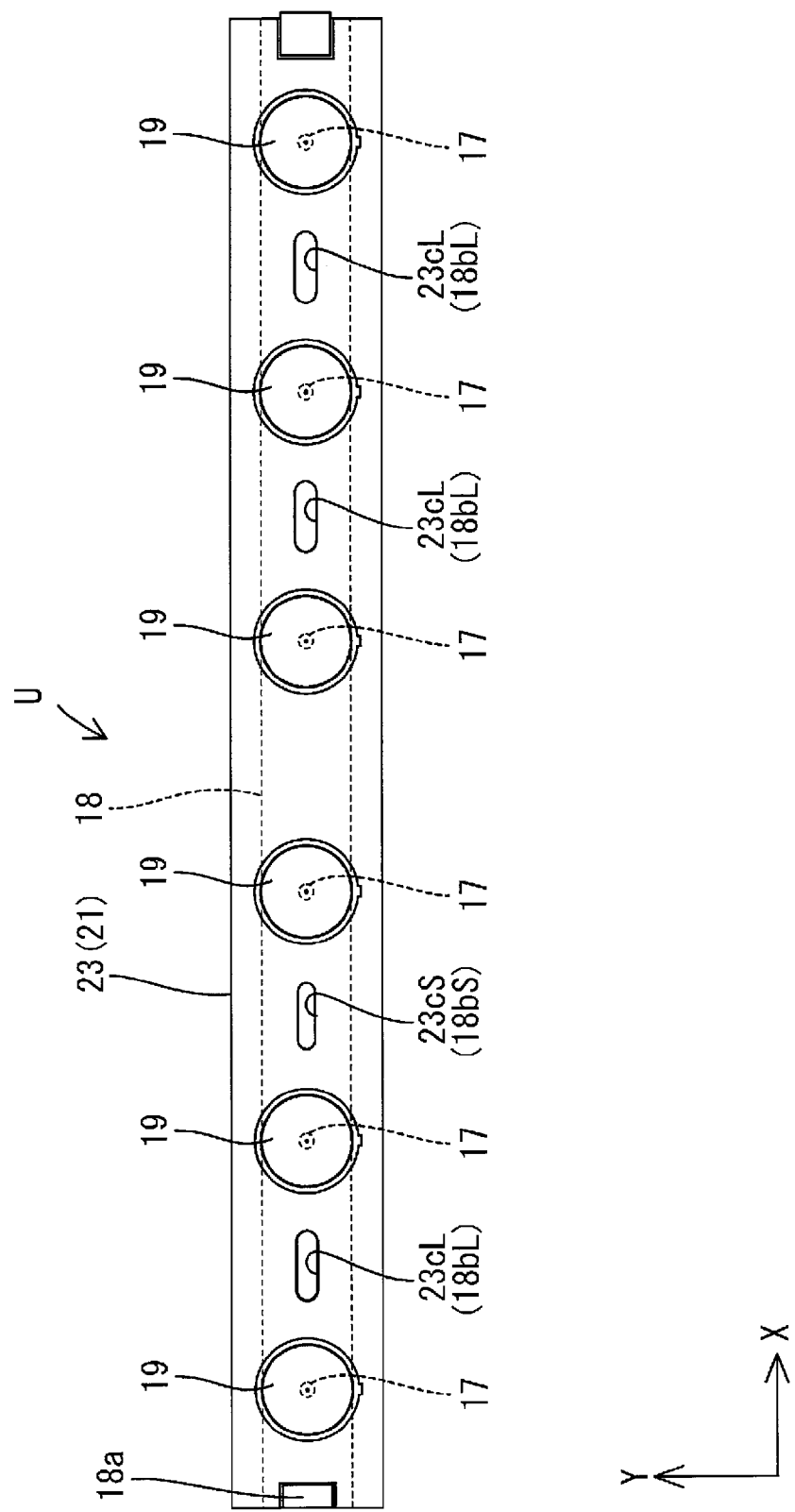
FIG. 12 is a plan view showing the state where a reflection sheet for the board and diffuser lenses are attached to the LED board (light source unit)

The diffuser lenses 19 are made of a synthetic resin material (e.g. polycarbonate and acrylic) that is substantially transparent (highly light transmissive) and has a higher refractive index than air. As shown in FIG. 7, FIG. 8 and FIG. 12, the diffuser lenses 19 each have a predetermined thickness, are formed to be substantially circular in a plan view, and are attached so as to cover the respective LEDs 17 from the front side of the LED board 18, that is, so as to overlap with the respective LEDs 17 in a plan view. The diffuser lenses 19 can emit highly directive light from the LEDs 17 while diffusing the light. That is, since directivity of the light emitted from the LEDs 17 is reduced through the diffuser lenses 19, even when the interval of the adjacent LEDs 17 is set large, an area between the LEDs 17 is hard to be visually recognized as a dark place. Thereby, the number of installed LEDs 17 can be reduced. Each diffuser lens 19 is located to be substantially concentric with each LED 17 in a plan view. Each diffuser lens 19 has sufficiently larger dimensions in the X-axis direction and in the Y-axis direction than each LED 17. Although the diffuser lens 19 has a smaller dimension in the X-axis direction than the LED board 18, the diffuser lens 19 has a larger dimension Y-axis direction than the LED board 18. Accordingly, both ends of the diffuser lens 19 in the Y-axis direction each protrude outward by a predetermined dimension from the LED board 18 in the Y-axis direction.

In each of the diffuser lenses 19, a surface that faces the back side and is opposite to the LED board 18 is a light incidence surface 19*a* on which light from the LED 17 is incident, while a surface that faces the front side and is opposite to the optical member 15 is a light emitting surface 19*b*. As shown in FIGS. 7 and 8, the light incidence surface 19*a* extends in parallel to a plate surface of the LED board 18 (the X-axis direction and the Y-axis direction) as a whole, but has an inclined surface obtained by forming a light incidence-side concave portion 19*c* in an area where the light incidence surface 19*a* and the LED 17 overlap with each other in a plan view. The light incidence-side concave portion 19*c* is substantially conical, is located to be almost concentric with the diffuser lens 19 and is opened toward the back side, that is, the LED 17. The light incidence-side concave portion 19*c* has the largest diameter at its opened end facing the LED 17, which is larger than the diameter of the LED 17, and becomes smaller toward the front side in diameter continually and gradually, and finally becomes the smallest at its end of the front side. The light incidence-side concave portion 19*c* has a substantially inverted V-shaped cross section and a circumferential surface thereof is inclined relative to the Z-axis direction. The inclined surface is inclined so that the end of the front side crosses the optical axis LA of the LED 17. Accordingly, light emitted from the LED 17 and entering into the light incidence-side concave portion 19c is incident into the diffuser lens 19 through the inclined surface. At this time, the incident light is refracted away from the center, that is, in a wide angle, by an inclined angle of the inclined surface relative to the optical axis LA and is incident into the diffuser lens 19.

The light incidence surface 19a of the diffuser lens 19 has attachment shaft portions 19d at positions outer of the light incidence-side concave portion 19c in the radial direction. The attachment shaft portions 19d protrude toward the LED board 18 and serve as attachment structure of the diffuser lens 19 to the LED board 18. Three attachment shaft portions 19d are located closer to an outer edge than the light incidence-side concave portion 19c in the diffuser lens 19, and a line connecting the attachment portions is substantially equilateral-triangular in a plan view. By fixing each of front ends of the attachment shaft portions 19d to the LED board 18 with an adhesive or the like, the diffuser lens 19 can be fixedly attached to the LED board 18. The diffuser lens 19 is fixed to the LED board 18 through the attachment shaft portions 19d so as to have a predetermined gap between the light incidence surface 19a and the LED board 18. This gap allows incidence of light from a space outer of the diffuser lens 19 in a plan view. In the above-mentioned attachment state, a front end of the LED 17 protruding from the LED board 18 enters into the light incidence-side concave portion 19c.

The light emitting surface 19b in the diffuser lens 19 is shaped like a substantially flat spherical surface. Thereby, the diffuser lens 19 can emit light while refracting the light on an interface with an external air layer in a direction away from the center, that is, in a wide angle. The light emitting surface 19b has a light-emitting side concave portion 19e. The light-emitting side concave portion 19e is formed in an area where the light emitting surface 19b overlaps with the LED 17 in a plan view. The light-emitting side concave portion 19e is substantially bowl-like and is shaped like a substantially flat sphere having a circumferential surface inclined downward to the center. An angle that a tangent line to the circumferential surface of the light-emitting side concave portion 19e forms with the optical axis LA of the LED 17 is set to be relatively larger than an angle that the inclined surface of the light incidence-side concave portion 19c forms with the optical axis LA. The area where the light emitting surface 19b overlaps with the LED 17 in a plan view receives extremely larger light amount from the LED 17 than the other area and therefore, its brightness tends to locally become high. However, by forming the light-emitting side concave portion 19e in that area, it becomes possible to emit most of the light from the LED 17 while refracting the light in a wide angle, or reflect a part of the light from the LED 17 toward the LED board 18. Thereby, it is possible to prevent the brightness of the area where the light emitting surface 19b overlaps with the LED 17 from locally becoming high, which is preferable for prevention of uneven brightness.

Next, the reflection sheet 21 will be described. The reflection sheet 21 is constituted by a chassis reflection sheet 22 that covers the almost the entire inner surface of the chassis 14 and a board reflection sheet 23 that covers each of the LED boards 18. The reflection sheets 22 and 23 are each made of synthetic resin, and have a surface of white color having a high light reflectance. The reflection sheets 22 and 23 extend in the chassis 14 along the bottom plate 14a (LED board 18).

Figure 6:
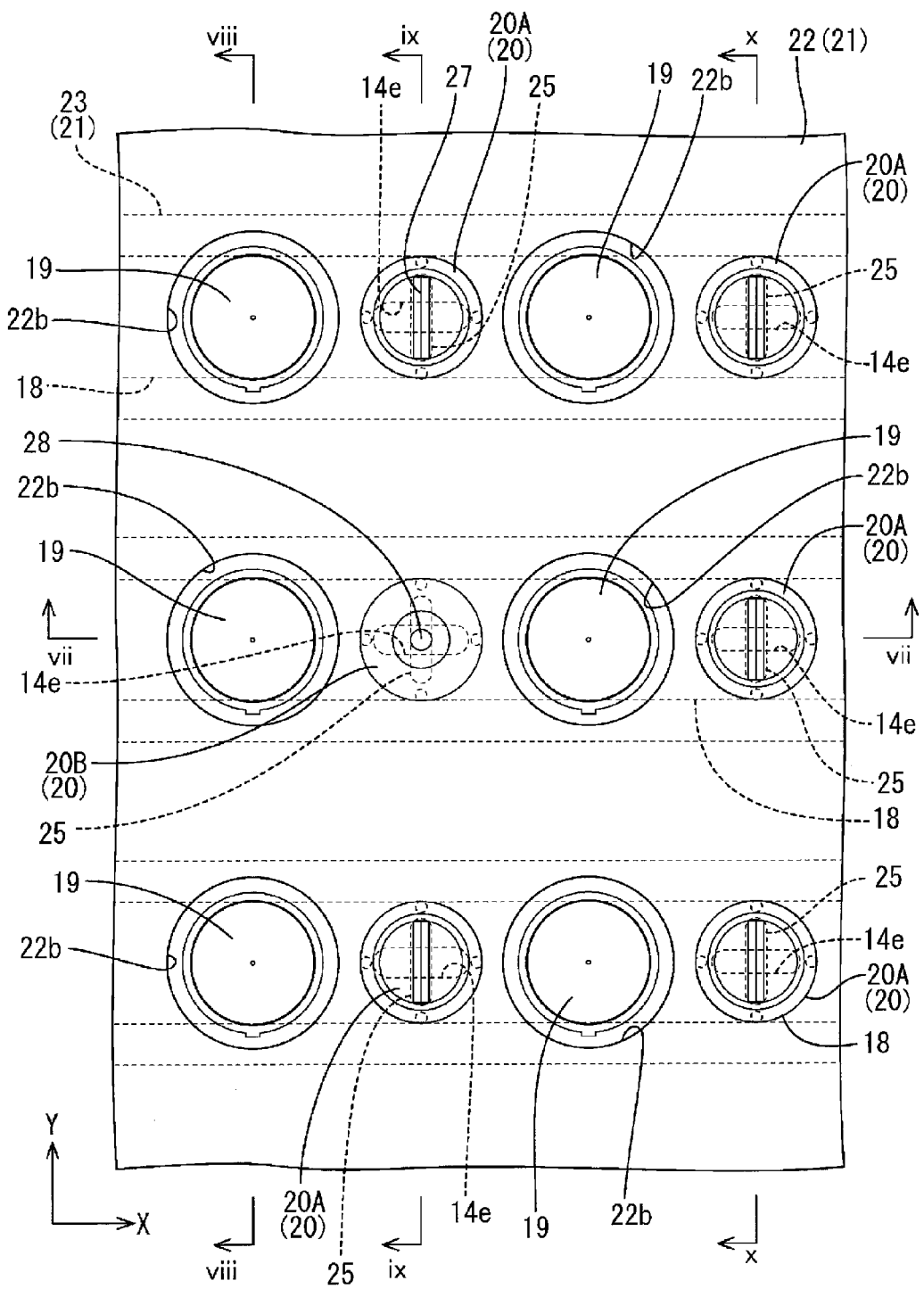
FIG. 6 is a plan view showing a detailed arrangement of the LED boards and the board holding members.

First, the chassis reflection sheet 22 will be described. As shown in FIG. 3, most part of the chassis reflection sheet 22 on the center side, which extends along the bottom plate 14a of the chassis 14, is a body portion 22a. A lens insertion hole 22b configured to pass each LED 17 arranged in the chassis 14 as well as each diffuser lens 19 covering the LED 17 therethrough is formed through the body portion 22a. The plurality of lens insertion holes 22b is arranged in parallel at positions where the lens insertion holes 22b overlap with the LEDs 17 and diffuser lenses 19 on the body portion 22a in a plan view in a matrix. As shown in FIG. 6, each lens insertion hole 22b is circular in a plan view and has a larger diameter than the diffuser lens 19. Thereby, when the chassis reflection sheet 22 is installed in the chassis 14, the diffuser lenses 19 can be inserted into the respective lens insertion holes 22b irrespective of presence or absence of dimensional error. Since the chassis reflection sheet 22 covers regions between adjacent diffuser lenses 19 and regions on the outer circumferential side in the chassis 14 as shown in FIG. 3, light toward each of the regions can be reflected toward the optical member 15. Further, as shown in FIGS. 4 and 5, outer circumferential portions of the chassis reflection sheet 22 rise so as to cover the side plates 14c and the receiving plates 14d of the chassis 14, and portions placed on the receiving plates 14d are sandwiched between the chassis 14 and the optical member 15. A part of the chassis reflection sheet 22 connecting the body portion 22a to a part placed on the receiving plate 14d is inclined.

Meanwhile, the board reflection sheet 23 has, as shown in FIG. 12, almost the same outer shape as the LED board 18, that is, is rectangular in a plan view. As shown in FIGS. 7 and 8, the board reflection sheet 23 is arranged so as to overlap with the front side surface of the LED board 18, and is opposite to the diffuser lens 19. That is, the board reflection sheet 23 is interposed between the diffuser lens 19 and the LED board 18. Accordingly, light returned from the diffuser lens 19 to the LED board 18 and light entering from a space outer of the diffuser lens 19 in a plan view into a space between the diffuser lens 19 and the LED board 18 can be reflected toward the diffuser lens 19 by the board reflection sheet 23 again. As a result, light utilization efficiency can be enhanced, thereby increasing brightness. In other words, even when the number of installed LEDs 17 is reduced to cut costs, sufficient brightness can be obtained.

As shown in FIG. 12, the board reflection sheet 23 has the almost same long-side dimension as the LED board 18 and has a larger short-side dimension than the LED board 18. Further, as shown in FIGS. 6 and 8, the short-side dimension of the board reflection sheet 23 is larger than the diameter of the diffuser lens 19 and the lens insertion hole 22b in the chassis reflection sheet 22. Accordingly, the edge of the lens insertion hole 22b in the chassis reflection sheet 22 can be placed on the board reflection sheet 23 from the front side. Thereby, the chassis reflection sheet 22 and the board reflection sheet 23 are continuously arranged in the chassis 14 without any gap in a plan view, and the chassis 14 or the LED board 18 is hardly exposed from the lens insertion hole 22b toward the front side. Therefore, light in the chassis 14 can be efficiently reflected toward the optical member 15, which is extremely preferable for improvement of brightness. The board reflection sheet 23 includes LED insertion holes 23a that pass the respective LEDs 17 therethrough and shaft portion insertion holes 23b that pass the respective attachment shaft portions 19d of the diffuser lens 19 therethrough at overlapping positions in a plan view.

Next, the board holding member 20 will be described below. The board holding member 20 is classified into two types: a multifunctional board holding member 20B that has a supporting function of supporting the optical member 15 in addition to the holding function of holding the LED board 18 and a monofunctional board holding member 20A that has the supporting function, but does not have the holding function. Hereinafter, when the board holding member 20 needs to be distinguished, a subscript A is added to the reference numeral of the monofunctional board holding member, a subscript B is added to the reference numeral of the multifunctional board holding member and no subscript is added to the holding member that is not distinguished and is collectively called.

First, arrangement of the board holding members 20 in the chassis 14 will be described. As shown in FIG. 3, multiple board holding members 20 are arranged on the bottom plate 14a of the chassis 14. Describing in detail, given that the X-axis direction (the long-side direction of the chassis 14 and the LED board 18) is the row direction and the Y-axis direction (the short-side direction of the chassis 14 and the LED board 18) in the bottom plate 14a, the board holding members 20 are arranged in the row and column directions (arranged in a matrix). Each board holding member 20 is located at an overlapping position with each LED board 18 in a plan view and between the adjacent diffuser lenses 19 (LEDs 17). Accordingly, the board holding members 20 are arranged like the above-mentioned diffuser lenses 19 and the LEDs 17. Since one board holding member 20 is arranged in a region between the adjacent diffuser lenses 19 (LEDs 17) on the LED board 18, the diffuser lenses 19 (LEDs 17) and the board holding members 20 are alternately arranged in the substantially X-axis direction. Specifically, the four board holding members 20 are attached to each LED board 18. On the six-mounted type of LED board 18, the board holding members 20 are arranged at positions other than the center position in the long-side direction in the regions between the adjacent diffuser lenses 19 (LEDs 17), and in the five-mounted type of LED board 18, the board holding members 20 are arranged in all of the regions between the adjacent diffuser lenses 19 (LEDs 17).

The board holding members 20, as described above, are arranged in the chassis 14 in a matrix. Among them, as shown in FIG. 3, the plurality of (specifically, 14 in total) multifunctional board holding members 20B is intermittently arranged in a zig-zag manner, and the monofunctional board holding members 20A are arranged at other positions. Describing in detail, in the center-side region of the chassis 14 in the X-axis direction (region where the five-mounted type LED board 18 is arranged), the four multifunctional board holding members 20B are arranged at positions near the center of each LED board 18 in the long-side direction in a zigzag manner in a plan view. In the both end-side region of the chassis 14 in the X-axis direction (where the six-mounted type LED board 18 is arranged), the five multifunctional board holding members 20B are arranged at ends of the LED board 18 in the long-side direction in a zigzag manner in a plan view. As described above, the plurality of multifunctional board holding members 20B is appropriately distributed in a plane of the bottom plate 14a of the chassis 14. The monofunctional board holding members 20A are attached to all of the LED boards 18 in the chassis 14, while the multifunctional board holding members 20B are attached at positions corresponding to certain LED boards 18.

Figure 9:
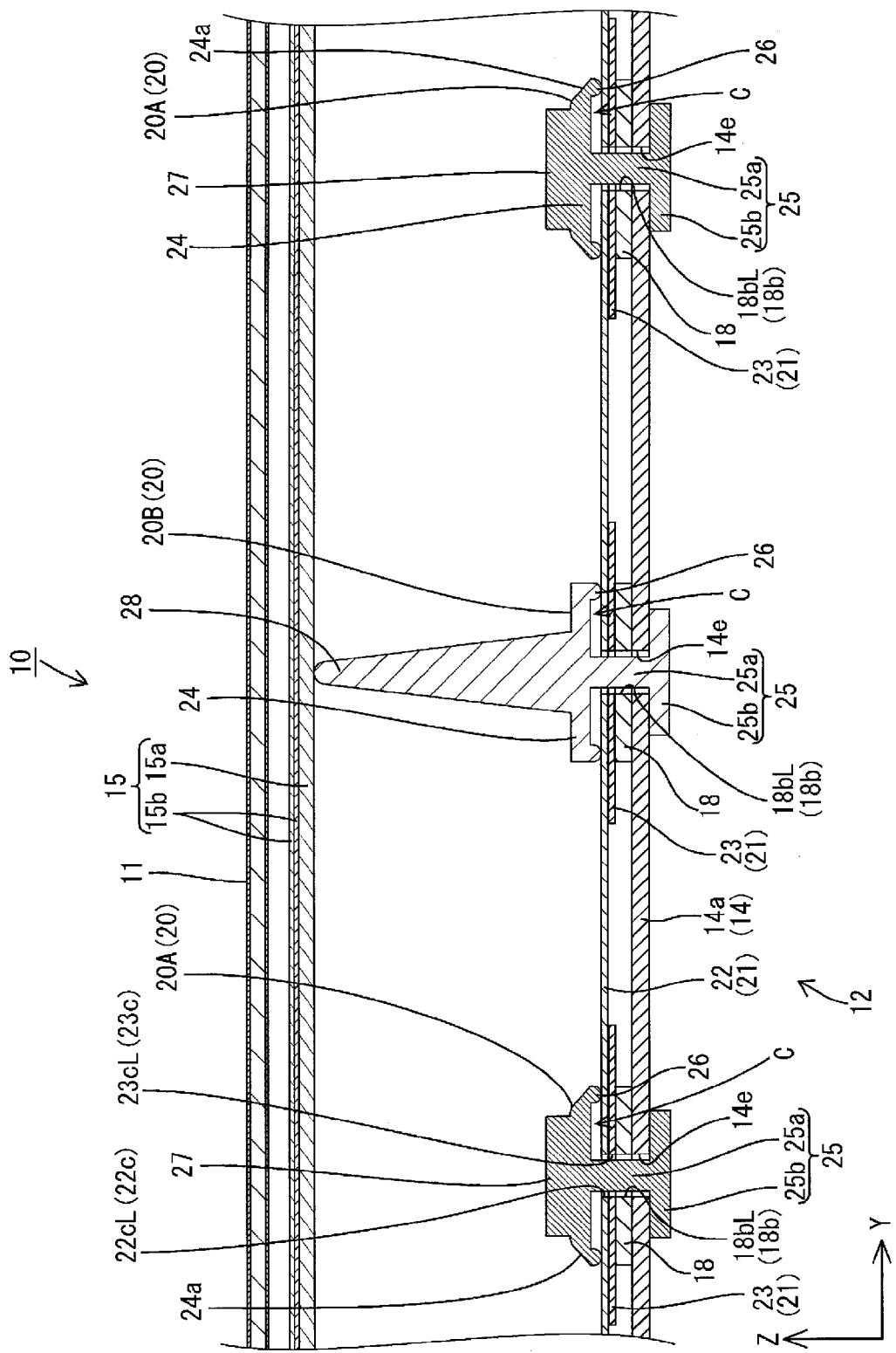
FIG. 9 is a sectional view taken along line ix-ix in FIG. 6.

Next, detailed configuration of the board holding member 20 will be described. Although the board holding member 20 is classified into two types as described above, most of the configuration is common and the common configuration will first be described. The board holding member 20 is made of synthetic resin such as polycarbonate and has a surface of white color having a high light reflectance. As shown in FIG. 9, the board holding member 20 includes a body portion 24 along the bottom plate 14a of the chassis 14 and the plate surface of the LED board 18, and an attachment portion 25 that is protruded from the body portion 24 toward the back side, that is, toward the chassis 14 and is fixed to the chassis 14. Then, the board holding member 20 according to this embodiment is rotated about the rotational axis along the Z-axis direction along the plate surface of the bottom plate 14a of the chassis 14. Thereby the board holding member 20 is rotationally displaced between a holding position (position shown in FIGS. 9 and 10) at which the attachment portion 25 overlaps with an edge of the attachment hole 14e in the chassis 14 in a plan view and sandwiches the edge of the attachment hole 14e between the attachment portion 25 and the body portion 24 and a non-holding position (position shown in FIGS. 20 and 21) at which the attachment portion 25 does not overlap with the edge of the attachment hole 14e in a plan view and attaching and detaching of the attachment portion 25 from the attachment hole 14e is allowed. In this embodiment, by rotating the board holding member 20, the board holding member 20 can be held at the chassis 14 and the holding state of the board holding member 20 at the chassis 14 can be released.

As shown in FIGS. 13 to 16, the body portion 24 is substantially circular in a plan view, and is shaped like a plate extending substantially straight in the X-axis direction and the Y-axis direction. As shown in FIG. 6, the body portion 24 has the almost same diameter as the short-side dimension (dimension in the Y-axis direction) of the LED board 18. The body portion 24 is attached at an overlapping position with the LED board 18 in a plan view, thereby holding the LED board 18 between the body portion 24 and the bottom plate 14a of the chassis 14. Since the body portion 24 is attached in the state where the reflection sheets 22 and 23 are previously arranged on the front side of the LED board 18, the body portion 24 can sandwich the LED board 18 and the reflection sheets 22 and 23 together (FIGS. 7 and 9).

Describing in detail, as shown in FIG. 6, the body portion 24 is located so that its center aligns with the center of the LED board 18 in the short-side direction. Accordingly, the body portion 24 can pinch the LED board 18 between the body portion and the chassis 14 over the entire length in the short-side direction. At this time, both outer ends of the body portion 24 in the Y-axis direction substantially align with both outer ends of the LED board 18 in the short-side direction. That is, the body portion 24 overlaps with the LED board 18 almost entirely in a plan view, thereby being prevented from extending outside of the LED board 18. The diameter of the body portion 24 is set to be smaller than the interval (alignment pitch) between the adjacent diffuser lenses 19 (LEDs 17) in the X-axis direction. The body portion 24 is arranged in the region between the adjacent diffuser lenses 19 in the X-axis direction of the LED board 18, which is, a non-luminous part Of the LED board 18, and does not overlap with the LED 17 in a plan view. Describing in more detail, the body portion 24 is located at a midpoint of the diffuser lenses 19 that are adjacent in the X-axis direction. Thus, since the distances between the body portion 24 and the adjacent LEDs 17 in the X-axis direction can be made almost equal to each other, optical effects of light emitted from the LEDs 17 on the body portion 24 can be made almost equal to each other. In this embodiment, since the interval between LEDs 17 is made sufficiently large by using the diffuser lens 19 as described above, the board holding member 20 is arranged in the space and fixes the LED board 18.

Figure 14:
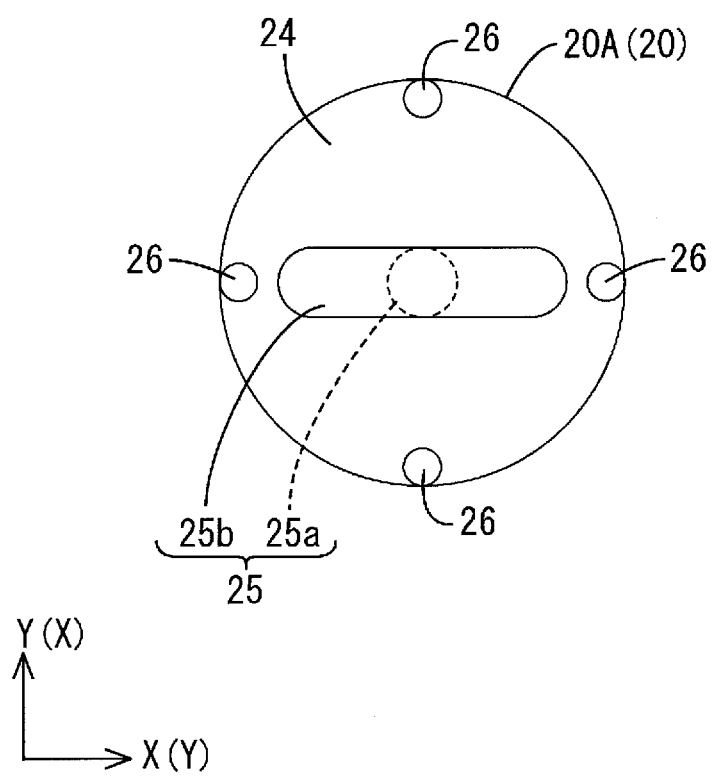
FIG. 14 is a bottom view of the monofunctional board holding member.
Figure 16:
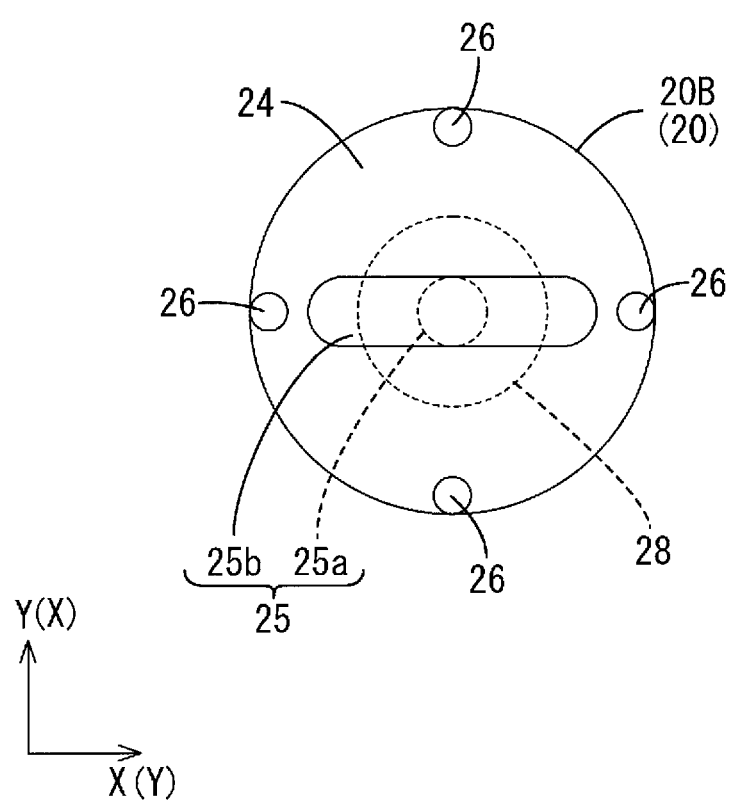
FIG. 16 is a bottom view of the multifunctional board holding member.

Next, the attachment portion 25 together with the attachment hole 14e in the chassis 14 will be described. As shown in FIGS. 14 and 16, the attachment portion 25 is substantially elliptical in a plan view, and extends in one direction. As shown in FIG. 6, like the attachment portion 25, the attachment hole 14e is substantially elliptical in a plan view, its long-side direction aligns with the X-axis direction and the short-side direction aligns with the Y-axis direction. That is, the attachment hole 14e has a longitudinal shape having the long-side direction coinciding with the long-side direction of the LED board 18. These attachment portion 25 and attachment hole 14e are noncircular (shape other than circular symmetric shape), and have rotationally symmetric shape of 2-fold symmetry. Both ends of the ling-side of the attachment portion 25 and the attachment hole 14e are substantially semicircular in a plan view, and their circumferential surfaces are circular arcuate surfaces.

Figure 19:
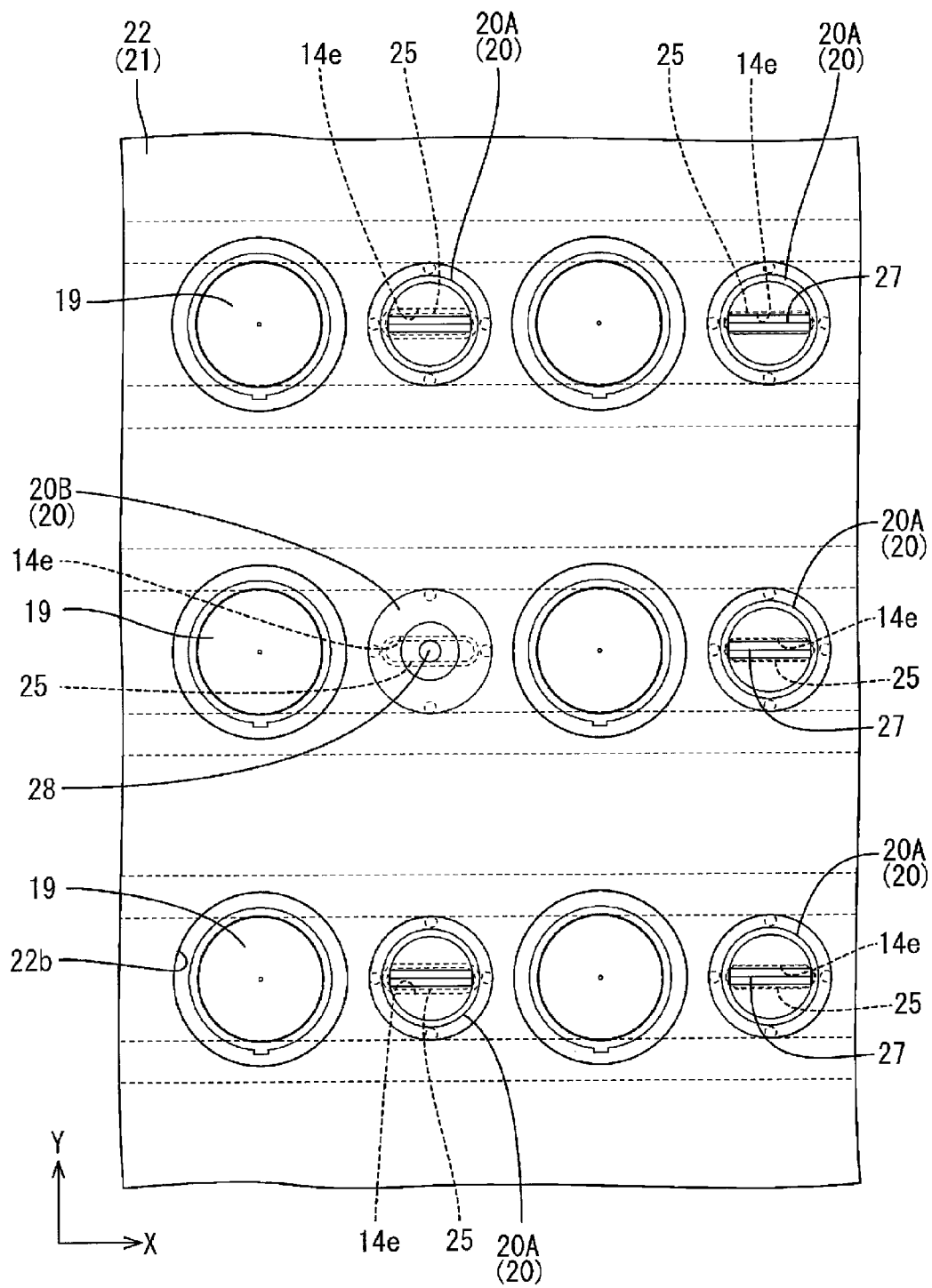
FIG. 19 is a plan view showing the state where a light source unit is arranged in the chassis and the board holding members are located at the non-holding position.
Figure 20:
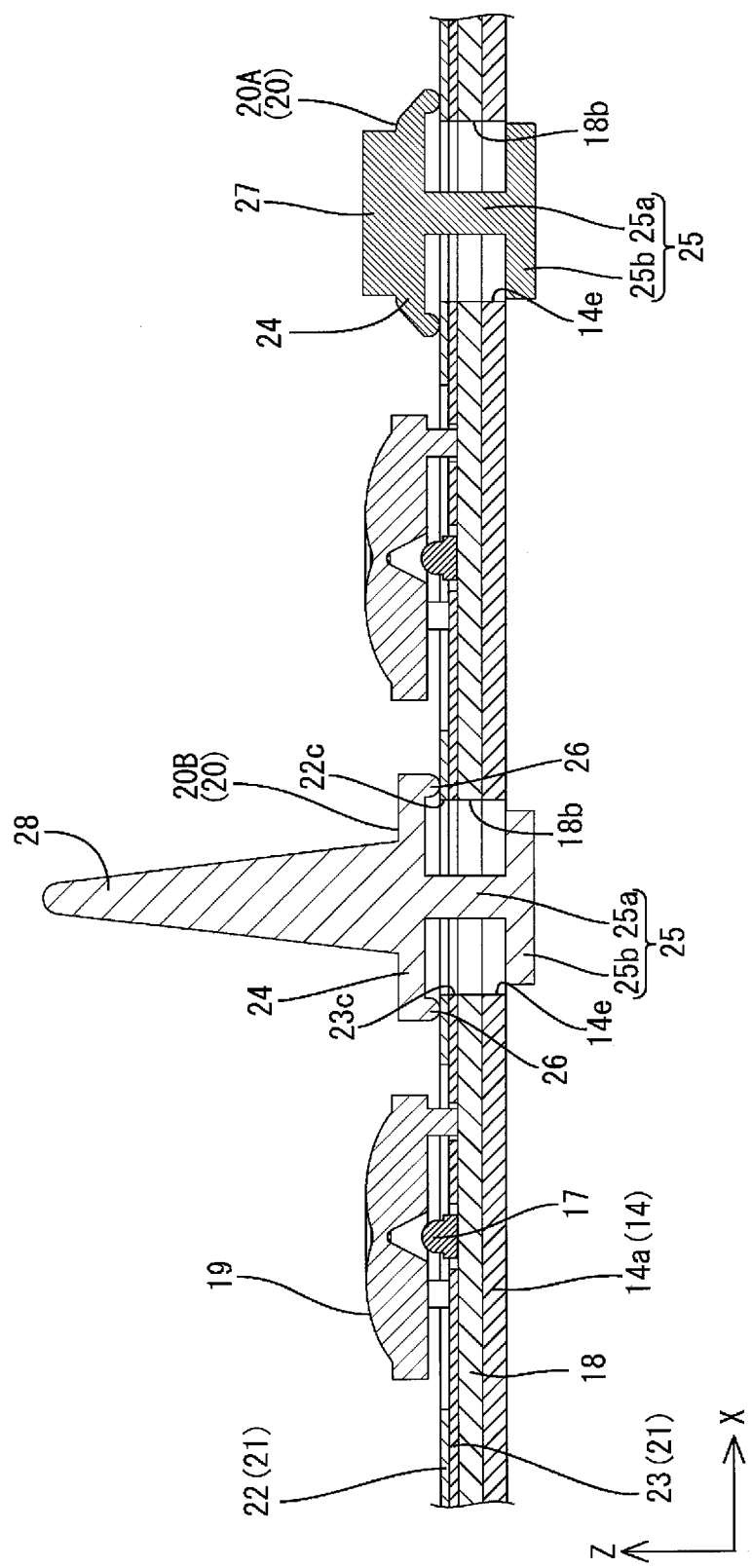
FIG. 20 is a sectional view taken along line vii-vii in FIG. 6 showing the state where the board holding members are located at the non-holding position.
Figure 21:
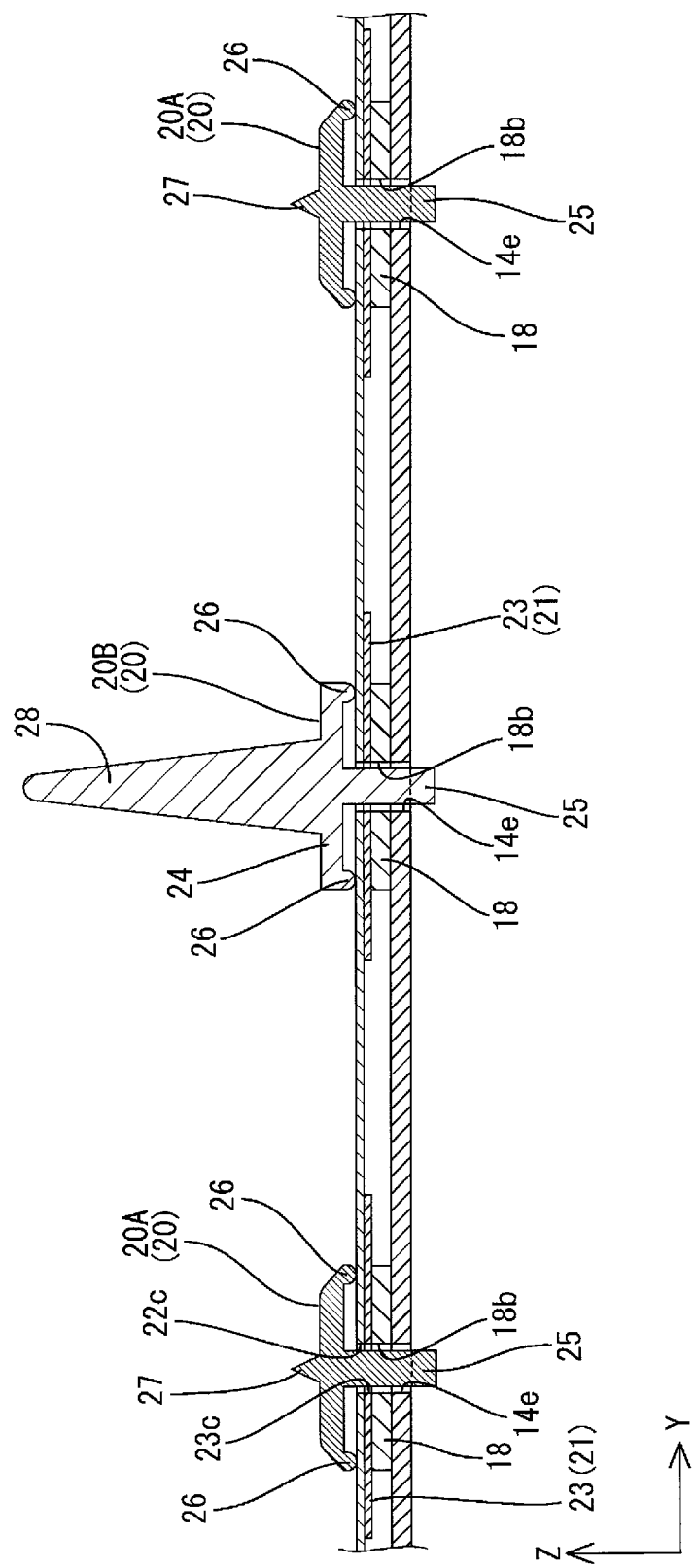
FIG. 21 is a sectional view taken along line ix-ix in FIG. 6 showing the state where the board holding members are located at the non-holding position.

The attachment hole 14e is formed to be larger than the attachment portion 25 in a plan view. Accordingly, in the state where the long-side direction of the attachment portion 25 aligns with the long-side direction of the attachment holes 14e (the long-side direction of the attachment portion 25 aligns with the X-axis direction), the attachment portion 25 can be inserted into or pulled out of the attachment hole 14e. In the state where the long-side direction of the attachment portion 25 aligns with the long-side direction of the attachment holes 14e and the attachment portion 25 is inserted into the attachment hole 14e, the board holding member 20 is located at the above-mentioned non-holding position, and the attachment portion 25 is entirely arranged in the attachment hole 14e in a plan view, and is not engaged with the edge of the attachment hole 14e (FIGS. 19 to 21). When the board holding member 20 is rotated from the non-holding position by a predetermined angle (angle other than an integral multiple of 180 degrees) such that the long-side direction of the attachment portion 25 intersects (does not match) the long-side direction of the attachment hole 14e, the board holding member 20 is located at the above-mentioned holding position, apart of the attachment portion 25 overlaps with the edge of the attachment hole 14e in a plan view and the overlapping part of the attachment portion 25 (holding portion 25b described later) is engaged with the edge of the attachment hole 14e from the back side (refer to FIGS. 6 and 9). Although the holding position includes the position where the board holding member 20 is rotated from the non-holding position by any angle other than the integral multiple of 180 degrees, in terms of stability of the holding state, the state where the board holding member 20 is rotated from the non-holding position by 90 degrees is most preferable (state shown in FIGS. 6 and 9). The plurality of attachment holes 14e is arranged in parallel at the attachment positions of the board holding members 20 on the bottom plate 14a of the chassis 14 in the X-axis direction and the Y-axis direction in a matrix.

As shown in FIG. 9, the attachment portion 25 includes an shaft portion 25a protruded from a back side surface of the body portion 24 toward the back side and a holding portion 25b protruded from the shaft portion 25a along the body portion 24, and is shaped like an inverted T in a side view. The shaft portion 25a is substantially shaped like a cylinder having an axial direction as the Z-axis direction and constitutes the rotational axis (rotating center) of the board holding member 20. That is, the board holding member 20 is rotated about an axial line (Z axis) of the shaft portion 25a in attaching and detaching with respect to the chassis 14. As shown in FIGS. 14 and 16, the shaft portion 25a has a circular cross section along the X-axis direction and the Y-axis direction (direction along the plate surfaces of the body portion 24 and the chassis 14), and its outer circumferential surface is a circular arcuate surface. The shaft portion 25a is arranged at the center of the body portion 24 and is concentric with the body portion 24. Accordingly, a rotational track of an outer circumferential end of the circular body portion 24 exists only on the same circumference of a circle. Further, since the shaft portion 25a exists at the center of the body portion 24 on the back side, by viewing the body portion 24 from the front side, the position of the rotational axis of the board holding member 20 can easily be recognized.

As shown in FIGS. 14 and 16, the outer shape of the holding portion 25b aligns with that of the attachment portion 25. That is, the holding portion 25b is substantially elliptical (longitudinal shape) in a plan view, which is noncircular (shape other than circular symmetrical shape) and rotationally symmetric shape of 2-fold symmetry. The short-side dimension of the holding portion 25b is set to be almost equal to the diameter of the shaft portion 25a. Accordingly, the outer circumferential surface of the shaft portion 25a is partially in flush with both long-side outer surface of the holding portion 25b. The shaft portion 25a is arranged in the region where the holding portion 25b is formed in a plan view, and thus, is not projected outward from the outer edge of the holding portion 25b. The center of the holding portion 25b in the long-side direction is connected to a protruding front end of the shaft portion 25a such that the holding portion 25b is symmetrical about the shaft portion 25a. In other words, the holding portion 25b is constituted by a pair of cantilevered plate pieces 25b1 protruded from the circumferential surface of the protruding front end of the shaft portion 25a in mutually opposite directions. Accordingly, in the holding position, a pair of the plate pieces 25b1 forming the holding portion 25b is engaged with parts of the edge of the attachment hole 14e, which are located with an interval of 180 degrees.

The attachment portion 25 is located so as to overlap with the LED board 18 in a plan view. For this reason, a through hole 18b that passes the attachment portion 25 therethrough is formed in the LED board 18. As shown in FIG. 11, the through hole 18b is arranged between the adjacent LEDs 17 (diffuser lenses 19) on the LED board 18, that is, at the non-overlapping position with the LED 17 (diffuser lens 19) in a plan view. The through hole 18b is shaped like an ellipse having the almost same planar shape and dimension as those of the attachment hole 14e above, and communicates with the attachment holes 14e. That is, the through hole 18b has a longitudinal shape parallel to the X-axis direction, that is, the long-side direction of the LED board 18 and the extending direction of the wiring patterns WP. Accordingly, the short-side dimension of the LED board 18 can be kept small while arranging a pair of the wiring patterns WP so as to cross the through hole 18b in the LED board 18 in the Y-axis direction. As shown in FIGS. 7 and 9, since the edge of the through hole 18b in the LED board 18 entirely overlaps with the edge of the attachment hole 14e in a plan view, the chassis 14 and the LED board 18 are sandwiched between the body portion 24 and the holding portion 25b in the board holding member 20 located at the holding position. As shown in FIG. 7, FIG. 9 and FIG. 12, communicating holes 22c and 23c that are configured to communicate with the through holes 18b and pass the fixed portion 25 therethrough are formed in the reflection sheets 22 and 23 sandwiched between the body portion 24 and the LED board 18 so as to overlap with the through holes 18b in a plan view. As a result, each of the reflection sheets 22 and 23 together with the chassis 14 and the LED board 18 are sandwiched between the body portion 24 and the holding portion 25b in the board holding member 20 located at the holding position.

The plurality of through holes 18b of the above-mentioned shape corresponding to the attachment positions of the board holding members 20 is provided in each LED boards 18. The plurality of through holes 18b is classified into two types that are different from each other in size in a plan view. Describing in detail, as shown in FIG. 11, the through holes 18b are constituted by one small through hole 18bS that is relatively small in a plan view and a plurality of (three in the LED board in FIG. 11) large through holes 18bL that is relatively large in a plan view. Similarly, as shown in FIG. 12, the communicating holes 22c and 23c in the reflection sheets 22 and 23 each are constituted by one small communicating hole 22cS and 23cS that are relatively small in a plan view and correspond to the small through hole 18bS, and the plurality of large communicating holes 22cL and 23cL that is relatively large in a plan view and correspond to the large through hole 18bL. Hereinafter, when the through hole 18b and the communicating holes 22c and 23c need to be distinguished, a suffix S is added to the reference numerals of small ones, and a suffix L is added to reference numerals of large ones. When these holes are not distinguished and collectively referred, no suffix is added to their reference numerals.

Figure 10:
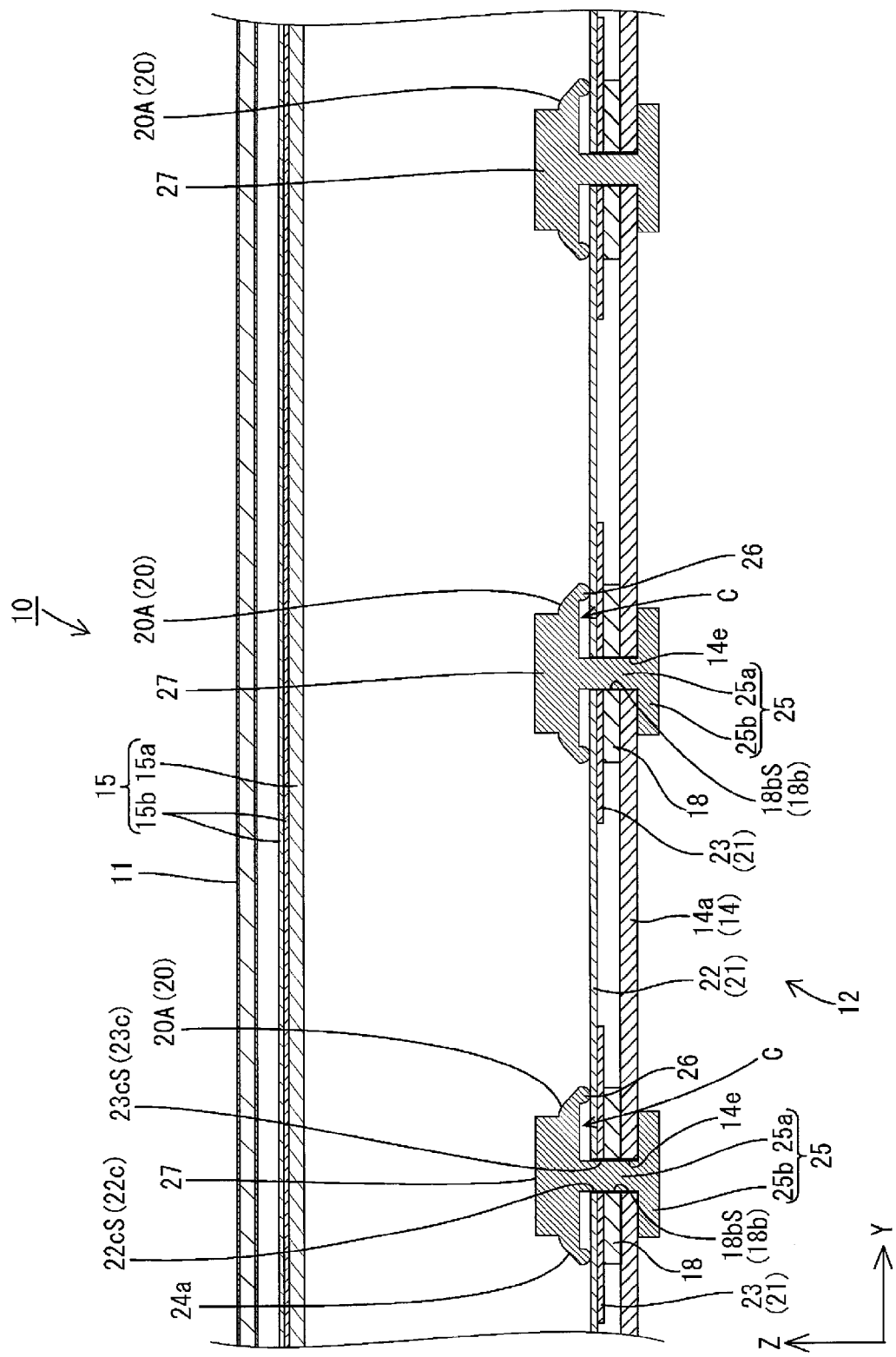
FIG. 10 is a sectional view taken along line x-x in FIG. 6.

As shown in FIGS. 9 and 10, each of the small through hole 18bS and the small communicating holes 22cS and 23cS are slightly larger than the attachment portion 25 in a plan view, and a clearance between each of the holes and the attachment portion 25 is extremely small. Accordingly, by inserting the attachment portion 25 into the small through hole 18bS and the small communicating holes 22cS and 23cS, the attachment portion 25 can position the LED board 18 and the reflection sheets 22 and 23 in the X-axis direction and the Y-axis direction. Meanwhile, each of the large through hole 18bL and the large communicating holes 22cL and 23cL are larger than each of the small through hole 18bS and the small communicating holes 22cS and 23cS, resulting that the clearance between each of the holes and the attachment portion 25 is relatively large. One small through hole 18bS, one small communicating hole 22cS, and one small communicating hole 23cS are arranged corresponding to each LED board 18, the plurality of large through holes 18bL, the plurality of large communicating hole 22cL and the plurality of large communicating hole 23cL are arranged corresponding to each LED board 18. Accordingly, even when the LED board 18 and the reflection sheets 22 and 23 are thermally expanded or thermally contracted, the large clearance between the attachment portion 25 and each of the large through hole 18bL and the large communicating holes 22cL and 23cL can absorb the expansion and contraction of the LED board 18 and the reflection sheets 22 and 23. As a result, deformation such as warp or flexion of the LED board 18 and the reflection sheets 22 and 23 is hard to occur.

Further, as shown in FIGS. 7 and 9, the body portion 24 is provided with a contact portion 26 that is protruded toward the back side, that is, toward the reflection sheet 21 (the LED board 18, whereas the chassis 14) and contacts with the reflection sheet 21. The contact portion 26 is configured to contact with the chassis reflection sheet 22 of the reflection sheet 21 to directly press the chassis reflection sheet 22 from the front side as well as indirectly press the board reflection sheet 23 and the LED board 18 from the front side through the chassis reflection sheet 22. Since the contact portion 26 is partially protruded from the back side surface of the body portion 24 (surface facing the chassis reflection sheet 22), as compared to the case where the entire back side surface of the body portion contacts with the chassis reflection sheet 22, the contact area with the chassis reflection sheet 22 is smaller. In the state where the contact portion 26 is in contact with the chassis reflection sheet 22, the back side surface of the body portion 24 floats from the chassis reflection sheet 22 and is not in contact with the chassis reflection sheet 22. A gap C corresponding to the protruding dimension of the contact portion 26 is ensured between the back side surface of the body portion 24 and the front side surface of the chassis reflection sheet 22.

As shown in FIGS. 14 and 16, the contact portion 26 is located in the body portion 24 away from the attachment portion 25, in particular, in the outer edge of the body portion 24. That is, it can be said that the contact portion 26 is located at the position furthest from the attachment portion 25 in the body portion 24. In the body portion 24 according to this embodiment, a part from the attachment portion 25 to the contact portion 26 has predetermined elasticity and thus, can be elastically deformed depending on stress applied. The pairs of contact portions 26 (four in total) are provided at each of positions across the shaft portion 25a of the attachment portion 25 in the body portion 24. Describing in detail, the contact portions 26 are each arranged at intervals of about 90 degrees in the body portion 24, that is, on two straight lines that pass the centers of the body portion 24 and the attachment portion 25 and are orthogonal to each other. That is, the contact portions 26 are arranged symmetrically about the shaft portion 25a of the attachment portion 25 in the body portion 24. Accordingly, the distances between the shaft portion 25a of the attachment portion 25 and the contact portions 26 are the same as one another. The two straight lines connecting the diagonally disposed contact portions 26 to each other coincide with the long-side direction and the short-side direction of the attachment portion 25. It can be said that each contact portion 26 is a point when viewing the plate surface of the body portion 24 in a plan view. Thus, since the contact points of the board holding member 20 with the chassis reflection sheet 22 are distributed in the plate surface of the body portion 24 at regular intervals in a well-balanced manner, the board holding member 20 can be stably supported to the chassis reflection sheet 22 without causing rattling (FIG. 6).

As shown in FIGS. 7 and 9, each contact portion 26 is almost hemispherical as a whole, and its circumferential surface (contact surface with the chassis reflection sheet 22) is formed of a spherical surface. Accordingly, each contact portion 26 is in point-contact with the chassis reflection sheet 22. As a result, the contact area of each contact portion 26 with the chassis reflection sheet 22 is minimum.

Figure 13:
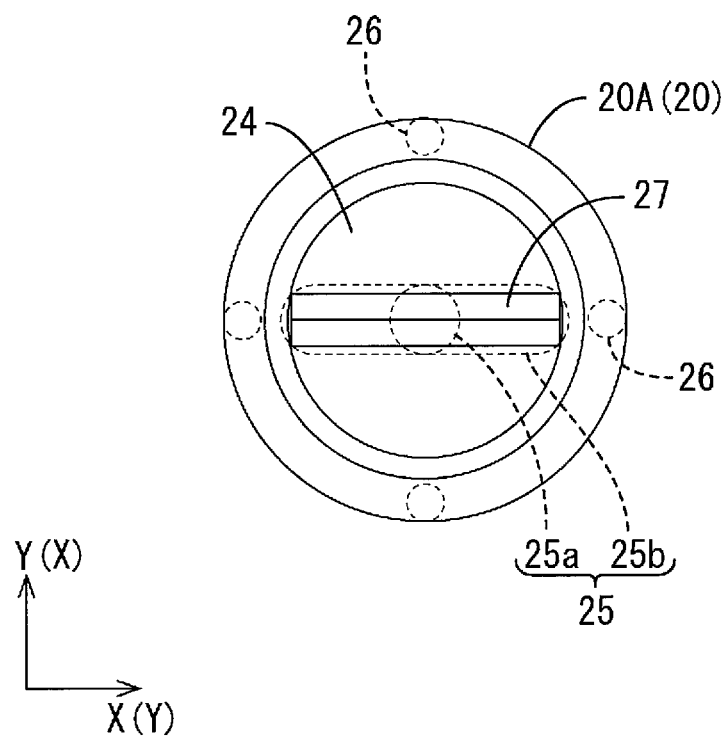
FIG. 13 is a plan view of a monofunctional board holding member.

Next, difference between the two types of board holding members 20 in configuration will be described. As shown in FIGS. 7 and 9, a gripping portion 27 protruded toward the front side is provided on the front side surface of the body portion 24 of the monofunctional board holding member 20A. The operator can perform the attaching and detaching operation of the monofunctional board holding member 20A while gripping the gripping portion 27. As shown in FIG. 13, the gripping portion 27 has a longitudinal shape extending in one direction and is substantially rectangular (polygonal) in a plan view. For this reason, the long-side direction and the short-side direction of the gripping portion 27 can be varied with rotation of the monofunctional board holding member 20A. The long-side direction of the gripping portion 27 aligns with the long-side direction of the attachment portion 25. Accordingly, when viewing the board holding member 20 from the front side, by visually recognizing the outer shape of the gripping portion 27, the long-side direction and the short-side direction of the attachment portion 25 on the back side can easily be recognized. The gripping portion 27 is located at the center of the body portion 24 and is concentric with the body portion 24. Accordingly, the gripping portion 27 is concentric with the shaft portion 25a of the attachment portion 25 and the rotating center of the board holding member 20. The long-side dimension of the gripping portion 27 is set to be smaller than the diameter of the body portion 24. Accordingly, the outer edge (outer circumferential surface) of the gripping portion 27 is arranged inner than the outer edge (outer circumferential surface) of the body portion 24. As shown in FIG. 7, the gripping portion 27 has a substantially triangular cross section cut along the short-side direction, and both long-side surfaces are inclined. That is, it can be said that the gripping portion 27 is tapered toward its protruding end.

As shown in FIG. 9, an inclined surface 24a is formed on the outer circumference of the body portion 24 of the monofunctional board holding member 20A. The inclined surface 24a is inclined downward from the center to the outer end of the body portion 24, thereby eliminating or reducing the step that can be generated between the body portion 24 and the chassis reflection sheet 22. As a result, the outer edge of the body portion 24 (boundary between body portion 24 and the reflection sheet 21) is hard to be visually recognized as uneven brightness through the optical member 15. Although not shown, the inclined surface 24a may be provided at the multifunctional board holding member 20B.

As shown in FIGS. 7 and 9, a supporting portion 28 that is protruded toward the front side and is configured to support the optical member 15 from the back side is provided on the front side surface of the body portion 24 of the multifunctional board holding member 20B. In attaching and detaching the multifunctional board holding member 20B, the operator can perform the attaching and detaching operation while gripping the supporting portion. The supporting portion 28 is conical as a whole. Describing in detail, the supporting portion 28 is tapered so that its cross section taken along the plate surface of the body portion 24 is circular and becomes gradually smaller from a protruding bottom end toward a protruding front end. The supporting portion 28 is configured to contact with the diffuser plate 15a arranged closest to the back side (the LED 17 side) in the optical member 15, thereby supporting the diffuser plate 15a at a predetermined position. That is, the supporting portion 28 can restrict positional relationship between the optical member 15 and the LED 17 in the Z-axis direction (direction orthogonal to the surface of the optical member 15) to be constant. The protruding dimension of the supporting portion 28 is almost equal to the distance between the front side surface of the body portion 24 and the back side surface of the diffuser 15a, which is almost straight in the X-axis direction and the Y-axis direction. Accordingly, the supporting portion 28 is in contact with the substantially straight diffuser plate 15a. The protruding front end of the supporting portion 28 as a contact part with the diffuser plate 15a is rounded.

Figure 15:
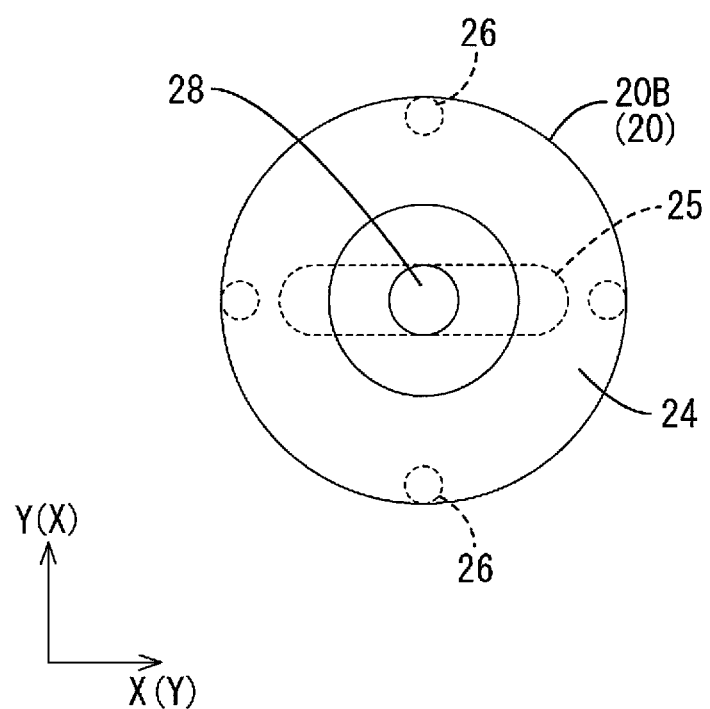
FIG. 15 is a plan view of a multifunctional board holding member.

As shown in FIG. 15, the supporting portion 28 is located at the center of the body portion 24 and is concentric with the body portion 24. Accordingly, the supporting portion 28 is concentric with the shaft portion 25a of the attachment portion 25 and the rotating center of the board holding member 20. In other words, the supporting portion 28 is located so as to overlap with the shaft portion 25a of the attachment portion 25 arranged on the back side in a plan view. In particular, since the supporting portion 28 has the similar circular sectional shape as the shaft portion 25a, when the operator performs the attaching and detaching operation of the multifunctional board holding member 20B while gripping the supporting portion 28, the attachment portion 25 can be inserted into the communicating holes 22c and 23c, the through hole 18b and the attachment holes 14e more easily. The outer diameter of the protruding bottom end of the supporting portion 28 is set to be smaller than both the short-side dimension of the body portion 24 and the short-side dimension of the LED board 18. Accordingly, the outer edge (outer circumferential surface) of the supporting portion 28 is located inner than the outer edge (outer circumferential surface) of the body portion 24.

This embodiment has the above-mentioned configuration, and its action will be described. The liquid crystal display device 10 shown in FIGS. 4 and 5 is manufactured by separately manufacturing the liquid crystal panel 11 and the backlight unit 12 and assembling them by use of the bezel 13 or the like. Especially, the assembling operation in manufacturing the backlight unit 12 will be described in detail.

In this embodiment, prior to assembling of each component to the chassis 14, LEDs 17, the board reflection sheet 23 and the diffuser lenses 19 are attached to the LED board 18. Describing in detail, first, as shown in FIG. 11, after the LEDs 17 are mounted at predetermined positions on the LED board 18, the board reflection sheet 23 is attached to cover the front side. At this time, each LED 17 on the board reflection sheet 23 is passed into each LED insertion hole 23a. After that, as shown in FIG. 12, the diffuser lenses 19 are attached to the LED board 18 so as to cover the respective LEDs 17. At this time, the attachment shaft portions 19d of the diffuser lenses 19 are fixedly adhered to the LED board 18 with an adhesive through the respective shaft portion insertion holes 23b in the board reflection sheet 23. In this manner, a so-called light source unit U formed by uniting the LEDs 17, the board reflection sheet 23 and the diffuser lenses 19 is manufactured on the LED board 18.

Figure 17:
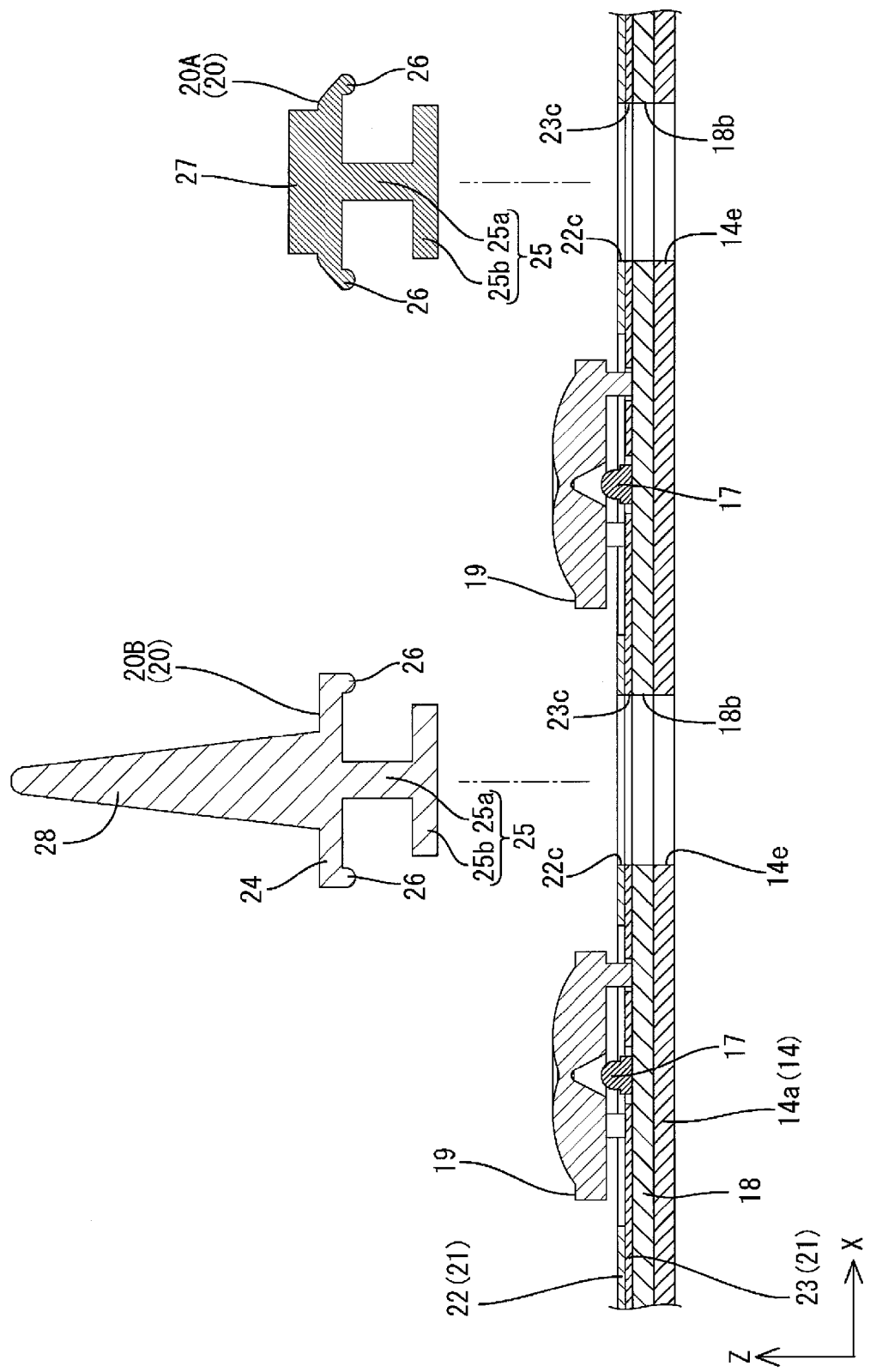
FIG. 17 is a sectional view taken along line vii-vii in FIG. 6 showing the state where the board holding members are detached from the chassis.
Figure 18:
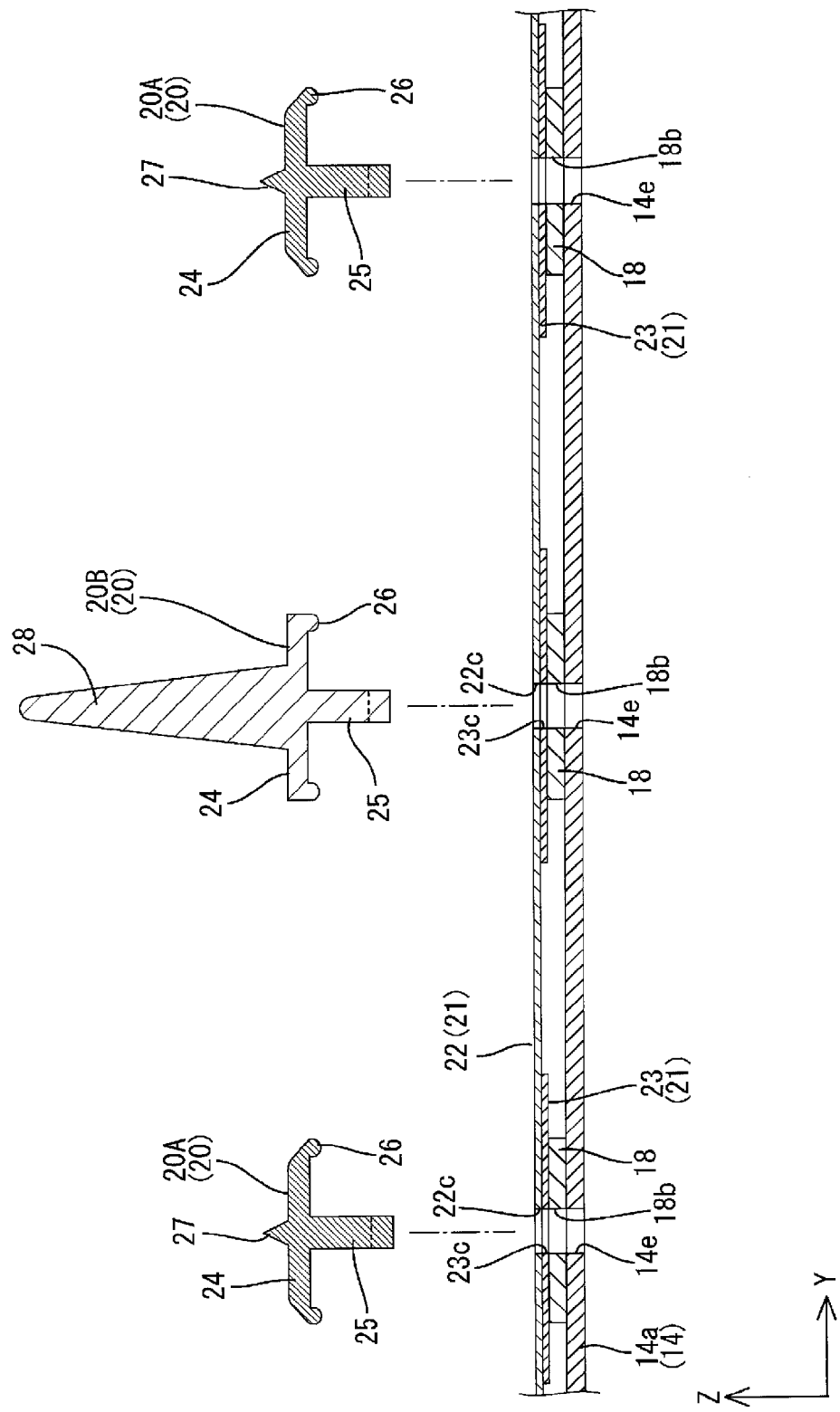
FIG. 18 is a sectional view taken along line ix-ix in FIG. 6 showing the state where the board holding members are detached from the chassis.

Subsequently, an assembling operation of each component to the chassis 14 will be described. First, the light source units U are stored from the front side of the chassis 14 through the openings 14b and are arranged at predetermined attachment positions on the bottom plate 14a. At this time, each through hole 18b of the LED board 18 in the light source unit U is communicated with each attachment hole 14e of the chassis 14. Here, the adjacent LED boards 18 in the X-axis direction are electrically connected to each other by fitting the adjacent connector portions 18a with each other. The operation of connecting the LED boards 18 aligned in the X-axis direction to each other is not necessarily performed within the chassis 14, and may be performed outside of the chassis 14. After all of the light source units U are arranged, the chassis reflection sheet 22 is arranged in the chassis 14. At this time, each diffuser lens 19 is inserted into each lens insertion hole 22b while positioning each lens insertion hole 22b of the chassis reflection sheet 22 with respect to each diffuser lens 19 in the light source unit U (FIG. 3). When the chassis reflection sheet 22 is attached, the chassis reflection sheet 22 is placed on the almost entirely of the overlapping parts of the board reflection sheet 23 with the diffuser lenses 19 in a plan view from the front side (FIGS. 7 and 8). In particular, the entirety of the lens insertion hole 22b in the chassis reflection sheet 22 is placed on the front side of the board reflection sheet 23. As shown in FIGS. 17 and 18, the communicating hole 22c in the chassis reflection sheet 22 is aligned with the communicating hole 23c in the board reflection sheet 23, the through hole 18b of the LED board 18 and the attachment holes 14e of the chassis 14 such that these holes are communicated with one another. After that, the operation of attaching the board holding member 20 is performed.

In assembling each board holding member 20 to the chassis 14, in the monofunctional board holding member 20A, the gripping portion 27 can be used as an operating part, and in the multifunctional board holding member 20B, the supporting portion 28 can be used as an operating part. With this configuration, in assembling each board holding member 20, the operator can operate the board holding member 20 while gripping the gripping portion 27 or the supporting portion 28. While the board holding member 20 is stored in the chassis 14 through the opening 14b from the front side of the chassis 14 and the long-side direction of the attachment portion 25 hidden on the back side through the body portion 24 is matched with the long-side direction of the corresponding communicating holes 22c and 23c, the through hole 18b and the attachment hole 14e (refer to FIG. 19), the attachment portion 25 is inserted into each of the holes 14e, 18b, 22c and 23c. Since the gripping portion 27 and the supporting portion 28 are located so as to be concentric with the shaft portion 25a of the attachment portion 25, the operator can easily recognize the position of the attachment portion 25 from the front side, which is excellent in the workability.

When the attachment portion 25 is inserted into the attachment hole 14e up to a predetermined depth, as shown in FIGS. 20 and 21, each contact portion 26 contacts with the chassis reflection sheet 22, and the board holding member 20 is located at the non-holding position. At the non-holding position, the long-side direction of the attachment portion 25 aligns with the long-side direction of the attachment hole 14e, and the holding portion 25b reaches the back side of the chassis 14, but does not overlap with the edge of the attachment hole 14e. By operating the gripping portion 27 or the supporting portion 28 from the non-holding position, the board holding member 20 can be rotated about the axial line (Z axis) of the shaft portion 25a of the attachment portion 25. Then, with rotation, the long-side direction of the attachment portion 25 intersects with the long-side direction of the attachment holes 14e and the holding portion 25b is rotationally displaced so as to overlap with the edge of the attachment hole 14e in a plan view. At this time, it is preferred that the rotational angle of the board holding member 20 is 90 degrees from the non-holding position, and the long-side direction of the attachment portion 25 is orthogonal to the long-side direction of the attachment hole 14e (refer to FIG. 6). Especially in the monofunctional board holding member 20A, since the gripping portion 27 has a longitudinal shape, the operator can easily recognize the rotating state from the non-holding position by viewing the gripping portion 27, thereby properly controlling the rotational angle of the monofunctional board holding member 20A. In this manner, the board holding member 20 is located at the holding position and as shown in FIGS. 7 and 9, both the edge of the attachment hole 14e of the chassis 14 and the edge of the through hole 18b of the LED board 18 are sandwiched between the body portion 24 and the holding portion 25b of the attachment portion 25, thereby preventing the board holding member 20 from carelessly moving to the front side or the back side in the Z-axis direction. In this manner, the board holding member 20 is held at the holding position. The LED board 18 is held in the state of being sandwiched between the body portion 24 of the board holding member 20 and the chassis 14, keeping the attachment state to the chassis 14. The edges of the communicating holes 22c and 23c in the reflection sheets 22 and 23 are also sandwiched between the body portion 24 and the holding portion 25b.

In the attachment state, as shown in FIGS. 7 and 9, each contact portion 26 contacts with the front side surface of the chassis reflection sheet 22. Accordingly, in the attachment state, the spherical circumferential surface of each contact portion 26 is in point-contact with the chassis reflection sheet 22, while the back side surface (surface facing the chassis reflection sheet 22) of the body portion 24 floats from the chassis reflection sheet 22 and is not in contact with the chassis reflection sheet 22, and the gap C corresponding to the protruding dimension of the contact portion 26 is ensured between the back side surface of the body portion 24 and the front side surface of the chassis reflection sheet 22. Accordingly, the contact area of the board holding member 20 with the chassis reflection sheet 22 is extremely small, and is reduced as compared to the case where the entire back side surface of the body portion contacts with the chassis reflection sheet 22. Conversely speaking, this means that the area of the part of the chassis reflection sheet 22, which is not in contact with the board holding member 20 (part that is not pressed by the board holding member 20), increases. In the attachment state, the board holding member 20 is stably supported by the four contact portions 26 symmetrically arranged with intervals of about 90 degrees. Describing in more detail, the contact portions 26 are arranged in the outer edge of the body portion 24 and thus, overlap with the outer edge of the LED board 18 in the short-side direction in a plan view. Accordingly, the outer edge of the LED board 18 in the short-side direction is supported by the contact portions 26 from the front side. The chassis reflection sheet 22 is directly pressed by the contact portions 26, while the board reflection sheet 23 and the LED board 18 are indirectly pressed by the contact portions 26 through the chassis reflection sheet 22.

After each board holding member 20 is attached to the chassis 14 as described above, the optical member 15 is attached to the chassis 14 so as to cover the openings 14b. According to the specific attaching order of the optical member 15, the diffuser 15a, and then, the optical sheets 15b are attached. As shown in FIGS. 4 and 5, the outer edge of the optical member 15 is received by the receiving plates 14d of the chassis 14 and is supported by the supporting portion 28 of each multifunctional board holding member 20B. Then, when the frame 16 is attached to the chassis 14, the outer circumference edge of the optical member 15 is pinched between the frame 16 and the receiving plates 14d. Thereby, manufacturing of the backlight unit 12 is completed. In assembling the manufactured backlight unit 12 and the liquid crystal panel 11, the liquid crystal panel 11 is placed on the frame 16 and then, the bezel 13 is covered on the front side, and they are screwed together. Thereby, the liquid crystal panel 11 is pinched between the frame 16 and the bezel 13 and integrated with the backlight unit 12, resulting that manufacturing of the liquid crystal display device 10 is completed.

In using the liquid crystal display device 10 manufactured as described above, each of the LEDs 17 provided in the backlight unit 12 is lit and an image signal is supplied to the liquid crystal panel 11, thereby displaying a predetermined image on a display screen of the liquid crystal panel 11. As shown in FIGS. 7 and 8, light emitted to each of the LEDs 17 is first incident on the light incidence surface 19a of the diffuser lens 19. At this time, most of light is incident on an inclined surface of the light incidence-side concave portion 19c of the light incidence surface 19a and thus, into the diffuser lens 19 while being refracted in a wide angle according to the inclined angle. Then, the incident light propagates in the diffuser lens 19 and is emitted from the light emitting surface 19b. However, since the light emitting surface 19b is a substantially flat spherical surface, light is emitted while being further refracted at an interface with the external air layer with a wider angle. Moreover, since the substantially bowl-like light-emitting side concave portion 19e is formed in an area where the amount of light from the LED 17 is the largest in the light emitting surface 19b, and its circumferential surface is a substantially flat spherical surface, light can be emitted while being refracted at the circumferential surface of the light-emitting side concave portion 19e in a wide angle, or can be reflected toward the LED board 18.

Since the highly directive light emitted from the LED 17 can be diffused in a wide angle by the diffuser lens 19, in-plane distribution of the light reaching the optical member 15 can be made uniform. In other words, since the area between the adjacent LEDs 17 becomes hard to be visually recognized as the dark place by using the diffuser lens 19, the interval between the LEDs 17 can be increased, thereby reducing the number of installed LEDs 17 while suppressing uneven brightness. Further, since the interval between the adjacent LEDs 17 can be increased by reducing the number of the LEDs 17, the board holding member 20 can be arranged in the widened area, and the board holding member 20 can fix the LED board 18. Since light returned to the LED board 18 is reflected toward the diffuser lens 19 by the board reflection sheet 23 and is incident on the diffuser lens 19 once, high brightness can be obtained.

Each LED 17 generates heat with lighting. Most of the heat generated from each LED 17 propagates to the chassis 14 through the LED board 18 that mounts the LED 17 thereon and is dissipated to air outside of the liquid crystal display device 10. Considering heat radiation efficiency at this time, as closeness between the LED board 18 and the chassis 14 is higher, heat transfer performances of the LED board 18 and the chassis 14 improve and heat radiation efficiency becomes higher. Conversely, closeness between the LED board 18 and the chassis 14 is lower, heat transfer performances of the LED board 18 and the chassis 14 lower and heat radiation efficiency becomes lower. In this embodiment, heat radiation efficiency is improved by fixing the LED board 18 to the chassis 14 by the board holding member 20 and adopting following configuration. That is, since the outer edge of the LED board 18 in the short-side direction is pressed by each contact portion 26 of the board holding member 20 from the front side, the LED board 18 is stably held in close contact with the chassis 14. Moreover, since the board holding member 20 has the attachment portion 25 at the center of the body portion 24 and the contact portions 26 in the outer edge, the LED board 18 is pressed by the center attachment portion 25 from the back side and by the contact portions 26 in the outer edge from the front side, thereby being stably held in a well-balanced manner. Furthermore, since the contact portions 26 are arranged at regular intervals in the body portion 24, the LED board 18 can be pressed more stably in a well-balanced manner. As described above, since the LED board 18 is fixed stably to the chassis 14 in the close contact state by the board holding members 20, heat transfer property to the chassis 14 is extremely high and therefore, heat radiation can be efficiently achieved. Therefore, since temperature inside the backlight unit 12 is hard to become high, it is possible to prevent lowering of light emission efficiency of each LED 17 and to stably obtain high brightness.

In using the liquid crystal display device 10 as described above, since each of the LEDs 17 in the backlight unit 12 is lit on or off, internal temperature environment changes and thus, each component of the liquid crystal display device 10 may be thermally expanded or thermally contracted. In the case where the chassis reflection sheet 22 and the board reflection sheet 23 among the components are thermally expanded or thermally contracted, when local deformation such as wrinkle or flexure is generated, unevenness is easy to occur in reflected light and uneven brightness occurs in light emitted from the backlight unit 12, possibly exerting a negative effect on display quality. Further, in the case where the LED board 18 is thermally expanded or thermally contracted, when local deformation such as warp and flexure is generated, contact failure occurs in the connector portions 18a, resulting in deficiency in controlling of lighting of the LED 17. Such local deformation that can be generated in the reflection sheets 22 and 23 and the LED board 18 is likely to occur in proportion to the magnitude of the pressing force from the chassis 14 and the board holding member 20 and the applied area (contact area). In order to suppress local deformation, it is preferable to reduce the pressing force or the pressed area.

Then, in this embodiment, as shown in FIGS. 7 and 9, the board holding member 20 has the contact portions 27, and the contact portions 26 of the board holding member 20 are in point-contact with the chassis reflection sheet 22, thereby reducing the contact area with the chassis reflection sheet 22. When the contact area is reduced, the area of the parts of the reflection sheets 22 and 23 and the LED board 18, which are pressed by the board holding member 20 (parts overlapping with the contacts of the contact portions 26 in a plan view), decreases, and the area of the parts that are not pressed by the board holding member 20 (parts that do not overlap with the contacts of the contact portions 26 in a plan view increases. The parts pressed by the board holding member 20 are relatively hard to be expanded or contracted due to thermal expansion or thermal contraction (the degree of freedom in expansion and contraction is low), while the parts that are not pressed by the board holding member 20 are relatively easy to be expanded or contracted due to thermal expansion or thermal contraction (the degree of freedom in expansion and contraction is high). In this embodiment, since the area of the unpressed parts is increased, the reflection sheets 22 and 23 and the LED board 18 as a whole are easy to be expanded or contracted due to thermal expansion or thermal contraction, and flexion and warp that can be generated due to expansion and contraction is preferably absorbed by the unpressed parts, flatness as a whole is maintained, and flexion and warp of the reflection sheets 22 and 23 and the LED board 18 can be prevented from occurring locally. As a result, unevenness of light reflected by the reflection sheets 22 and 23 is hard to occur and therefore, it can be prevented that uneven brightness of light emitted from the backlight unit 12 occurs.

Moreover, the contact portions 26 are located in the body portion 24 away from the holding portion 25b of the attachment portion 25 in a plan view. The contact portions 26 are portions applying the pressing force to the reflection sheets 22 and 23 and the LED board 18 from the front side (body portion 24 side), and the holding portion 25b is a portion applying the pressing force to the reflection sheets 22 and 23 and the LED board 18 from the back side (chassis 14 side). Accordingly, by arranging the contact portions 26 and the holding portion 25b to be shifted (offset) from each other in a plan view as described above, in the reflection sheets 22 and 23 and the LED board 18, the positions at which the pressing force is applied from the front side (positions of the contact portion 26) and the position at which the pressing force is applied from the back side (position of the holding portion 25b) are similarly shifted from each other. Accordingly, concentration of the stress acted on the reflection sheets 22 and 23 and the LED board 18 from the front side and the back side can be prevented. Thus, since the pressing force acted on the reflection sheets 22 and 23 and the LED board 18 can be prevented from locally becoming large, the situation in which the degree of freedom in expansion and contraction of the parts pressed by the board holding member 20 becomes extremely low and therefore, the degree of freedom in expansion and contraction of the reflection sheets 22 and 23 and the LED board 18 as a whole can be increased.

Figure 22:
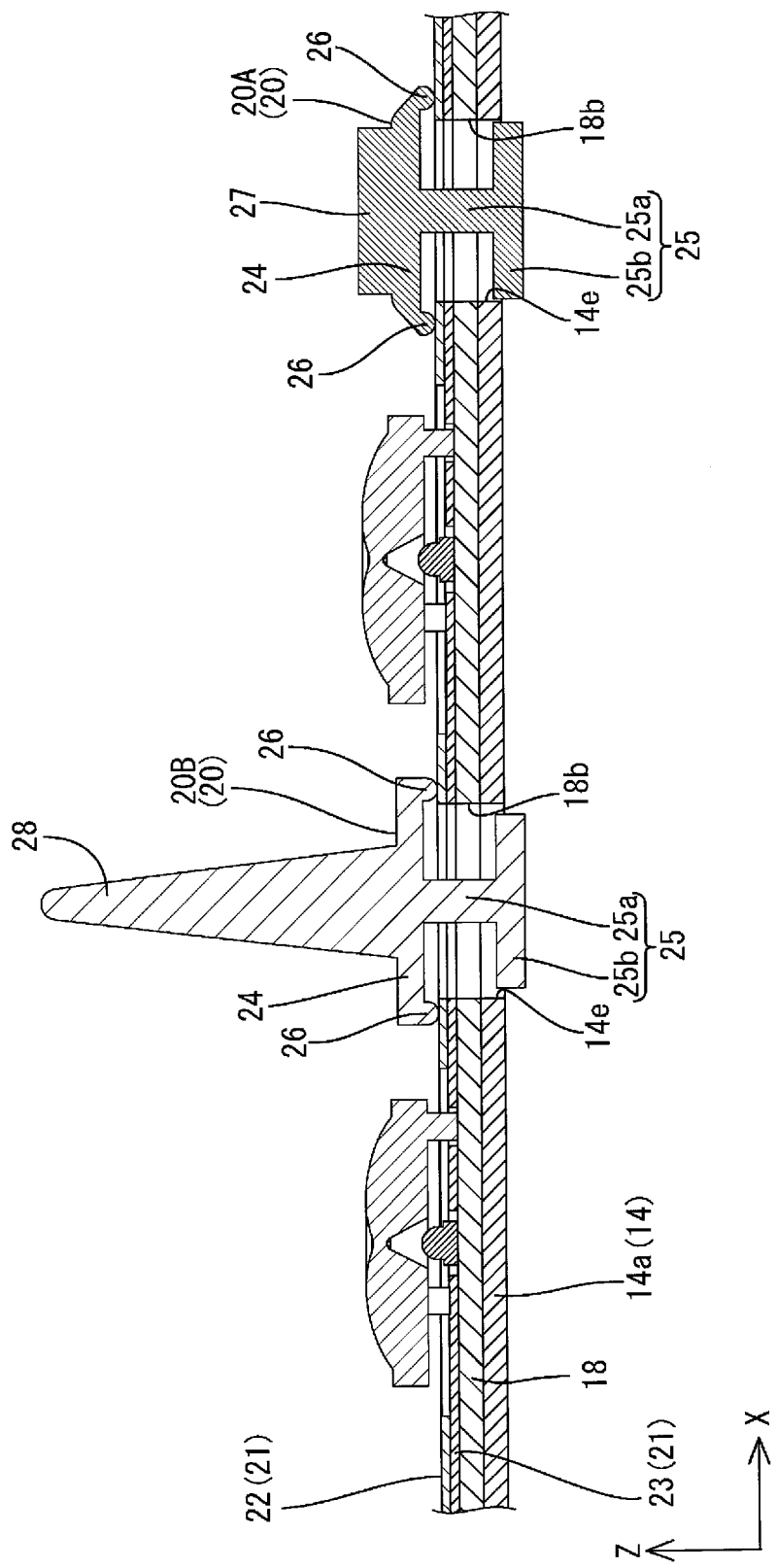
FIG. 22 is a sectional view taken along line vii-vii in FIG. 6 for describing setting in which at the non-holding position, the holding portion of the attachment portion partially enters in the attachment hole.
Figure 23:
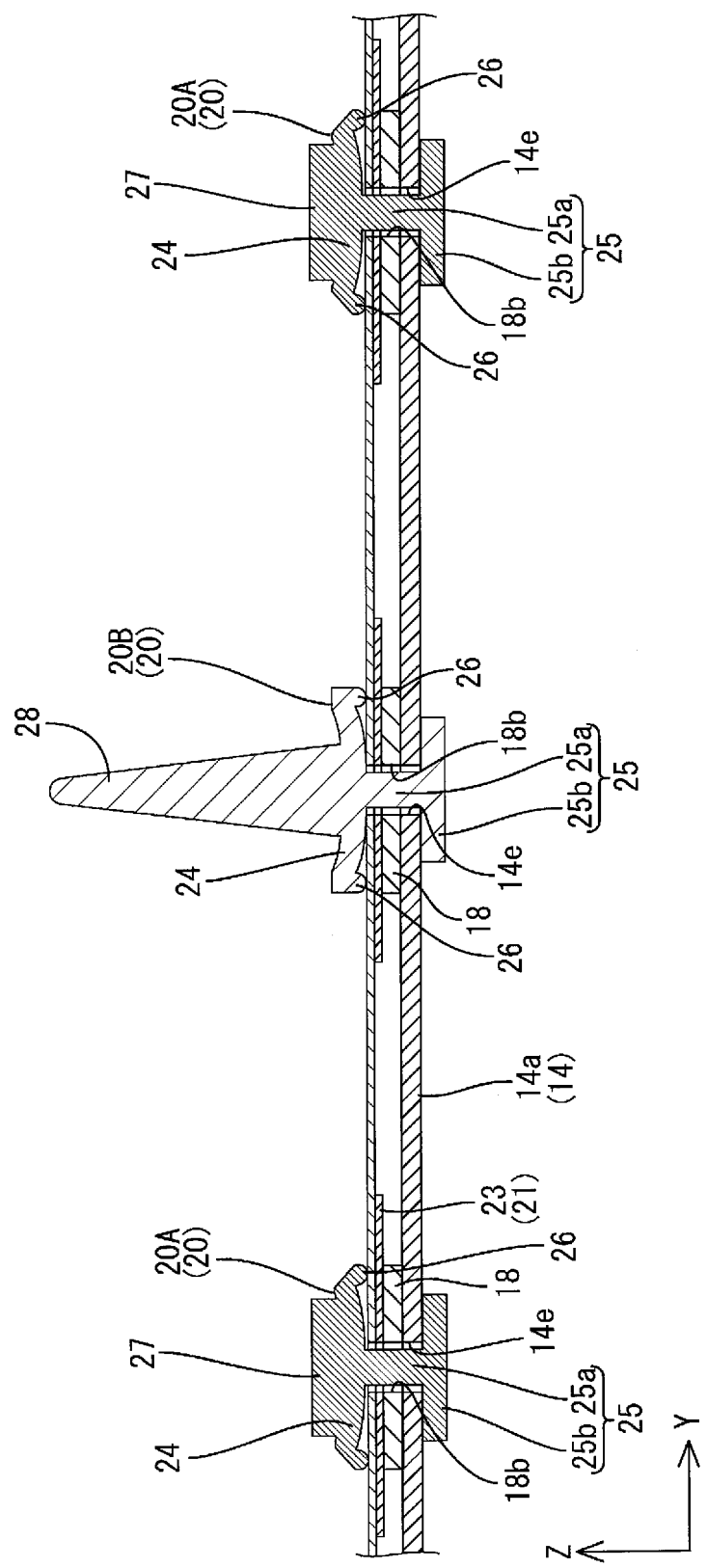
FIG. 23 is a sectional view taken along line ix-ix in FIG. 6 showing the state where the body portions are elastically deformed in the state where the board holding members are located at the holding position.

Moreover, by arranging the contact portions 27 in the body portion 24 away from the holding portion 25b in a plan view, following action and effect can be obtained. That is, in this embodiment, with the above-mentioned configuration, the part of the body portion 24 from the bottom portion 25a of the attachment portion 25 to the contact portions 26 can be elastically deformed. Thus, for example, the protruding dimension of the attachment portion 25 from the body portion 24 is set so that when the attachment portion 25 is inserted into the attachment hole 14e as shown in FIG. 22 (non-holding position), the holding portion 25b partially enters into the attachment hole 14e. With this configuration, by further pressing the gripping portion 27 or the supporting portion 28 from the state shown in FIG. 22 toward the back side, the holding portion 25b can be brought to the back side of the chassis 14 while elastically deforming the part of the body portion 24 from the bottom end 25a of the attachment portion 25 to the contact portions 26. When the board holding member 20 is rotated from this state to the holding position, as shown in FIG. 23, the chassis 14 and the LED board 18 can be elastically sandwiched between the holding portion 25b and the elastically deformed body portion 24. As a result, it can be prevented that the board holding member 20 is rotationally displaced from the holding position to the non-holding position carelessly and therefore, detaching of the board holding member 20 can be prevented. Further, since the LED board 18 can be elastically in close contact with the chassis 14, heat radiation property can also be also improved.

By arranging the contact portions 27 in the body portion 24 away from the holding portion 25b in a plan view, following action and effect can also be obtained. That is, when a dimensional error occurs in manufacturing of the board holding member 20, for example, when the protruding dimension of the contact portion 26 from the body portion 24 is larger than a set value or the length of the attachment portion 25 is shorter than a set value, the pressing force acted on the reflection sheets 22 and 23 and the LED board 18 may become excessively large (than required). Thus, in this embodiment, since some elasticity is imparted to the part of the body portion 24 from the bottom end 25a of the attachment portion 25 to the contact portions 26, as shown in FIG. 23, the possibly increased pressing force can be absorbed by elastically deforming the part of the body portion 24 from the attachment portion 25 to the contact portions 26. Thereby, it can be prevented that an excessive pressing force is applied from the contact portions 26 to the reflection sheets 22 and 23 and the LED board 18. Therefore, the degree of freedom in expansion and contraction of the reflection sheets 22 and 23 and the LED board 18 can be ensured.

In this embodiment, the through hole 18b in the LED board 18 and the communicating holes 22c and 23c in the reflection sheets 22 and 23 each include two types of holes of different dimensions in a plan view. This provides following action and effects. That is, since the clearance between each of the small through hole 18bS and the small communicating holes 22cS and 23cS and the attachment portion 25 is extremely small, the LED board 18 and the reflection sheets 22 and 23 can be positioned in the X-axis direction and the Y-axis direction. On the contrary, since clearance between each of the large through hole 18bL and the large communicating holes 22cL and 23cL and the attachment portion 25 is relatively large, even when the LED board 18 and the reflection sheets 22 and 23 are thermally expanded or contracted, the clearance held between the attachment portion 25 and each of the large through hole 18bL and the large communicating holes 22cL and 23cL can absorb the expansion and contraction of the LED board 18 and the reflection sheets 22 and 23. Further, since one small through hole 18bS, one small communicating hole 22cS and one small communicating hole 23cS are provided in each LED board 18, and other through holes 18b and communicating holes 22c and 23c are all the large through hole 18bL and the large communicating holes 22cL and 23cL, even when the LED board 18 and the reflection sheets 22 and 23 are thermally expanded or contracted, deformation such as flexion and warp can be prevented. As a result, unevenness of light reflected by the reflection sheets 22 and 23 is hard to occur and therefore, it can be prevented that uneven brightness of light emitted from the backlight unit 12 occurs.

In a lighting test performed in a manufacturing process of the liquid crystal display device 10 (backlight unit 12), the LED board 18 itself or any LED 17 has a failure, the LED board 18 having the failure needs to be detached from the chassis 14 for replacement or repair of the LED board 18. Also, when the LED board 18 or any LED 17 has a failure during use of the liquid crystal display device 10 or the liquid crystal display device 10 at the end of life is discarded, the LED board 18 needs to be detached from the chassis 14. In such cases, various components are detached from the liquid crystal display device 10 according to a reverse procedure to the above-mentioned assembling procedure at manufacturing, and after completion of detaching the optical member 15, the LED board 18 is detached from the chassis 14. The operator rotates the board holding member 20 located at the holding position about the Z axis while gripping the gripping portion 27 or the supporting portion 28. When the board holding member 20 reaches the non-holding position, engagement state (holding state) between the edge of the attachment hole 14e in the chassis 14 and the holding portion 25b is released. Thus, the board holding member 20 is detached by pulling up the board holding member 20 to the front side along the Z-axis direction. In this manner, the LED board 18 can be detached from the chassis.

As described above, the backlight unit 12 in this embodiment includes the LEDs 17 as light sources, the LED board 18 that mounts the LEDs 17 thereon, the chassis 14 that stores the LED board 18 therein and has the attachment holes 14e, the body portion 24 that sandwiches the LED board 18 between the body portion 24 and the chassis 14 to hold the LED board 18, and the board holding members 20 that each are protruded from the body portion 24 toward the chassis 14 and have the attachment portion 25 inserted into the attachment hole 14e. Each board holding member 20 can be rotated along the plate surface of the chassis 14 between the holding position at which the attachment portion 25 overlaps with the edge of the attachment hole 14e in a plan view and sandwiches the edge of the attachment hole 14e between the attachment portion 25 and the body portion 24, and the non-holding position at which the attachment portion 25 does not overlap with the edge of the attachment hole 14e in a plan view and attaching and detaching of the attachment portion 25 from the attachment holes 14e is allowed.

With this configuration, in order to attach the LED board 18 to the chassis 14, in the state where the LED board 18 is stored in the chassis 14, the attachment portion 25 of the board holding member 20 is inserted into the attachment hole 14e of the chassis 14 and then, the board holding member 20 located at the non-holding position is rotated along the plate surface of the chassis 14. Thus, the board holding member 20 reaches the holding position, and the attachment portion 25 overlaps with the edge of the attachment hole 14e in a plan view and the edge of the attachment hole 14e is sandwiched between the attachment portion 25 and the body portion 24, resulting that the board holding member 20 is attached to the chassis 14. In this state, the LED board 18 is sandwiched between the body portion 24 of the board holding member 20 and the chassis 14, thereby achieving the attachment state to the chassis 14. To detach the LED board 18 from the chassis 14, by rotating the board holding member 20 located at the holding position, the attachment portion 25 reaches the non-holding position at which the attachment portion 25 does not overlap with the edge of the attachment hole 14e in a plan view. Since detaching of the attachment portion 25 from the attachment holes 14e is allowed at the non-holding position, the board holding member 20 can be detached from the chassis 14. Thus, since the holding state of the LED board 18 by the board holding member 20 is released, the LED board 18 can be detached from the chassis 14.

Conventionally, the LED board 18 is attached with screws. Thus, the workability tends to degrade as the workability of the screw attaching and detaching operation itself is poor. However, in this embodiment, by rotating the board holding member 20 along the plate surface of the chassis 14 between the non-holding position and the holding position, the LED board 18 can easily be held by the board holding member 20 or the holding state can easily be released, which is excellent in the workability in attaching and detaching the LED board 18.

Since the board holding member 20 according to this embodiment holds the LED board 18 by holding the LED board 18 between the board holding member 20 and the chassis 14, for example, when a failure exists in any LED 17 mounted on the LED board 18 and replacement or repair of the LED board 18 is required, it is need to detach each of the board holding member 20 and the LED board 18 from the chassis 14. For example, in the case of a lamp clip holding a cold-cathode tube, only the cold-cathode tube needs to be detached. As compared to the case, the frequency of detaching the board holding member 20 tends to increase. Further, the number of LED boards 18 tends to increase with upsizing of the backlight unit 12, and the number of board holding members 20 and the number of times of the attaching and detaching operation also increase with such upsizing. Under such circumstances, by improving the workability in attaching and detaching the board holding member 20 holding the LED board 18, the workability in repairing the backlight unit 12 as well as the workability in the case of upsized backlight unit 12 can be remarkably improved.

Both the attachment portion 25 and the attachment hole 14e have a longitudinal shape. With this configuration, when the long-side direction of the attachment portion 25 aligns with the long-side direction of the attachment hole 14e, the board holding member 20 is located at the non-holding position, and the long-side direction of the attachment portion 25 intersects the long-side direction of the attachment hole 14e, the board holding member 20 is located at the holding position. As compared to the case where the attachment portion 25 and the attachment hole 14e have shape other than the longitudinal shape, such as a square, in a plan view, a large region of the attachment portion 25 that overlaps with the edge of the attachment hole 14e in a plan view can be ensured at the holding position, thereby stably holding the board holding member 20 and the LED board 18. Further, in the case where the attachment portion 25 is square in a plan view, when the board holding member 20 is rotated from the non-holding position by 90 degrees, the board holding member 20 is located at the non-holding position again. However, in this embodiment, even when the board holding member 20 is rotated from the non-holding position by 90 degrees, the board holding member 20 can be located at the holding position and therefore, the situation in which the board holding member 20 is carelessly detached is hard to occur.

The attachment portion 25 is located so as to overlap with the LED board 18 in a plan view. The LED board 18, on the other hand, has the through hole 18b that communicates with the attachment hole 14e and passes the attachment portion 25 therethrough, and the edge of the attachment hole 14e and the edge of the through hole 18b are sandwiched between the body portion 24 and the holding portion 25b. With this configuration, since the edge of the through hole 18b in the LED board 18 together with the chassis 14 are sandwiched between the body portion 24 and the holding portion 25b, the LED board 18 can be held more stably.

The LED board 18 has a longitudinal shape and has the wiring patterns WP extending in the long-side direction, and the through hole 18b has a longitudinal shape parallel to the long-side direction of the LED board 18. With this configuration, since the through hole 18b has a longitudinal shape parallel to the long-side direction of the LED board 18, that is, the extending direction of the wiring patterns WP, as compared to the case where the through hole has a longitudinal shape orthogonal to the extending direction of the wiring patterns WP, in forming the through hole 18b and the wiring patterns WP in the LED board 18, the short-side dimension of the LED board 18 can be reduced. Thereby, material costs of the LED board 18 can be cut and a space occupied by the LED board 18 in the chassis 14 can be reduced.

The LED board 18 has the plurality of through holes 18b, and the through holes 18b are constituted of the small through hole 18bS that is relatively small in a plan view and the large through hole 18bL that is relatively large in a plan view. With this configuration, the gap held between the attachment portion 25 inserted into the small through hole 18bS and the inner surface of the small through hole 18bS is smaller than the gap held between the attachment portion 25 inserted into the large through hole 18bL and the inner surface of the large through hole 18bL. Accordingly, the attachment portion 25 inserted into the small through hole 18bS can properly position the LED board 18. Since the larger gap held between the inner surface of the large through hole 18bL and the attachment portion 25 can ensure a sufficient allowable expansion/contraction amount at the time when the LED board 18 is expanded or contracted due to thermal expansion or thermal contraction, deformation such as warp of the LED board 18 is hard to occur.

The reflection sheet 21 that reflects light is interposed between the body portion 24 and the LED board 18, and the reflection sheet 21 has the plurality of communicating holes 22c and 23c that each communicates with the attachment hole 14e and the through hole 18b and pass the attachment portion 25 therethrough. The communicating holes 22c and 23c are constituted by the small communicating holes 22cS and 23cS that are relatively small in a plan view and the large communicating holes 22cL and 23cL that are relatively large in a plan view. With this configuration, the gap held between the attachment portion 25 inserted into the small communicating holes 22cS and 23cS and the inner surfaces of the small communicating holes 22cS and 23cS is smaller than the gap held between the attachment portion 25 inserted into the large communicating holes 22cL and 23cL and the inner surfaces of the large communicating holes 22cL and 23cL. Accordingly, the attachment portion 25 inserted into the small communicating holes 22cS and 23cS can properly position the reflection sheet 21. Since the larger gap held between the inner surfaces of the large communicating holes 22cL and 23cL and the attachment portion 25 can ensure a sufficient allowable expansion/contraction amount at the time when the reflection sheet 21 is expanded or contracted due to thermal expansion or thermal contraction, deformation such as warp of the reflection sheet 21 is hard to occur.

The LED board 18 has a longitudinal shape and mounts the plurality of LEDs 17 thereon in the long-side direction, and the body portion 24 is arranged in the region between the adjacent LEDs 17 on the LED board 18 in a plan view. With this configuration, the region between the adjacent LEDs 17 in the LED board 18 can be effectively used.

The body portion 24 is located at the midpoint, the point LED board 18 between the adjacent LEDs 17 in a plan view. With this configuration, since the distances between the body portion 24 and the adjacent LEDs 17 are almost equal to each other, optical effects of light emitted from the LEDs 17 on the body portion 24 can be made substantially uniform. As a result, unevenness of light emitted from the backlight unit 12 is hard to occur.

The body portion 24 is located at the center of the LED board 18 in the short-side direction in a plan view. With this configuration, the LED board 18 can be held more stably.

The circumferential surfaces of the attachment portion 25 and the attachment holes 14e include the circular arcuate surfaces in a plan view. With this configuration, in inserting or pulling the attachment portion 25 into or out of the attachment holes 14e, the circular arcuate surfaces can facilitate the inserting/pulling operation, which is excellent in the workability at insertion/pulling-out.

The attachment portion 25 includes the shaft portion 25a that is protruded from the body portion 24 toward the chassis 14 and serves as the rotational axis of the board holding member 20, and the holding portion 25b that is protruded from the shaft portion 25a in substantially parallel with the body portion 24 and is configured to sandwich the edge of the attachment hole 14e between the holding portion 25b and the body portion 24. With this configuration, the board holding member 20 can be rotated about the shaft portion 25a of the attachment portion 25 as the rotational axis between the holding position and the non-holding position, thereby holding the edge of the attachment hole 14e between the holding portion 25b and the body portion 24 or releasing the holding state.

The shaft portion 25a is concentric with the body portion 24. With this configuration, the operator can easily recognize the position of the rotational axis of the board holding member 20 by viewing the body portion 24. Thereby, the workability in attaching and detaching the board holding member 20 can be improved.

The holding portion 25b has a pair of the plate pieces 25b1 protruded from the shaft portion 25a in the mutually opposite directions. With this configuration, when the board holding member 20 is located at the holding position, since the plate pieces 25b1 of the holding portion 25b, which are protruded from the shaft portion 25a in the mutually opposite directions, sandwich the edge of the attachment hole 14e, the LED board 18 can be held stably.

The holding portion 25b is symmetric about the shaft portion 25a. With this configuration, areas of the parts of the holding portion 25b, which are protruded from the shaft portion 25a in the mutually opposite directions, overlap with the edge of the attachment hole 14e in a plan view are almost equal to each other, the LED board 18 can be held more stably.

The shaft portion 25a is arranged in a region where the holding portion 25b is formed in a plan view. With this configuration, the planar shape of the attachment holes 14e can be aligned with that of the holding portion 25b. Thereby, the shape of the attachment holes 14e can be simplified.

The shaft portion 25a has a circular cross section. With this configuration, in rotating the board holding member 20, since the shaft portion 25a is hard to interfere with the edge of the attachment hole 14e, the rotating operation can be smoothly achieved, which is excellent in the workability.

The body portion 24 is circular in a plan view. With this configuration, even when a shadow occurs due to the outer edge of the body portion 24, the shadow is hard to be visually recognized from the outside, which is preferable to prevent uneven brightness.

The body portion 24 has the gripping portion 27 and the supporting portion 28, as protrusion protruded toward the side opposite to the chassis 14. With this configuration, when attaching and detaching the board holding member 20 to/from the chassis 14, the operator can perform the attaching and detaching operation while gripping the gripping portion 27 and the supporting portion 28, which are protruded from the body portion 24 toward the side opposite to the chassis 14. Thereby, the workability in attaching and detaching the board holding member 20 can be further improved.

The gripping portion 27 has a longitudinal shape. With this configuration, the workability in rotating the board holding member 20 while gripping the gripping portion 27 can be improved. Moreover, the operator can easily recognize the rotating state of the board holding member 20 by viewing the gripping portion 27.

Both the attachment portion 25 and the attachment holes 14e have a longitudinal shape, and the long-side direction of the gripping portion 27 aligns with the long-side direction of the attachment portion 25. With this configuration, the operator can easily recognize the long-side direction and the short-side direction of the attachment portion 25 of longitudinal shape by viewing the gripping portion 27. Thereby, the workability in attaching and detaching the board holding member 20 can be improved.

The gripping portion 27 and the supporting portion 28 are concentric with the rotating center of the board holding member 20. With this configuration, the workability at the time when the operator performs the rotating operation while gripping the gripping portion 27 and the supporting portion 28.

The gripping portion 27 and the supporting portion 28 are tapered. With this configuration, a shadow due to the gripping portion 27 and the supporting portion 28 is hard to occur, which is preferable to prevent uneven brightness.

The gripping portion 27 is polygonal in a plan view. With this configuration, as compared to the case where the gripping portion is circular in a plan view, the workability at the time when the operator performs the rotating operation while gripping the gripping portion 27.

The outer edges of the gripping portion 27 and the supporting portion 28 are arranged inner than the outer edge of the body portion 24 in a plan view. With this configuration, as compared to the case where the outer edges of the gripping portion and the supporting portion are in flush with the outer edge of the body portion 24, a shadow due to the gripping portion 27 and the supporting portion 28 is harder to occur, which is preferable to prevent uneven brightness.

The chassis 14 has the opening 14b configured to emit light from the LEDs 17 and the optical member 15 is provided so as to face the LED board 18 and cover the opening 14b. The supporting portion 28 can support the optical member 15. With this configuration, by supporting the optical member 15 by means of the supporting portion 28, it can be prevented that the optical member 15 is deformed so as to get close to the LED 17.

The reflection sheet 21 that reflects light is interposed between the body portion 24 and the LED board 18, and the contact portion 26 that is protruded toward the reflection sheet 21 and contacts with the reflection sheet 21 is provided on the opposite surface of the body portion 24 to the reflection sheet 21. With this configuration, the reflection sheet 21 together with the LED board 18 can be held. Since the contact portion 26 that contacts with the reflection sheet 21 is protruded from the body portion 24 toward the reflection sheet 21, as compared to the case where the counter surface of the body portion to the reflection sheet 21 entirely contacts with the reflection sheet 21, the contact area of the board holding member 20 with the reflection sheet 21 can be reduced. Conversely speaking, the area of the reflection sheet 21, which is not in contact with the board holding member 20 and is not pressed by the board holding member 20, increases. The unpressed part is easier to expand or contract due to thermal expansion or thermal contraction that is caused by a change in thermal environment compared to the part that is in contact with the board holding member 20 and is pressed by the board holding member 20. As the area of the unpressed part increases, the degree of freedom in expansion and contraction of the reflection sheet 21 as a whole improves. Thereby, deformation such as flexion and warp due to expansion and contraction can be prevented from locally occurring.

The contact portions 26 are located in the body portion 24 away from the attachment portion 25. With this configuration, in the case where a dimensional error occurs during manufacturing of the board holding member 20, for example, when the protruding dimension of the contact portion 26 from the body portion 24 is larger than a set value, the pressing force acted on the reflection sheet 21 may become excessively large. Even in such case, since the contact portions 26 are located in the body portion 24 away from the attachment portion 25, the part of the body portion 24 from the attachment portion 25 to the contact portion 26 can be elastically deformed to absorb possibly increased pressing force. Thereby, it can be prevented that an excessive pressing force is applied from the contact portion 26 to the reflection sheet 21 and therefore, the degree of freedom in expansion and contraction of the reflection sheet 21 can be ensured. Moreover, when the body portion 24 is elastically deformed as described above, the chassis 14 is sandwiched between the body portion 24 and the holding portion 25b by the elastic force. Thus, it can be prevented that the board holding member 20 is carelessly moved from the holding position to the non-holding position due to vibration or the like. Thereby, careless detaching of the board holding member 20 can be prevented.

The attachment portion 25 is arranged at the center of the body portion 24, and the contact portion 26 is arranged in the outer edge of the body portion 24. With this configuration, by arranging the attachment portion 25 at the center of the body portion 24, the board holding member 20 can be stably held at the chassis 14. In addition, by arranging the contact portion 26 in the outer edge of the body portion 24, the maximum distance between the attachment portion 25 and the contact portion 26 can be obtained and therefore, the body portion 24 can be elastically deformed more easily. Thereby, absorption width of the dimensional error occurring in manufacturing of the board holding member 20 can be increased and therefore, the degree of freedom in expansion and contraction of the reflection sheet 21 can be ensured more stably.

At least a pair of the contact portions 26 is arranged in the body portion 24 so as to sandwich the attachment portion 25 therebetween. With this configuration, the pressing force can be applied to the reflection sheet 21 in a well-balanced manner and therefore, the reflection sheet 21 can be held while improving the degree of freedom in expansion and contraction of the reflection sheet 21. Further, the body portion 24 can be elastically deformed in the shape of a bow between a pair of the contact portions 26.

The contact portions 26 are located symmetrically about the attachment portion 25. With this configuration, the pressing force can be applied to the reflection sheet 21 in a more-balanced manner.

The light source is the LED 17. With this configuration, higher brightness and lower power consumption and the like can be achieved.

Although the first embodiment of the present invention has been described, the present invention is not limited to this embodiment and for example, may include the following modification examples. In each of the following modification examples, the same members as those in the above-mentioned embodiment are given the same reference numerals and illustration and description thereof may be omitted.

<First Modification Example of First Embodiment>

A first modification example of the first embodiment will be described with reference to FIG. 24. Here, a gripping portion 27-1 of modified shape is shown.

Figure 24:
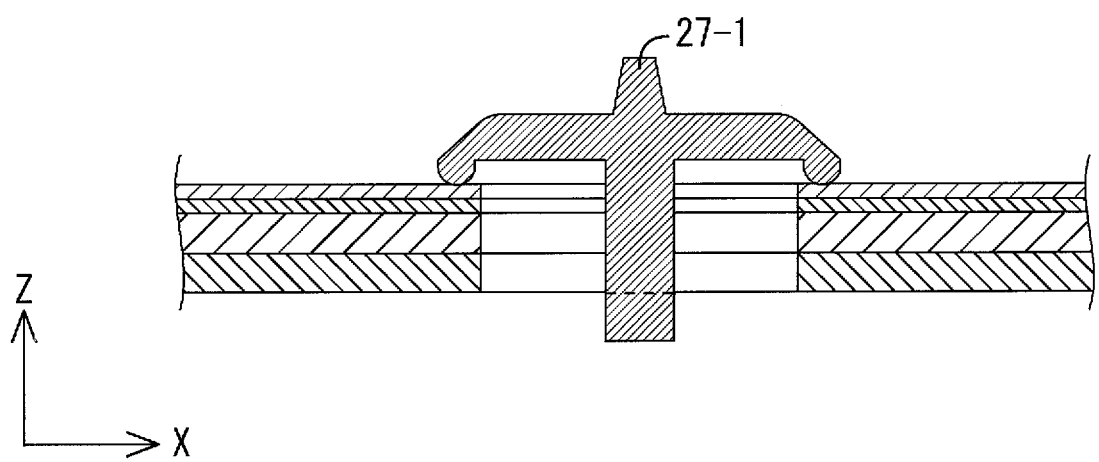
FIG. 24 is a sectional view showing a gripping portion according to a first modification example of the first embodiment.

As shown in FIG. 24, the gripping portion 27-1 has a trapezoidal cross section cut along its short-side direction. With this configuration, the thickness of the gripping portion 27-1 is larger than that of the gripping portion 27 in the first embodiment and thus, the strength is excellent.

<Second Modification Example of First Embodiment>

A second modification example of the first embodiment will be described with reference to FIG. 25. Here, a gripping portion 27-2 of modified shape is shown.

Figure 25:
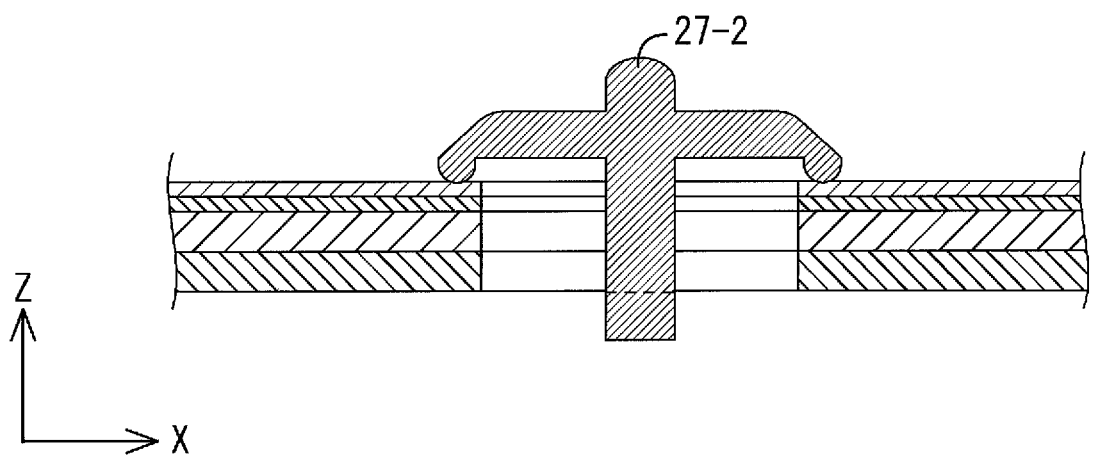
FIG. 25 is a sectional view showing a gripping portion according to a second modification example of the first embodiment.

As shown in FIG. 25, the gripping portion 27-2 is substantially block-like as a whole, and its protruding front end is circular arcuate. That is, the width (dimension in the short-side direction) of the gripping portion 27-2 is uniform except for the protruding front end. Accordingly, the strength of the gripping portion 27-2 is more excellent than the gripping portion 27 described in the first embodiment, the width of which is continuously decreased.

<Third Modification Example of First Embodiment>

A third modification example of the first embodiment will be described with reference to FIG. 26. Here, a gripping portion 27-3 of modified shape is shown.

Figure 26:
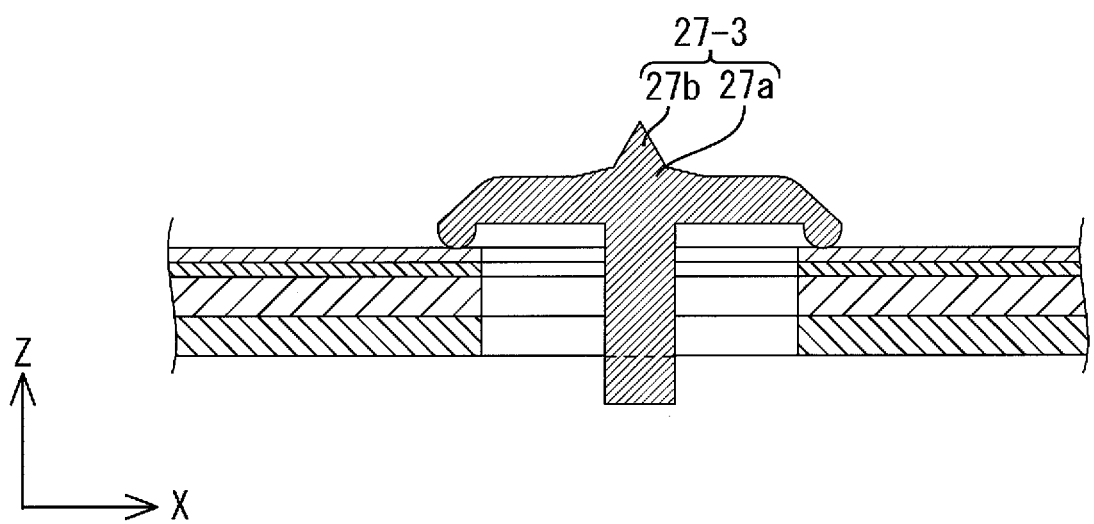
FIG. 26 is a sectional view showing a gripping portion according to a third modification example of the first embodiment.

As shown in FIG. 26, a side surface of the gripping portion 27-3 along its long-side direction (Y-axis direction) is tapered in two stages. That is, in the gripping portion 27-3, a protruding bottom end 27a and a protruding front end 27b have side surfaces having different inclination angles, and the inclination angle of the side surface of the protruding bottom end 27a is smaller than that of the side surface of the protruding front end 27b. With this configuration, a shadow due to the gripping portion 27-3 is hard to occur, which is preferable to prevent uneven brightness.

<Fourth Modification Example of First Embodiment>

A fourth modification example of the first embodiment will be described with reference to FIG. 27. Here, a gripping portion 27-4 of modified shape is shown.

Figure 27:
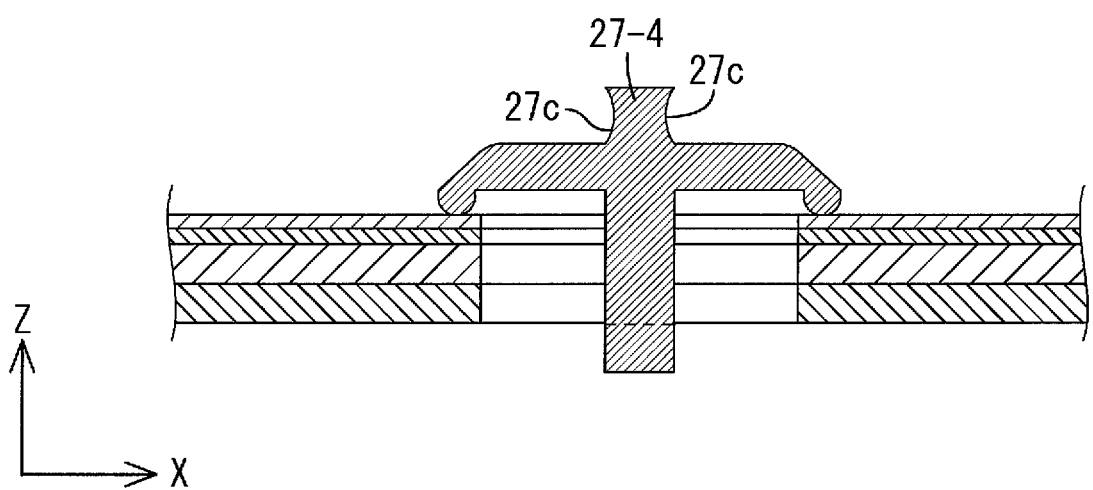
FIG. 27 is a sectional view showing a gripping portion according to a fourth modification example of the first embodiment.

As shown in FIG. 27, a concave portion 27c is formed on the side surface of the gripping portion 27-4 in its long-side direction (Y-axis direction). The concave portion 27c is circular. With this configuration, the operator can easily grip the gripping portion 27-4, which is excellent in the workability.

<Fifth Modification Example of First Embodiment>

A fifth modification example of the first embodiment will be described with reference to FIG. 28. Here, a supporting portion 28-5 of modified shape is shown.

As shown in FIG. 28, the supporting portion 28-5 is shaped like a quadrangular pyramid. That is, since the supporting portion 28-5 is rectangular (polygonal) in a plan view, when the operator performs the rotating operation while gripping the supporting portion 28-5, slipping is hard to occur, improving the workability.

<Second Embodiment>

A second embodiment of the present invention will be described with reference to FIGS. 29 to 32. In the second embodiment, a body portion 124 and an attachment portion 125, which have modified shape, in a board holding member 120 are shown. Overlapping description of the same configuration, actions and effects as those in the first embodiment is omitted.

Figure 29:
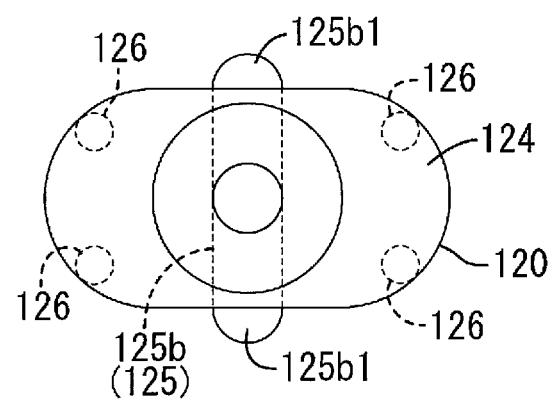
FIG. 29 is a plan view of a board holding member according to a second embodiment of the present invention.
Figure 30:
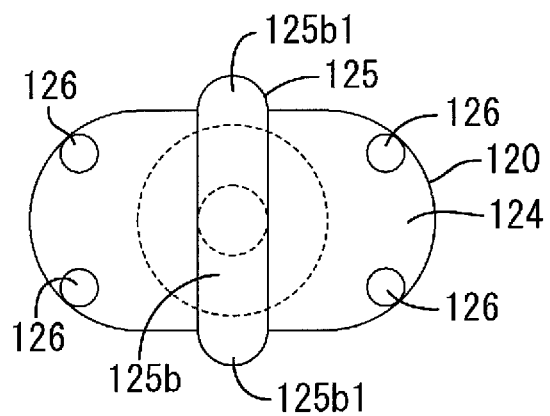
FIG. 30 is a bottom view of the board holding member.

As shown in FIGS. 29 and 30, the body portion 124 of the board holding member 120 is substantially elliptical in a plan view, and has a longitudinal shape extending in one direction. The long-side direction of the body portion 124 aligns with the short-side direction of the attachment portion 125, and is orthogonal to the long-side direction of the attachment portion 125. A pair of contact portions 26 are arranged each end of the body portion 124 in the long-side direction. The long-side dimension of the attachment portion 125 (holding portion 125b) is set to be larger than the short-side dimension of the body portion 124. Accordingly, both ends of the attachment portion 125 in the long-side direction are projected outward from both outer edge along the long-side direction of the body portion 124, and the projecting portions 125b1 can be viewed from the front side. An attachment hole 114e in a chassis 114 is formed to be larger than an attachment hole 125 in a plan view (FIG. 31).

Figure 31:
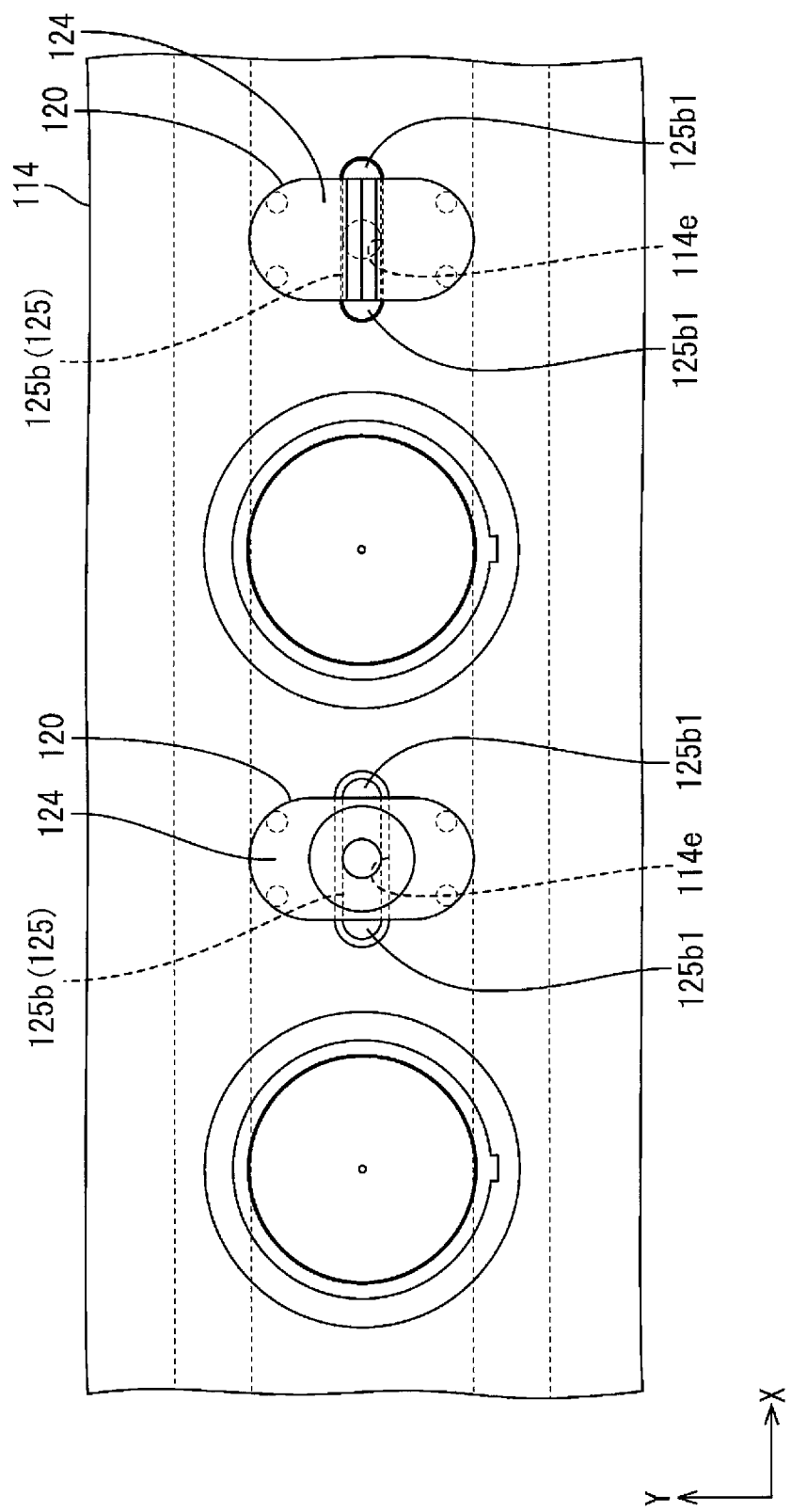
FIG. 31 is a plan view showing the state where the board holding members are located at the non-holding position with respect to the chassis.
Figure 32:
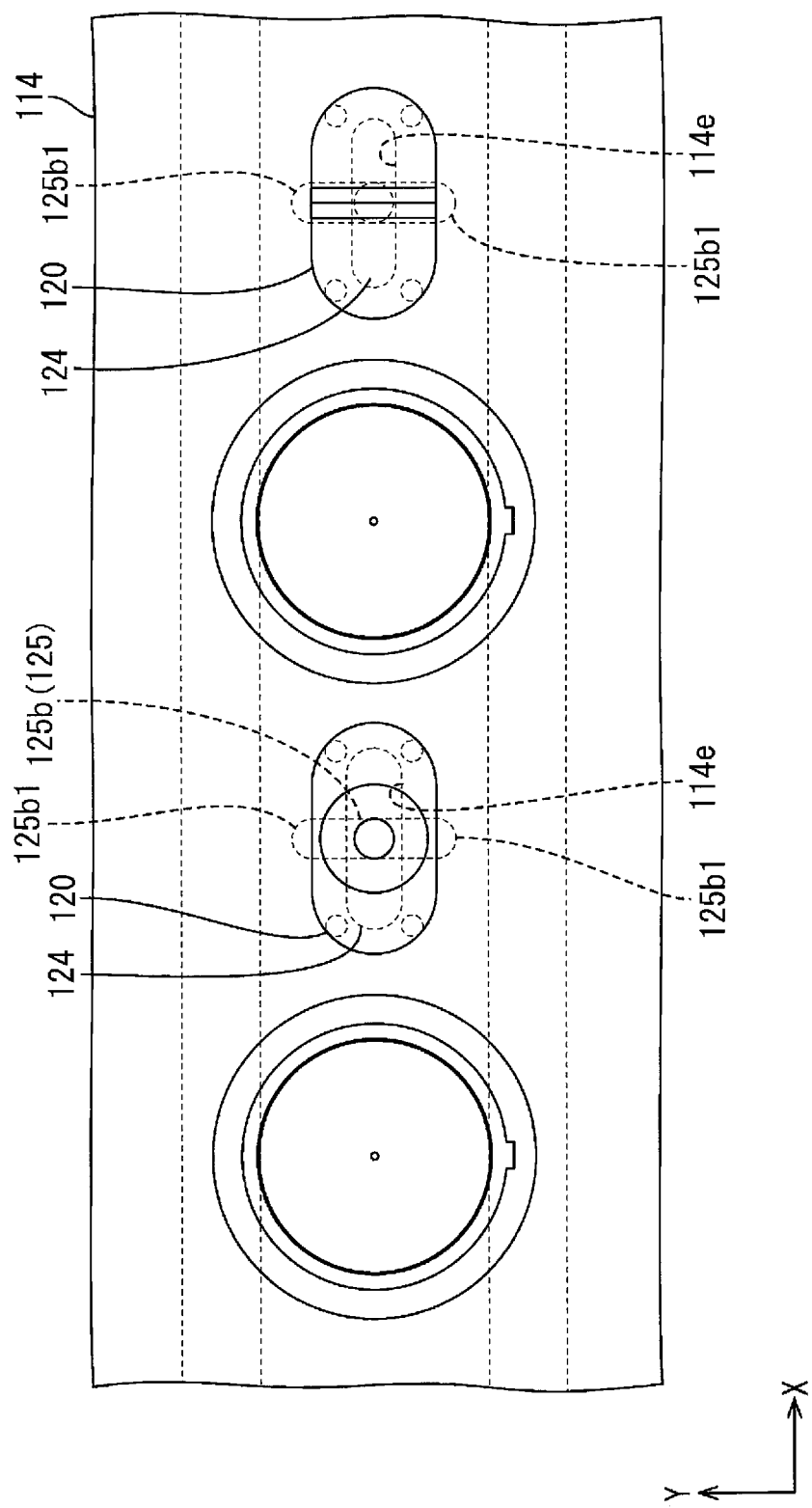
FIG. 32 a plan view showing the state where the board holding members are located at the holding position with respect to the chassis.

To attach the board holding member 120 to the chassis 114, as shown in FIG. 31, the attachment portion 125 is inserted into the attachment hole 114e while the long-side direction of the attachment portion 125 is matched with the long-side direction of the attachment hole 114e, and the board holding member 120 is located at the non-holding position. At the non-holding position, since the projecting portions 125b1 of the holding portion 125b are exposed to the front side, the operator can visually recognize the projecting portions 125b1. Further, both ends of the attachment hole 114e in the long-side direction are also exposed to the front side. When being rotated from the non-holding position, the board holding member 120 is rotationally displaced such that the orientation of the body portion 124 changes and the projecting portions 125b1 overlap with an edge of the attachment hole 114e in a plan view, resulting that the operator cannot visually recognize the projecting portions 125b1. By viewing the body portion 124 and the projecting portions 125b1, the rotating state of the board holding member 120 can easily be recognized. When the board holding member 120 is rotated from the non-holding position to the holding position by about 90 degrees, as shown in FIG. 32, the long-side direction of the body portion 124 substantially aligns with the long-side direction of the attachment hole 114e and the attachment hole 114e is entirely covered with the body portion 124 from the front side. As a result, the attachment hole 114e is not exposed to the front side, thereby preventing light in the chassis 114 from leaking into the attachment hole 114e.

As described above, according to this embodiment, the body portion 124 has a longitudinal shape. With this configuration, when the board holding member 120 is rotated between the holding position and the non-holding position, the rotating state of the board holding member 120 can easily be grasped by viewing the body portion 124, which is excellent in the workability.

Both the attachment portion 125 and the attachment hole 114e have a longitudinal shape, and the long-side direction of the body portion 124 aligns with the short-side direction of the attachment portion 125. With this configuration, the operator can easily recognize the long-side direction and the short-side direction of the attachment portion 125 of longitudinal shape by viewing the body portion 124. Thereby, the workability in attaching and detaching the board holding member 120 can be improved.

The attachment portion 125 is projected outward from the outer edge of the body portion 124 in a plan view. With this configuration, the operator can easily recognize the rotating state of the board holding member 120 from the non-holding position by viewing the outer shape of the body portion 124 as well as the projecting portions 125b1 of the attachment portion 125 from the body portion 241, which is extremely excellent in workability. Moreover, the attachment hole 114e into which the attachment portion 125 is inserted can be covered with the body portion 124 of longitudinal shape at the holding position, thereby preventing exposure of the attachment hole 114e.

An outer circumferential surface of the body portion 124 includes a circular arcuate surface that is circular arcuate in a plan view. With this configuration, even when a shadow occurs due to the outer edge of the body portion 124 of longitudinal shape, the shadow is hard to be visually recognized from the outside, which is preferable to prevent uneven brightness.

<Third Embodiment>

A third embodiment of the present invention will be described below with reference to FIG. 33 or FIG. 34. In the third embodiment, a body portion 224 of a board holding member 220 has indicating portions 29. Overlapping description of the same configuration, actions and effects as those in the first embodiment is omitted.

Figure 33:
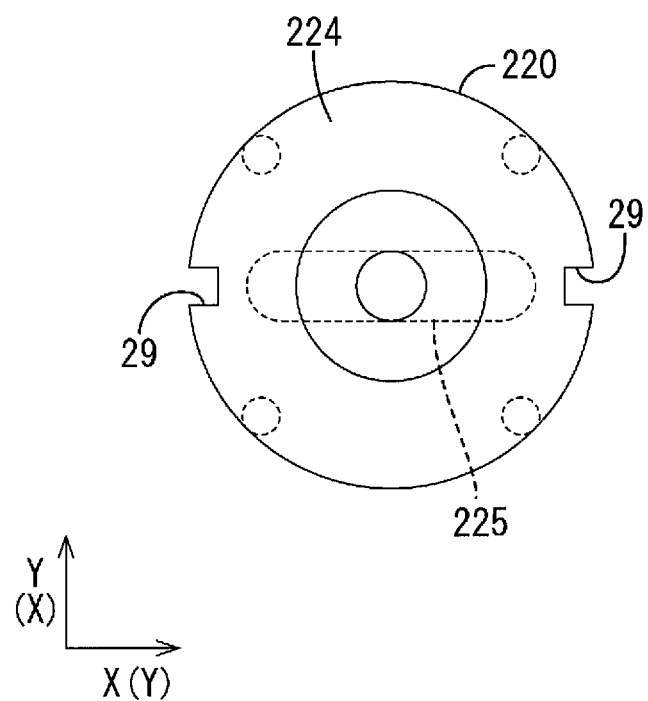
FIG. 33 is a plan view of a board holding member according to a third embodiment of the present invention.

As shown in FIGS. 33 and 34, the body portion 224 of the board holding member 220 has the indicating portions 29 as indicators (marks) of the rotating state. The indicating portions 29 are arranged in the body portion 224 away from the rotating center of the board holding member 220, specifically, arranged in the outer edge of the body portion 224. Each indicating portion 29 is formed by partially cutting the body portion 224. The pair of indicating portions 29 is arranged in the body portion 224 at angular intervals of 180 degrees, and a line connecting both the indicating portions 29 to each other passes the rotating center of the board holding member 220 and is parallel to the long-side direction of an attachment portion 225. That is, the indicating portions 29 are located in the body portion 224 to be symmetrical about the rotating center. Further, the indicating portions 29 serve as marks for representing the long-side direction of the attachment portion 225. When the board holding member 220 is rotated, the operator can easily recognize the rotating state of the board holding member 220 by viewing the indicating portions 29, which is excellent in the workability. Although the multifunctional board holding member 220 is shown in FIGS. 33 and 34, the monofunctional board holding member can have similar configuration.

As described above, in this embodiment, the indicating portions 29 displaced with rotation of the board holding member 220 are provided in the body portion 224 at the positions shifted from the rotating center of the board holding member 220. With this configuration, the operator can easily recognize the rotating state of the board holding member 220 by viewing the indicating portions 29, which is excellent in the workability.

The indicating portions 29 are formed by partially cutting the body portion 224. With this configuration, as compared to the case where the indicating portions 29 are formed by partially protruding the body portion 224, the outer shape can be compact and material costs can be cut.

The indicating portions 29 are arranged in the outer edge of the body portion 224. With this configuration, since the displacement amount of the indicating portions 29 with rotation can be ensured to the maximum, the operator can recognize the rotating state of the board holding member 220 more clearly, which is more excellent in the workability.

The pair of indicating portions 29 is arranged in the body portion 224 so as to be symmetrical about the rotating center of the board holding member 220. With this configuration, the operator can recognize the rotating state of the board holding member 220 more clearly, which is more excellent in the workability.

The third embodiment of the present invention has been described. However, the present invention is not limited to the embodiment and may include following modification examples. In each of the following modification examples, the same members as those in the above-mentioned embodiment are given the same reference numerals and illustration and description thereof may be omitted.

<First Modification Example of Third Embodiment>

A first modification example of the third embodiment will be described with reference to FIG. 35 or FIG. 36. Here, a body portion 224-1 of longitudinal shape has indicating portions 29-1.

As shown in FIGS. 35 and 36, the body portion 224-1 is substantially elliptical in a plan view and has a longitudinal shape extending in one direction. Each indicating portion 29-1 is formed at the center of each outer edge of the body portion 224-1 in the long-side direction. The indicating portions 29-1 are formed by partially cutting the body portion 224-1 and are located symmetrically about the rotating center. With this configuration, when the rotating operation is performed, the rotating state of the board holding member 220-1 can be recognized more clearly by viewing the indicating portions 29-1 as well as the body portion 224-1. Although the multifunctional board holding member 220-1 is shown in FIGS. 35 and 36, the monofunctional board holding member can have similar configuration.

<Fourth Embodiment>

A fourth embodiment of the present invention will be described with reference to FIGS. 37 to 40. In the fourth embodiment, an attachment portion 325 having modified configuration in a board holding member 320 is shown. Overlapping description of the same configuration, actions and effects as those in the first embodiment is omitted.

Figure 37:
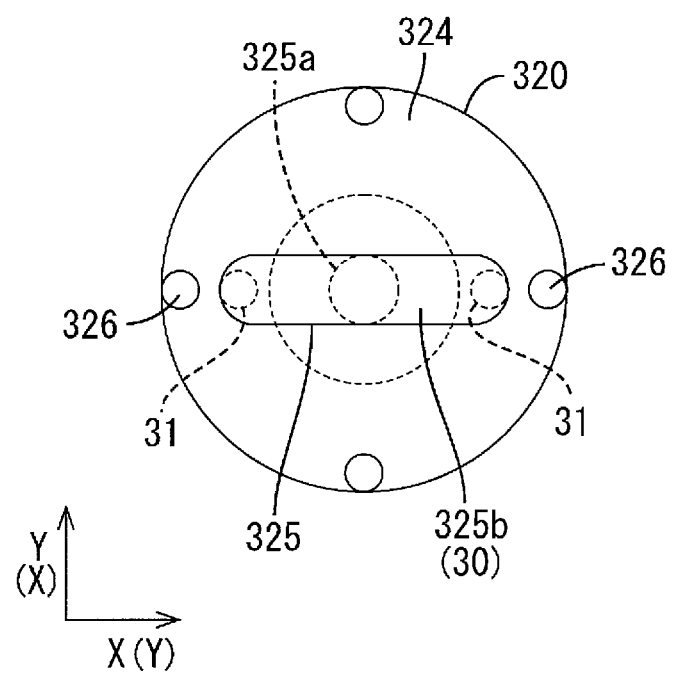
FIG. 37 is a plan view of a board holding member according to a fourth embodiment of the present invention.
Figure 38:
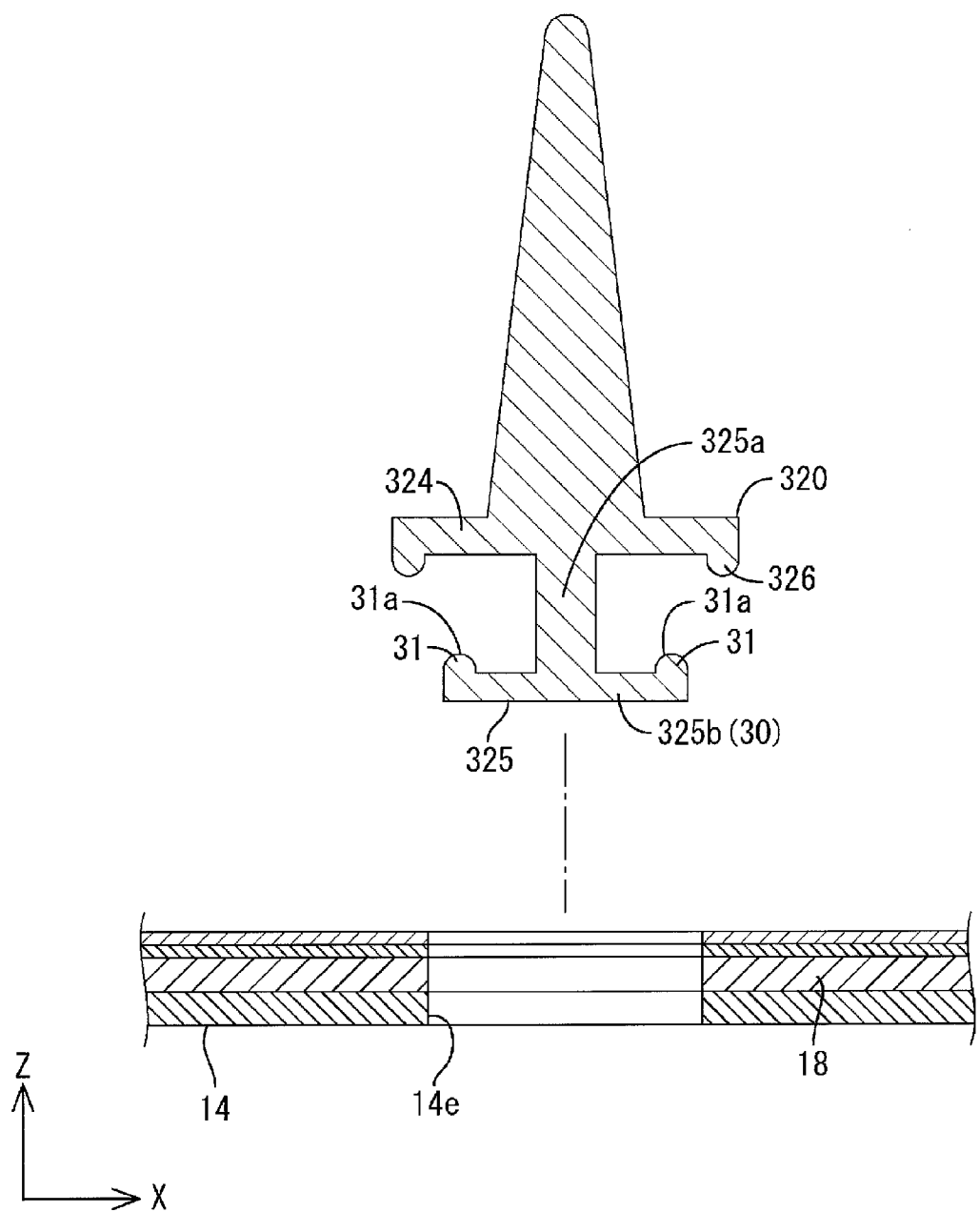
FIG. 38 is a sectional view along the X-axis direction showing the state before the board holding member is attached to the chassis.
Figure 39:
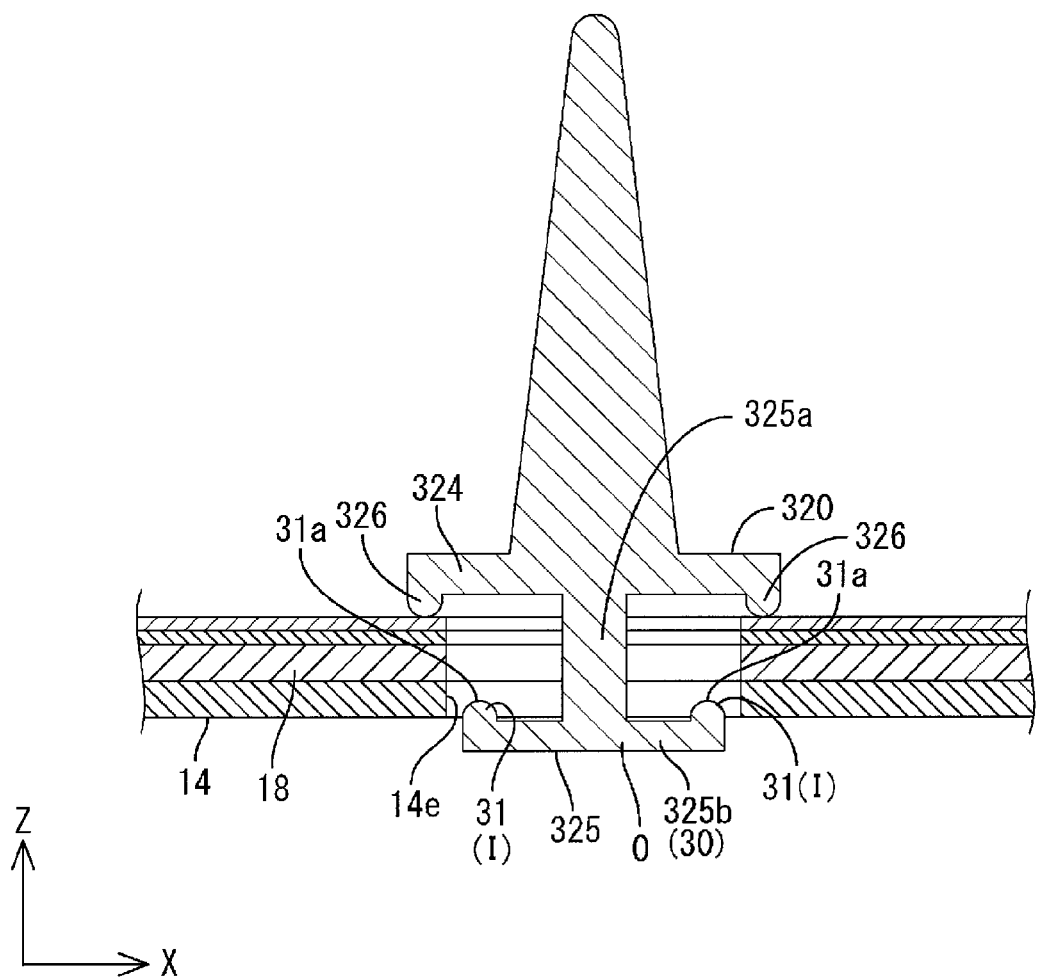
FIG. 39 is a sectional view along the X-axis direction showing the state where the board holding member is located at the non-holding position with respect to the chassis.

As shown in FIGS. 37 and 38, the holding portion 325b of the attachment portion 325 in the board holding member 320 is constituted by a holding portion body 30 protruded from the shaft portion 325a toward a body portion 324 and guiding protrusions 31 protruded from the holding portion body 30 toward the body portion 324. The holding portion body 30 has almost same configuration as that of the holding portion 25b in the first embodiment and detailed description thereof is omitted. The pair of guiding protrusions 31 is provided at both ends of the holding portion body 30 in the long-side direction, that is, both ends opposite to the shaft portion 225a. The guiding protrusions 31 are hemispherical and their circumferential surfaces are spherical surfaces, which constitute guide surfaces 31a. In the state where the attachment portion 325 is inserted into the attachment holes 14e and the board holding member 320 is located at the non-holding position with respect to the chassis 14, as shown in FIG. 39, the holding portion body 30 is protruded toward the back side of the chassis 14 and is arranged outside of the attachment holes 14e, while the guiding protrusions 31 are arranged in the attachment holes 14e. That is, at the non-holding position, in the holding portion 325b, the holding portion body 30 forms an outer part O and the guiding protrusions 31 form inner parts I.

Figure 40:
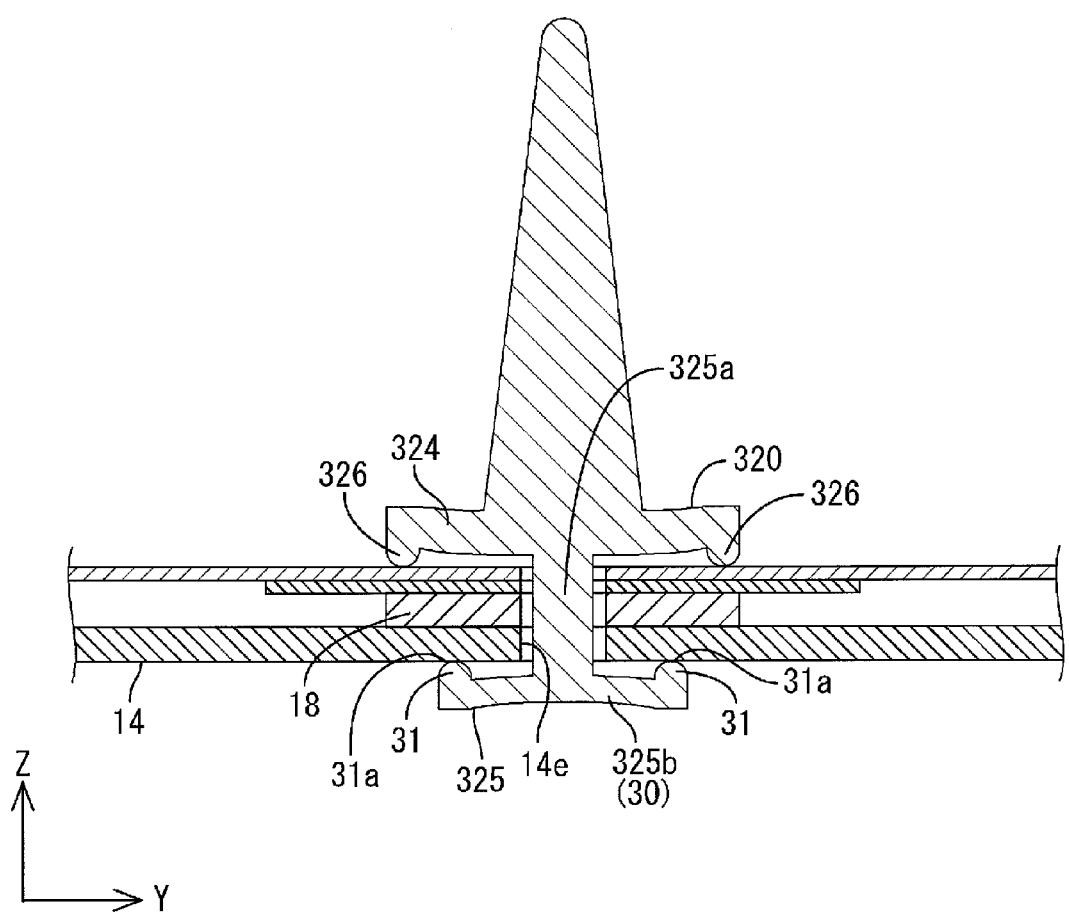
FIG. 40 is a sectional view along the Y-axis direction showing the state where the board holding member is located at the holding position with respect to the chassis.

Then, when the board holding member 320 is rotated from the non-holding position, the edge of the attachment hole 14e is in slide contact with the guiding protrusions 31 entered into the attachment hole 14e. Then, the holding portion body 30 is guided by the guide surfaces 31a of the guiding protrusions 31 to be elastically deformed using the shaft portion 325a as a fulcrum. Accordingly, the guiding protrusions 31 are displaced toward the outside of the attachment hole 14e. When the board holding member 320 reaches the holding position, as shown in FIG. 40, the guiding protrusions 31 are arranged outside of the attachment hole 14e and contact with the back side surface of the chassis 14, resulting that the LED board 18 and the chassis 14 are elastically sandwiched between the guiding protrusions 31 and the body portion 324. At this time, a part of the body portion 324 between a contact portion 326 and the shaft portion 325a is also elastically deformed. As a result, in the board holding member 320, both the body portion 324 and the holding portion body 30 are elastically deformed, thereby being held at the holding position to prevent careless rotational displacement. Although the multifunctional board holding member 320 is shown in FIGS. 37 to 40, the monofunctional board holding member can have similar configuration.

As described above, in this embodiment, the holding portion 325b has the inner parts I arranged in the attachment hole 14e and the outer part O arranged outside of the attachment hole 14e in the state where the board holding member 320 is located at the non-holding position, and the inner parts I each have the guide surface 31a that can be in slide contact with the edge of the attachment hole 14e with rotation of the board holding member 320 located at the non-holding position, thereby elastically deforming the holding portion 325b while displacing the inner parts I toward the outside of the attachment hole 14e. With this configuration, when the board holding member 320 is located at the non-holding position, the guide surface 31a is in slide contact with the edge of the attachment hole 14e, resulting that the inner part of the holding portion 325b is displaced out of the attachment hole 14e and elastically deformed. At the holding position, since the chassis 14 is elastically sandwiched between the body portion 324 and the elastically deformed holding portion 325b, it can be prevented that the board holding member 320 is carelessly moved from the holding position to the non-holding position due to vibration or the like. Thereby, careless detaching of the board holding member 320 can be prevented.

The holding portion 325b is constituted by the holding portion body 30 protruded from the shaft portion 325a in substantially parallel with the body portion 324 and the guiding protrusions 31 that are protruded from the holding portion body 30 toward the body portion 324 and have the guide surfaces 31a. The holding portion body 30 has the outer part O and the guiding protrusions 31 each include the inner part I. With this configuration, at the non-holding position, the guiding protrusions 31 are arranged in the attachment hole 14e. When the board holding member 20 is rotated therefrom, the guide surface 31a of the guiding protrusions 31 are in slide contact with the edge of the attachment hole 14e, resulting that the guiding protrusions 31 are displaced out of the attachment hole 14e and elastically deformed and the holding portion body 30 is elastically deformed. Thereby, the chassis 14 can be elastically sandwiched at the holding position.

The guiding protrusions 31 are arranged at ends on the side opposite to the shaft portion 325a of the holding portion body 30. With this configuration, since the distance between the shaft portion 325a and the guiding protrusions 31 in the holding portion body 30 can be ensured to the maximum, it is easy to elastically deform the holding portion body 30, thereby reducing a force necessary for rotating the board holding member 320 and improving the workability.

<Fifth Embodiment>

Figure 42:
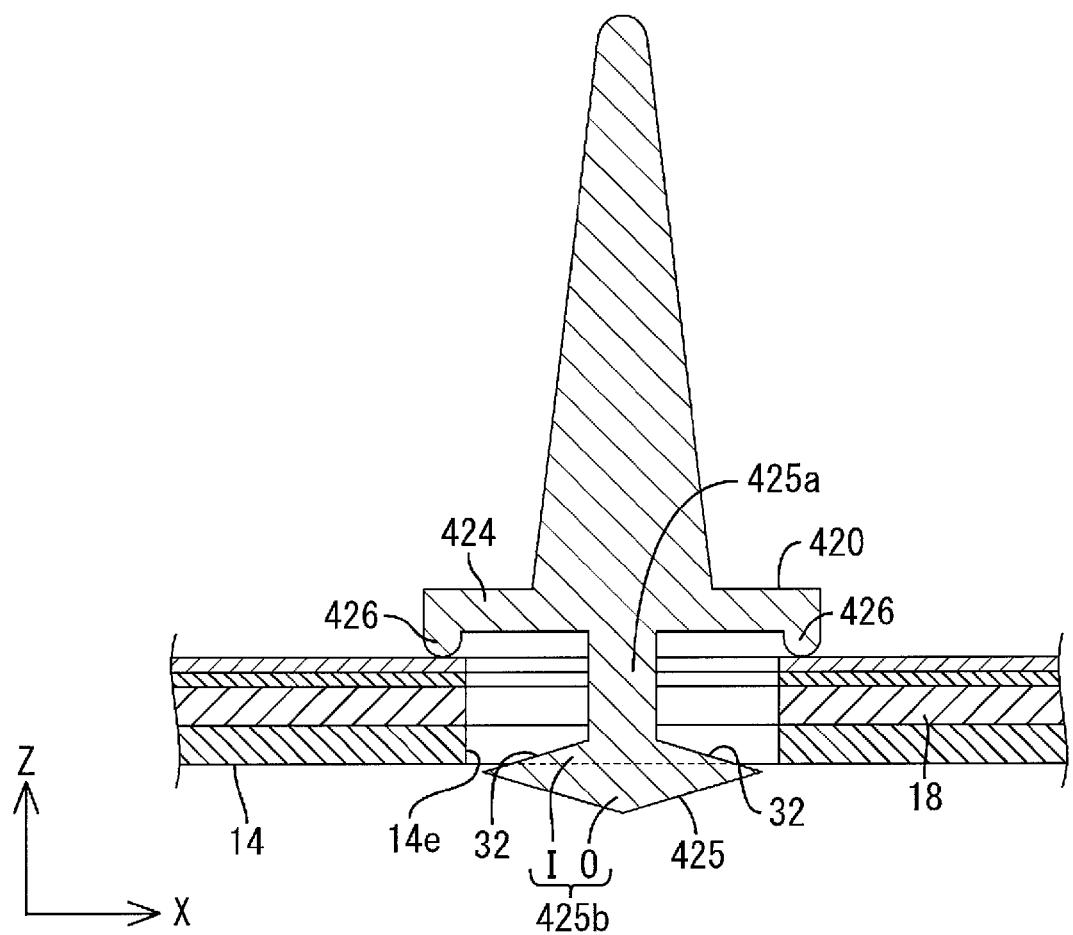
FIG. 42 is a sectional view along the X-axis direction showing the state where the board holding member is located at the non-holding position with respect to the chassis.
Figure 43:
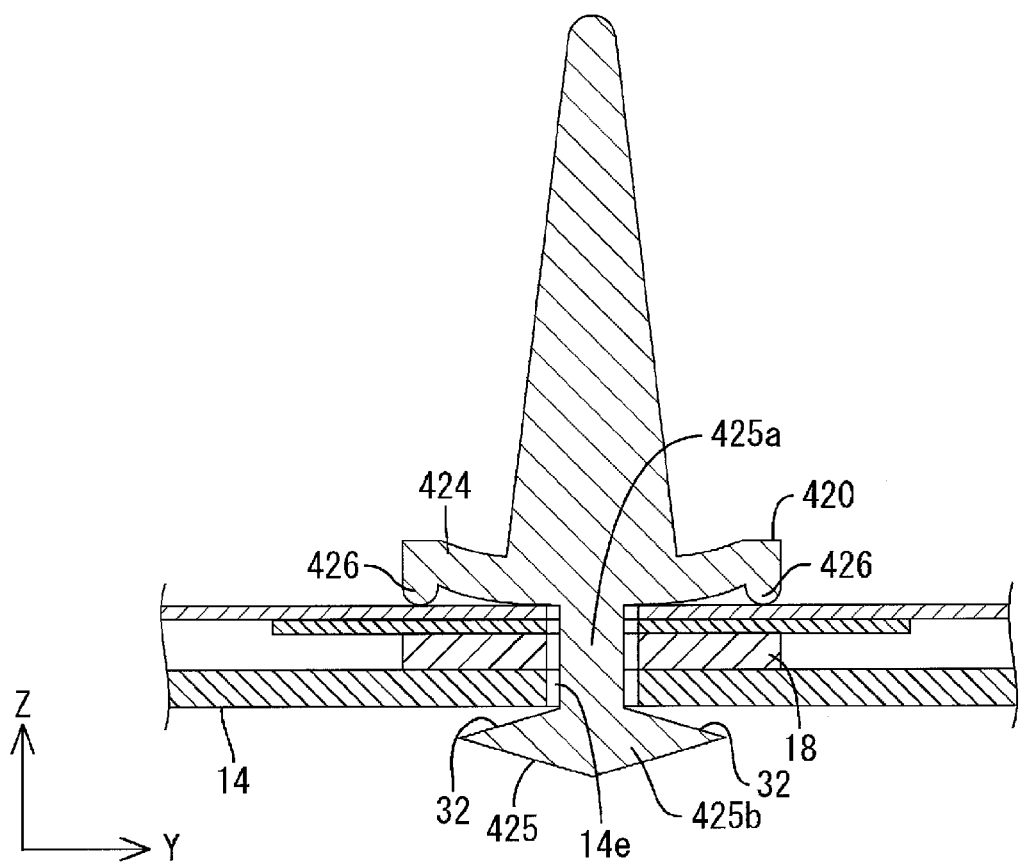
FIG. 43 is a sectional view along the Y-axis direction showing the state where the board holding member is located at the holding position with respect to the chassis.

A fifth embodiment of the present invention will be described with reference to FIGS. 41 to 43. In the fifth embodiment, an attachment portion 425 having modified configuration in a board holding member 420 is shown. Overlapping description of the same configuration, actions and effects as those in the first embodiment is omitted.

Figure 41:
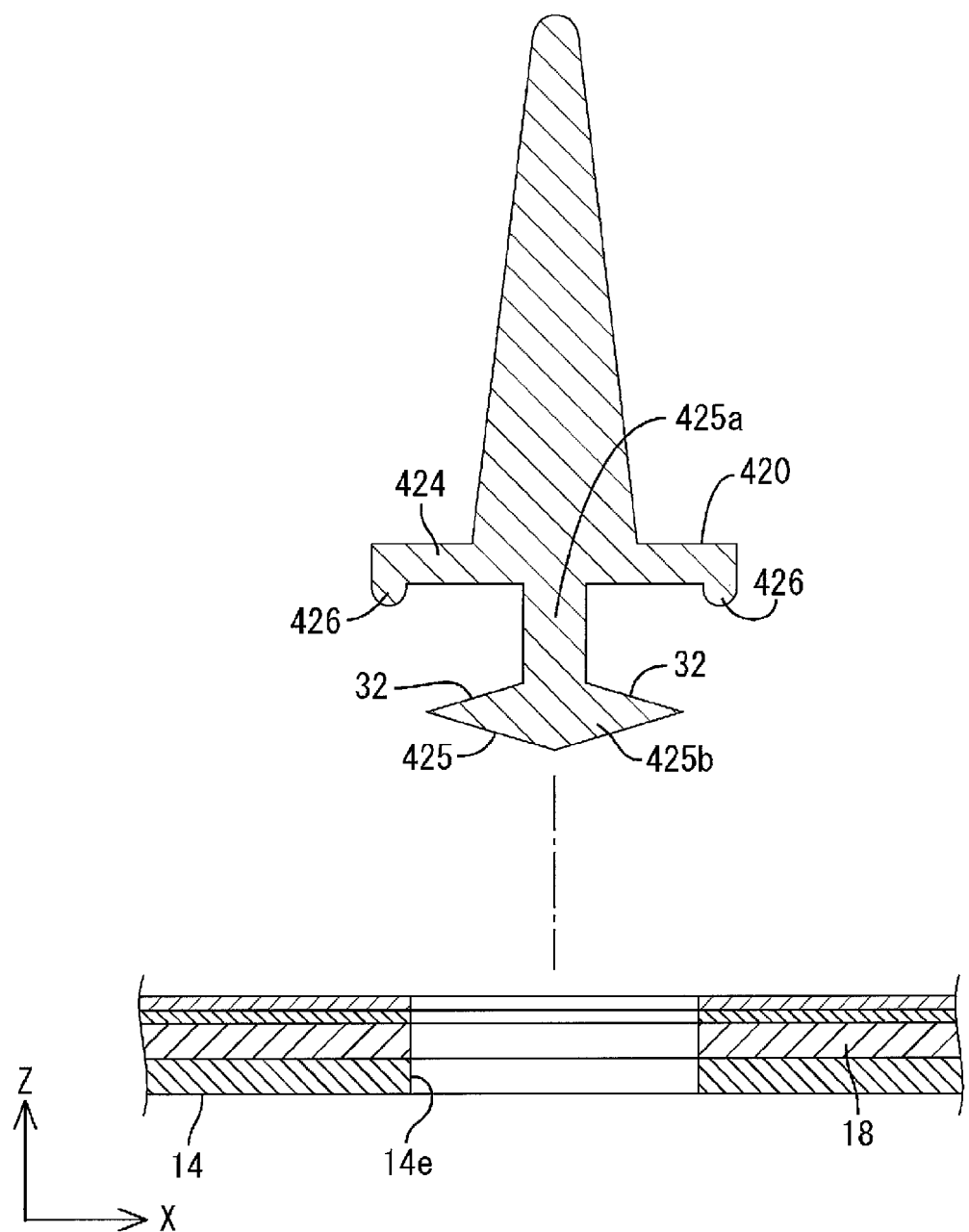
FIG. 41 is a sectional view along the X-axis direction showing the state before a board holding member according to a fifth embodiment of the present invention is attached to the chassis.

As shown in FIG. 41, a holding portion 425b of the attachment portion 425 in the board holding member 420 has a substantially rhombic cross section taken along its long-side direction. Describing in detail, the holding portion 425b is tapered such that its thickness becomes smaller as the holding portion 425b is away from the shaft portion 325a in the long-side direction (as the holding portion 425b moves from the shaft portion 425a to a protruding front end). Both a front side surface and a back side surface of the holding portion 425b are tapered as a whole, and the front side surface as a surface facing a body portion 424 constitutes a guide surface 32. The guide surface 32 is inclined such that an interval between the guide surface 32 and the body portion 424 becomes smaller as the guide surface 32 gets closer to the shaft portion 425a. In the state where the attachment portion 425 is inserted into the attachment hole 14e and the board holding member 420 is located at the non-holding position with respect to the chassis 14, as shown in FIG. 42, most of the holding portion 425b on the back side including the both ends in the long-side direction constitutes the outer part O that is protruded toward the back side of the chassis 14 and is arranged outside of the attachment hole 14e, and a remainder of the holding portion 425b on the front side constitutes the inner part I arranged in the attachment hole 14e. Here, since the guide surface 32 is formed on the entire front side surface of the holding portion 425b, that is, on both the outer part O and the inner part I. Accordingly, at the non-holding position, the guide surface 32 of the holding portion 425b is arranged on both the inner and outer sides of the attachment hole 14e.

When the board holding member 420 is rotated from the non-holding position, the edge of the attachment hole 14e is in slide contact with the guide surface 32 of the inner part I of the holding portion 425b. Then, by being guided by the guide surface 32, the inner part I of the holding portion 425b is displaced out of the attachment holes 14e, and apart between the contact portion 426 and the shaft portion 425a in the body portion 424 is elastically deformed. When the board holding member 420 reaches the holding position, as shown in FIG. 43, the entire holding portion 425b is arranged outside of the attachment hole 14e and comes in contact with the back side surface of the chassis 14, resulting that the LED board 18 and the chassis 14 are elastically sandwiched between the holding portion 425b and the elastically deformed body portion 424. Since the body portion 424 of the board holding member 420 is elastically deformed to be elastically held at the holding position in this manner, careless rotational displacement is prevented. Although the multifunctional board holding member 420 is shown in FIGS. 41 to 43, the monofunctional board holding member can have similar configuration.

As described above, in this embodiment, the attachment portion 425 includes the shaft portion 425a that is protruded from the body portion 424 toward the chassis 14 and serves as the rotational axis of the board holding member 420 and the holding portion 425b that is protruded from the shaft portion 425a in substantially parallel with the body portion 424 and is configured to sandwich the edge of the attachment hole 14e between the holding portion 425b and the body portion 424. The holding portion 425b has the inner part I arranged in the attachment hole 14e and the outer part O arranged outside of the attachment hole 14e in the state where the board holding member 420 is located at the non-holding position, and at least the inner part I has the guide surface 32 that is in slide contact with the edge of the attachment hole 14e with rotation of the board holding member 420 located at the non-holding position, thereby elastically deforming the body portion 424 while displacing the inner part I out of the attachment holes 14e. With this configuration, when the board holding member 420 located at the non-holding position is rotated, the guide surface 32 is in slide contact with the edge of the attachment hole 14e, resulting that the inner part I of the holding portion 425b is displaced out of the attachment hole 14e, and a part from the shaft portion 425a to the contact portion 426 in the body portion 424 is elastically deformed. At the holding position, since the chassis 14 is elastically sandwiched between the holding portion 425b and the elastically deformed body portion 424, it can be prevented that the board holding member 420 is carelessly moved from the holding position to the non-holding position due to vibration or the like. Thereby, careless detaching of the board holding member 420 can be prevented.

Both the holding portion 425b and the attachment hole 14e have a longitudinal shape, and the guide surface 32 is formed such that the interval between the surface of the holding portion 425b, which faces the body portion 424, and the body portion 424 becomes smaller as the guide surface 32 gets closer to the shaft portion 425a. With this configuration, the interval between the guide surface 32 and the body portion 424 becomes smaller as the guide surface 32 gets closer to the shaft portion 425a. Therefore, with rotation of the board holding member 420 from the non-holding position to the holding position, the body portion 424 is gradually elastically deformed and the site where the edge of the attachment hole 14e is in slide contact with the guide surface 32 of the inner part I is gradually displaced toward the shaft portion 425a, resulting that the inner part I is displaced out of the attachment holes 14e. Thereby, the chassis 14 can be elastically sandwiched at the holding position.

The guide surface 32 is formed on the entire surface of the holding portion 425b, which faces the body portion 424. With this configuration, even when a dimensional error of the board holding member 420 or an assembling error to the chassis 14 occurs, the guiding function of the guide surface 32 can reliably be achieved.

The fifth embodiment of the present invention has been described and however, the present invention is not limited to the embodiment and may include following modification examples. In each of the following modification examples, the same members as those in the above-mentioned embodiment are given the same reference numerals and illustration and description thereof may be omitted.

<First Modification Example of Fifth Embodiment>

Figure 45:
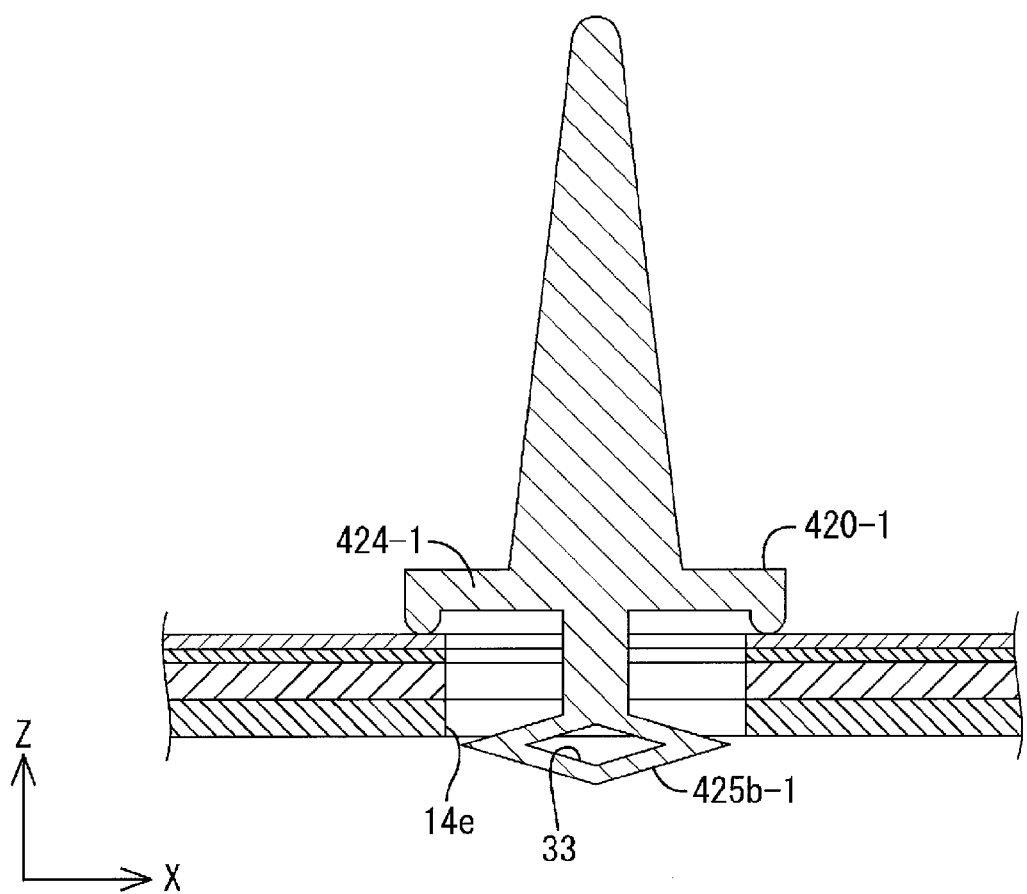
FIG. 45 is a sectional view along the X-axis direction showing the state where the board holding member is located at the non-holding position with respect to the chassis.
Figure 46:
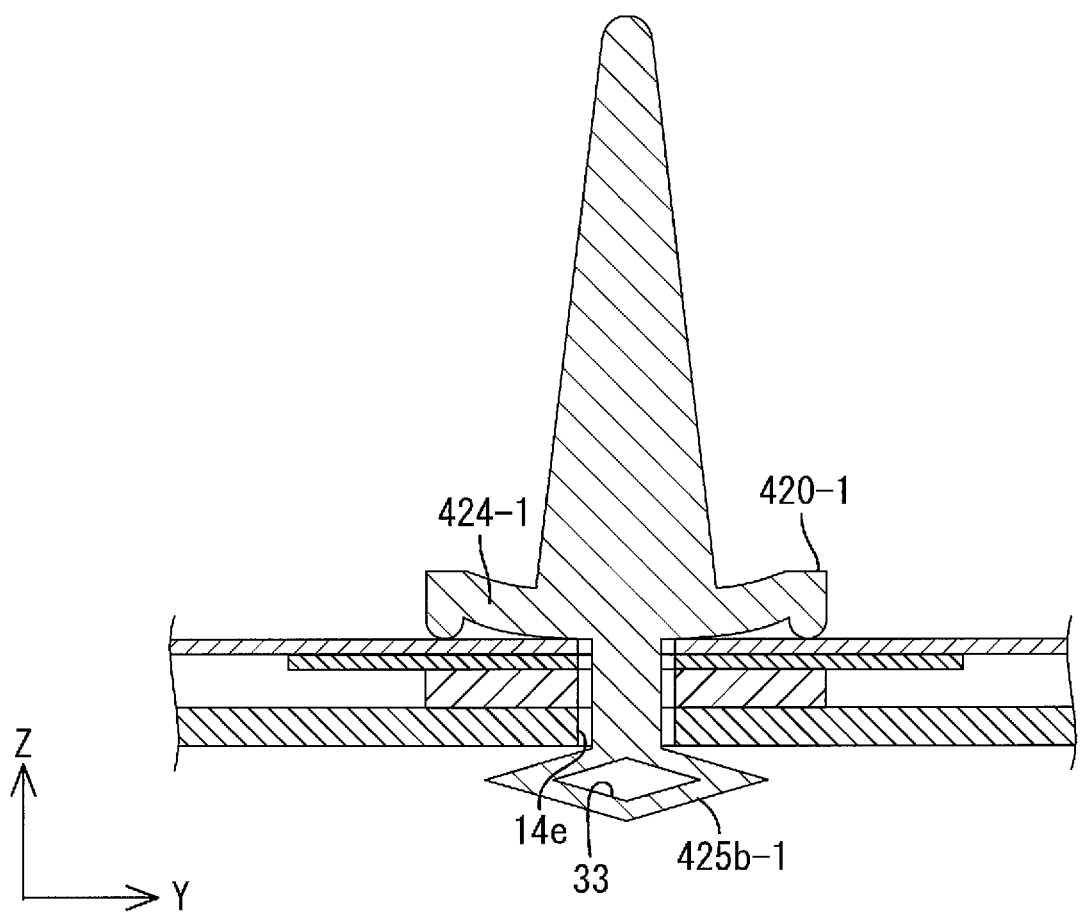
FIG. 46 is a sectional view along the Y-axis direction showing the state where the board holding member is located at the holding position with respect to the chassis.

A first modification example of the fifth embodiment will be described with reference to FIGS. 44 to 46. Here, a holding portion 425b-1 having modified configuration is shown.

Figure 44:
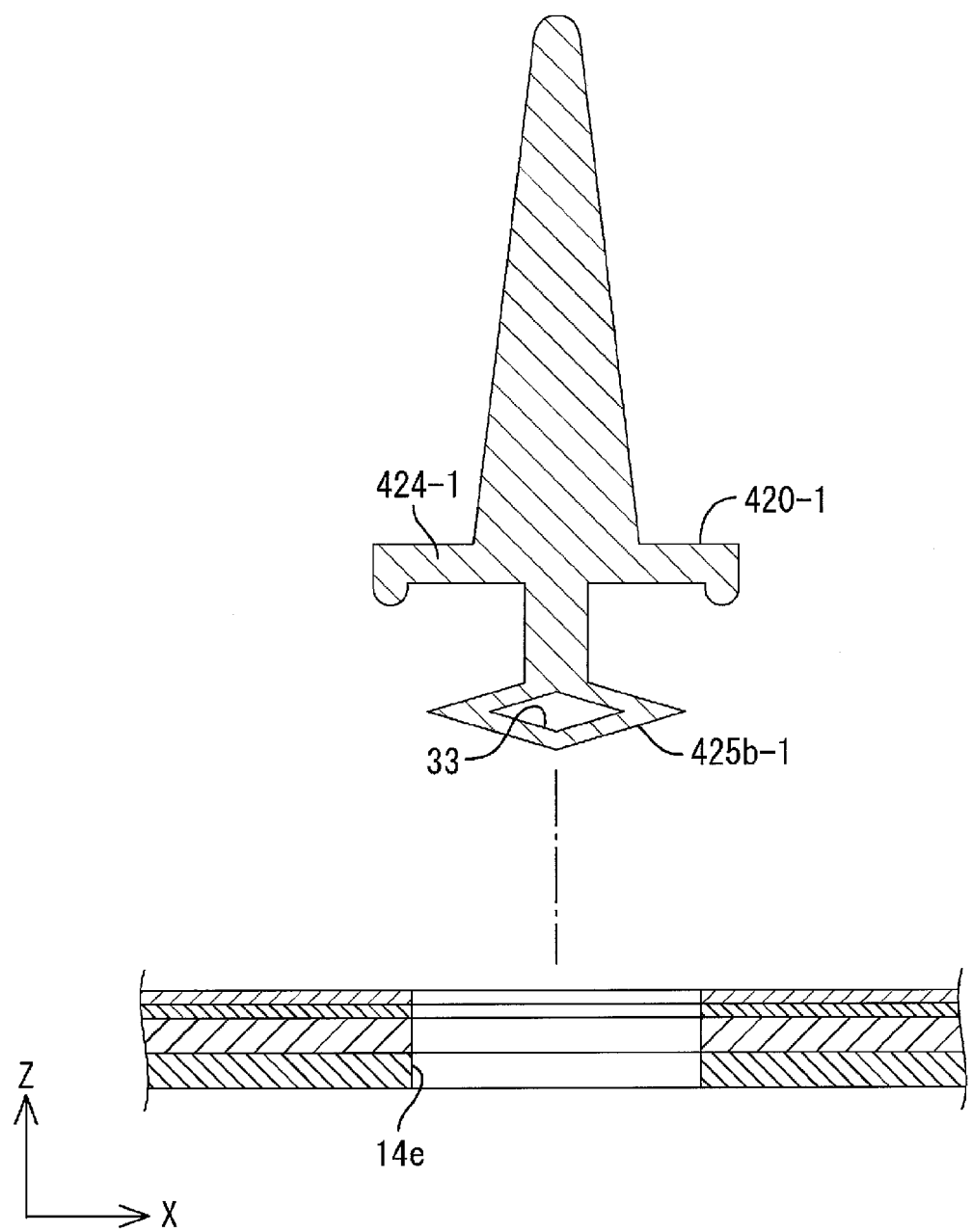
FIG. 44 is a sectional view along the X-axis direction showing the state before a board holding member according to a first modification example of the fifth embodiment is attached to the chassis.

As shown in FIG. 44, a hollow portion 33 is formed in the holding portion 425b-1. The hollow portion 33 passes through the holding portion 425b-1 in the short-side direction. The hollow portion 33 has a substantially rhombic cross section along the outer shape of the holding portion 425b-1. Thus, the holding portion 425b-1 is configured to be elastically deformed to be recessed toward the hollow portion 33. Accordingly, in rotating the board holding member 420-1 from the non-holding position shown in FIG. 45 to the holding position shown in FIG. 46, when the guide surface 32 of the holding portion 425b-1 is in slide contact with the edge of the attachment hole 14e, a body portion 424-1 is elastically deformed and the holding portion 425b-1 can also be elastically deformed. Thereby, an operating force necessary for the rotating operation can be reduced and the workability can be improved. Although the multifunctional board holding member 420-1 is shown in FIGS. 44 to 46, the monofunctional board holding member can include similar configuration.

As described above, in this modification example, the holding portion 425b-1 is formed so as to have the hollow portion 33. With this configuration, the hollow portion 33 facilitates elastic deformation of the holding portion 425b-1. Accordingly, the force necessary for rotating the board holding member 420-1 can be reduced, thereby improving the workability.

<Sixth Embodiment>

A sixth embodiment of the present invention will be described with reference to FIGS. 47 to 52. In the sixth embodiment, a rotation restricting structure restricting the rotational angle of the board holding member 20 is added. Overlapping description of the same configuration, actions and effects as those in the first embodiment is omitted. For convenience of explanation, FIGS. 47 and 50 as plan views show the state where the LED board 18 and the reflection sheets 22 and 23 are removed from a chassis 514.

Figure 47:
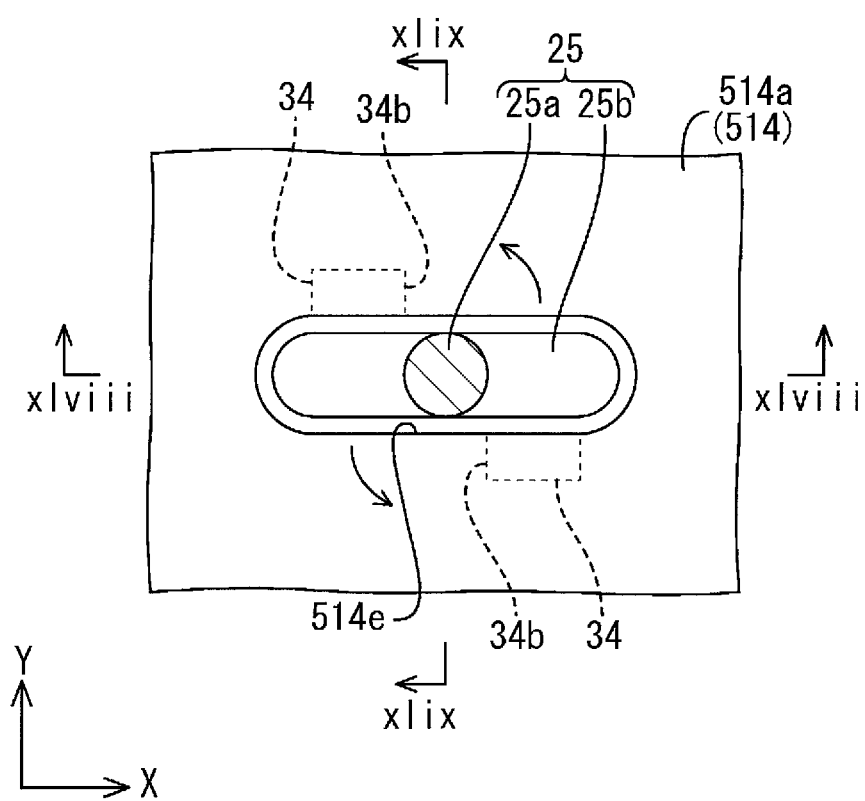
FIG. 47 is a plan sectional view showing the state where the board holding member is located at the non-holding position with respect to a chassis according to a sixth embodiment of the present invention.
Figure 48:
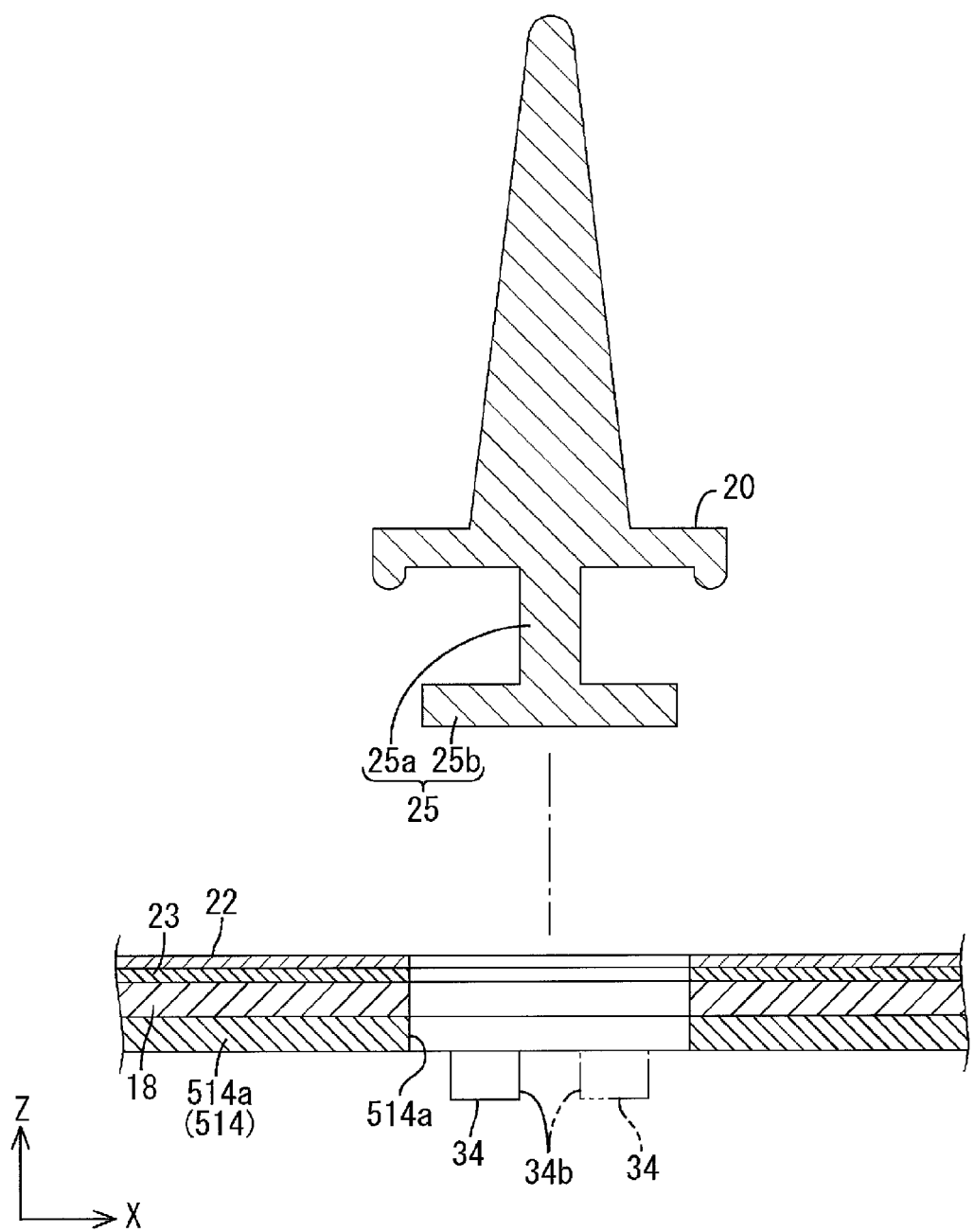
FIG. 48 is a sectional view taken along line xlviii-xlviii in FIG. 47 showing the state before the board holding member is attached to the chassis.
Figure 49:
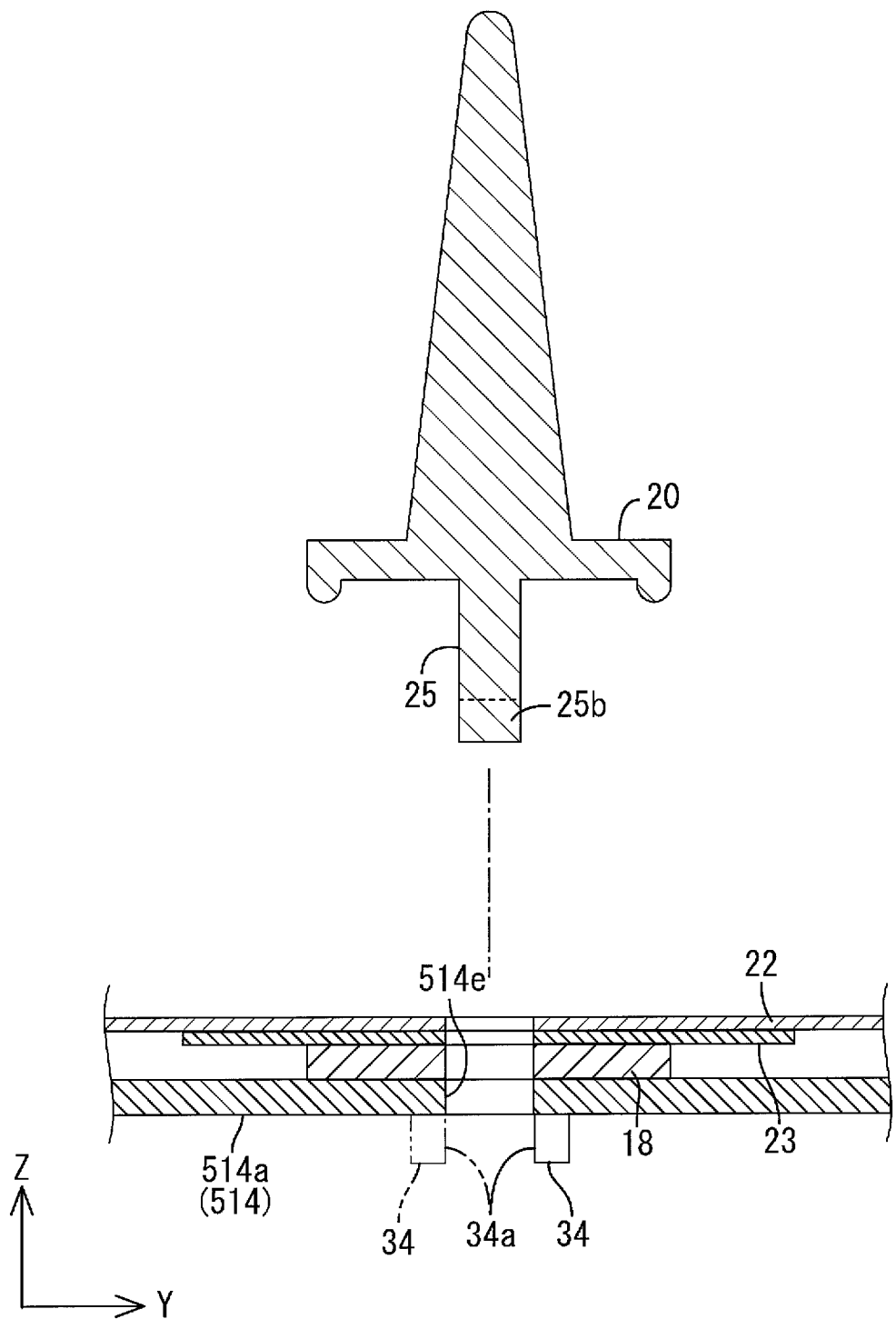
FIG. 49 is a sectional view taken along line xlix-xlix in FIG. 47 showing the state before the board holding member is attached to the chassis.

As shown in FIGS. 47 to 49, chassis-side rotation restricting portions 34 protruded from an edge of an attachment hole 514e in a bottom plate 514a of the chassis 514 toward the back side (side opposite to the LED board 18) are provided. Each chassis-side rotation restricting portion 34 is an individual component separated from the chassis 514, and is fixedly attached (fixed) to a back surface of the bottom plate 514a through an adhesive layer or the like in an integral manner. The pair of chassis-side rotation restricting portions 34 is provided in a long-side circumferential part of the attachment hole 514e and at positions shifted from the center (rotating center) in the long-side direction. Describing in detail, a pair of the chassis-side rotation restricting portions 34 has substantially rectangular shape extending in the long-side direction of the attachment hole 514e in a plan view and are arranged to be symmetrical about the center of the attachment hole 514e as a point of symmetry. The long-side direction and the short-side direction of the attachment hole 514e coincide with the long-side direction and the short-side direction of the chassis-side rotation restricting portions 34. A side surface of the outer circumferential surface of the chassis-side rotation restricting portion 34, which faces the attachment hole 514e, is in flush with a long-side inner side surface of the attachment hole 514e, and is configured to be engaged with a long-side side surface of the holding portion 25b of the attachment portion 25 when the attachment portion 25 is inserted into the attachment hole 514e at the non-holding position, which constitutes a first engaging surface 34a. Thus, the rotating direction from the non-holding position can be restricted to only one direction (counterclockwise direction shown in FIG. 47). A side surface of the outer circumferential surface of the chassis-side rotation restricting portion 34, which faces the center of the attachment hole 514e in the long-side direction, is configured to be engaged with the long-side side surface of the holding portion 25b of the attachment portion 25 when the board holding member 20 is rotated from the non-holding position by 90 degrees, which constitutes a second engaging surface 34b. Thus, the angle by which the board holding member 20 can be rotated from the non-holding position can be restricted up to about 90 degrees.

Figure 50:
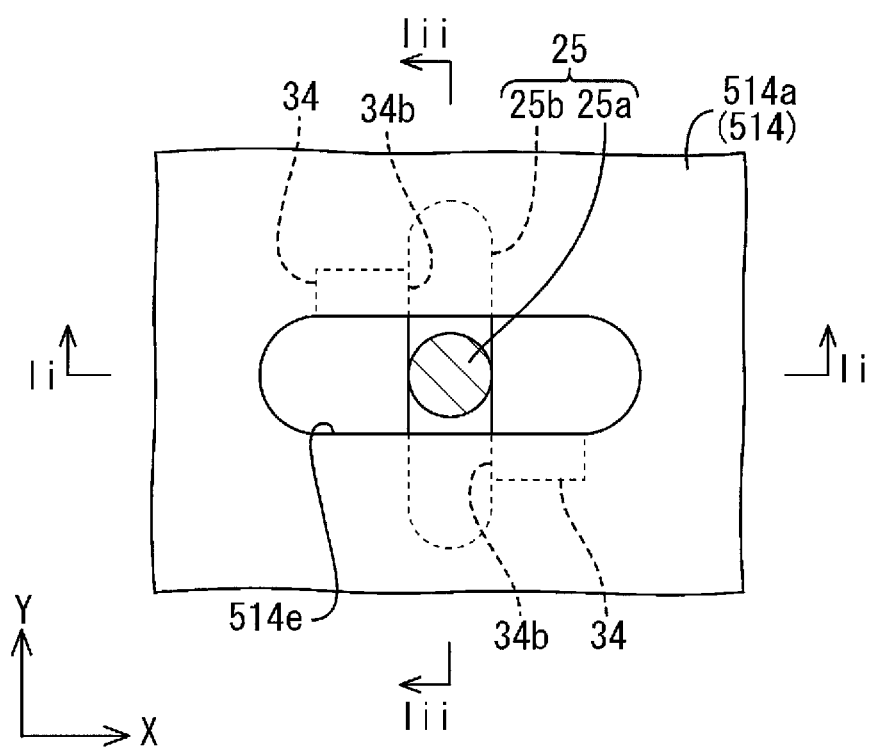
FIG. 50 is a plan sectional view showing the state where the board holding member is located at the holding position with respect to the chassis.
Figure 51:
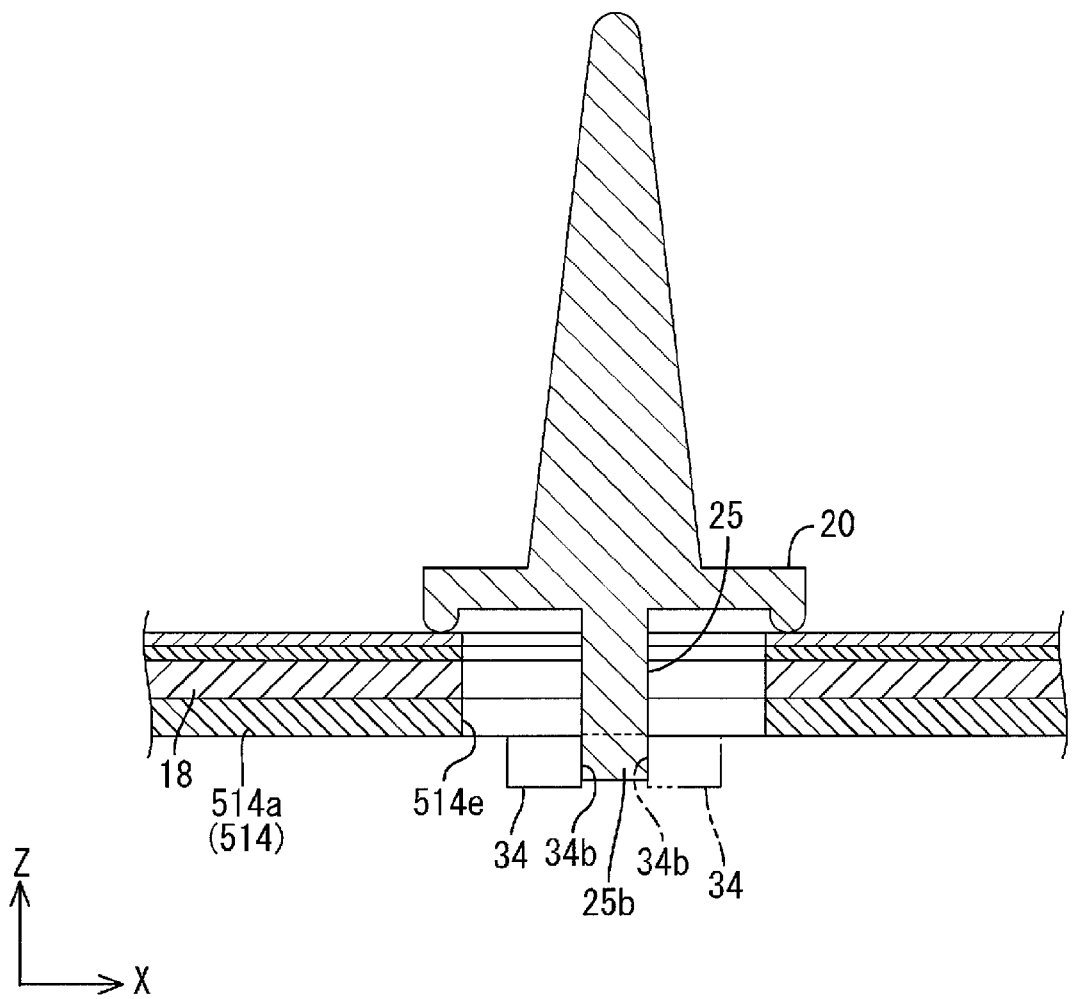
FIG. 51 is a sectional view taken along line li-li in FIG. 50 showing the state where the board holding member is located at the holding position with respect to the chassis.
Figure 52:
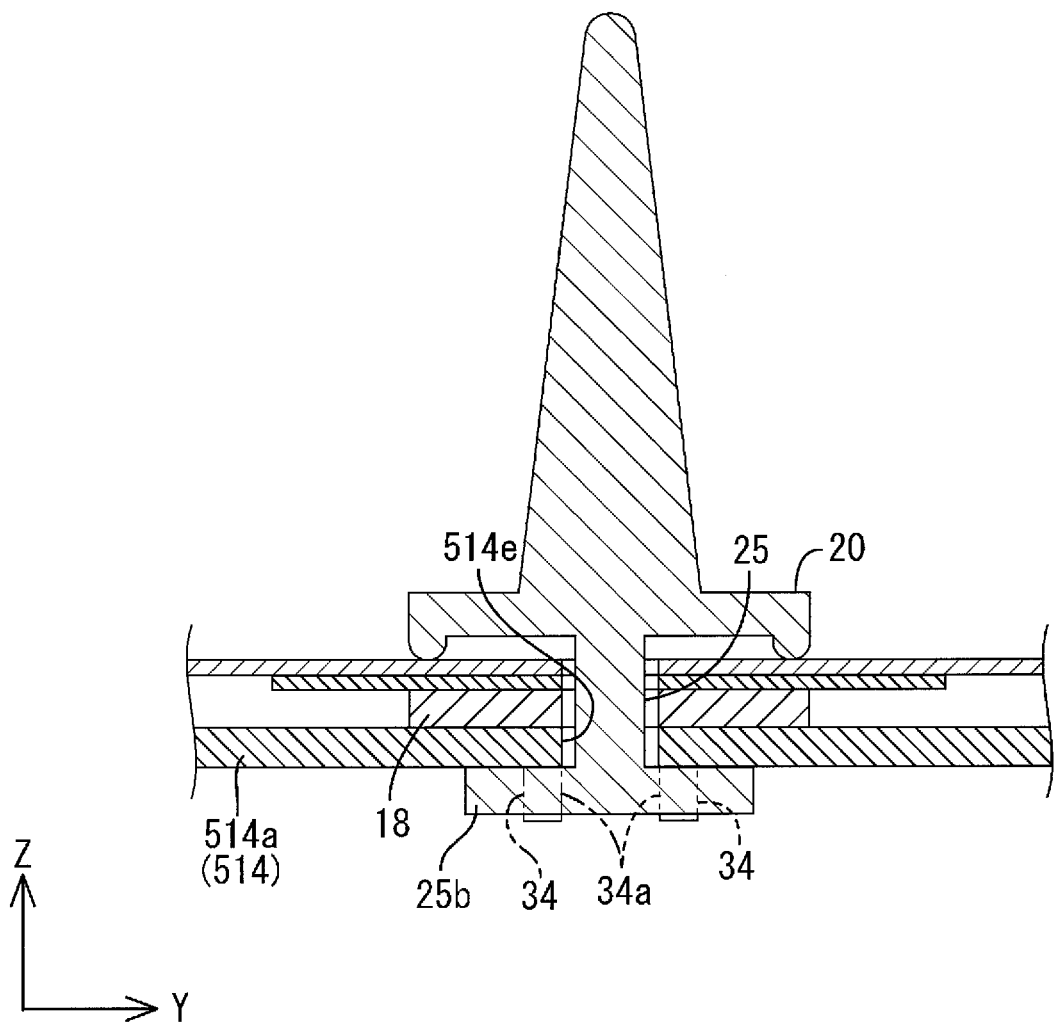
FIG. 52 is a sectional view taken along line lii-lii in FIG. 50 showing the state where the board holding member is located at the holding position with respect to the chassis.

In order to attach the board holding member 20 to the chassis 514, the attachment portion 25 is inserted into the attachment hole 514e to achieve the non-holding position. In rotating the board holding member 20 from the non-holding position, even if it is attempted to rotate the board holding member 20 in the clockwise direction shown in FIG. 47, the first engaging surface 34a of each chassis-side rotation restricting portion 34 is engaged with the holding portion 25b of the attachment portion 25, thereby restricting rotation in the clockwise direction. When the board holding member 20 is rotated from the non-holding position in the counterclockwise direction shown in FIG. 47 and the rotational angle reaches 90 degrees, as shown in FIGS. 50 to 52, the second engaging surface 34b of each chassis-side rotation restricting portion 34 is engaged with the holding portion 25b of the attachment portion 25, thereby restricting further rotation in the counterclockwise direction. Since the operator only have to rotate the board holding member 20 until the rotating operation is restricted, the rotational angle of the board holding member 20 can reliably be set to about 90 degrees. Thereby, the rotational angle of the board holding member 20 from the non-holding position to the holding position can be made constant, thereby stably holding the board holding member 20 at the holding position. Although the multifunctional board holding member 20 is shown in FIGS. 47 to 52, the monofunctional board holding member can have similar configuration.

As described above, in this embodiment, among the board holding member 20 and the chassis 514, the chassis 514 has the rotation restricting structure configured to the rotational angle of the board holding member 20 from the non-holding position. With this configuration, since the rotation restricting structure can restrict the rotational angle of the board holding member 20 from the non-holding position, the board holding member 20 can reliably be brought into the holding position.

The rotation restricting structure is constituted by the chassis-side rotation restricting portions 34 that are protruded from the chassis 514 toward the side opposite to the LED board 18, and are engaged with the attachment portion 25 when the board holding member 20 is rotated from the non-holding position by a predetermined angle to restrict further rotation. With this configuration, when the board holding member 20 is rotated from the non-holding position by the predetermined angle, the chassis-side rotation restricting portions 34 are engaged with the attachment portion 25, thereby restricting further rotation of the board holding member 20. Thereby, the board holding member 20 can reliably be brought into the holding position.

Both the attachment portion 25 and the attachment hole 514e have rotationally symmetric shape of 2-fold symmetry in a plan view, and the rotation restricting structure can restrict the rotational angle of the board holding member 20 from the non-holding position to about 90 degrees. In the case where the attachment portion 25 and the attachment hole 514e have rotationally symmetric shape of 2-fold symmetry as described above, when the board holding member 20 is rotated from the non-holding position by 180 degrees, the board holding member 20 is located at the non-holding position again. Accordingly, the maximum rotational angle of the board holding member 20 from the non-holding position is 90 degrees. In this embodiment, since the rotation restricting structure restricts the rotational angle of the board holding member 20 from the non-holding position up to about 90 degrees, even when the board holding member 20 is rotationally displaced to some extent due to vibration or the like, the board holding member 20 is hard to reach the non-holding position and therefore, careless detaching of the board holding member 20 can be prevented.

The sixth embodiment of the present invention has been described and however, the present invention is not limited to the embodiment and may include following modification examples. In each of the following modification examples, the same members as those in the above-mentioned embodiment are given the same reference numerals and illustration and description thereof may be omitted.

<First Modification Example of Sixth Embodiment>

A first modification example of the sixth embodiment will be described with reference to FIG. 53 or FIG. 54. Here, chassis-side rotation restricting portions 34-1 having modified configuration are shown.

Figure 53:
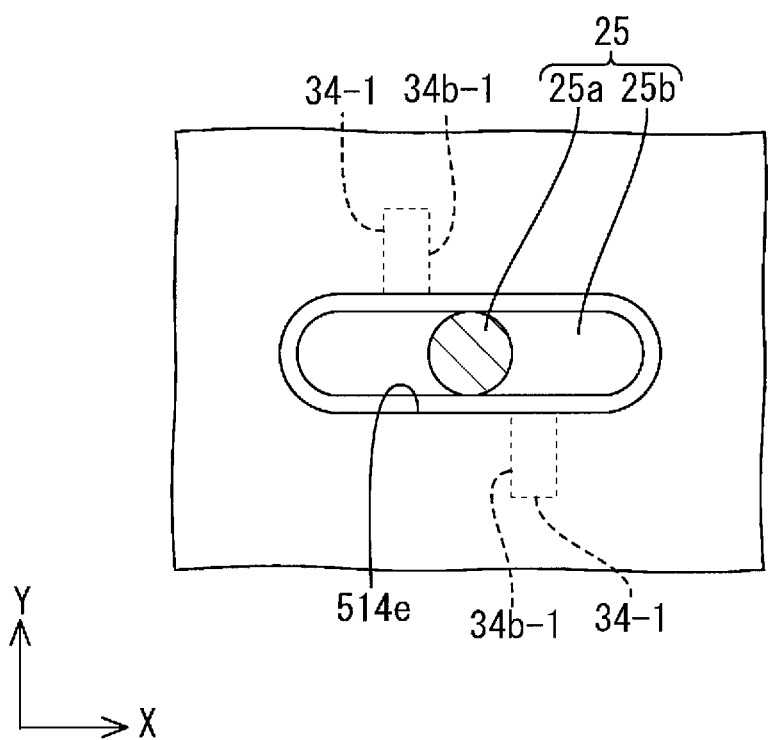
FIG. 53 is a plan sectional view showing the state where the board holding member is located at the non-holding position with respect to a chassis according to a first modification example of the sixth embodiment.
Figure 54:
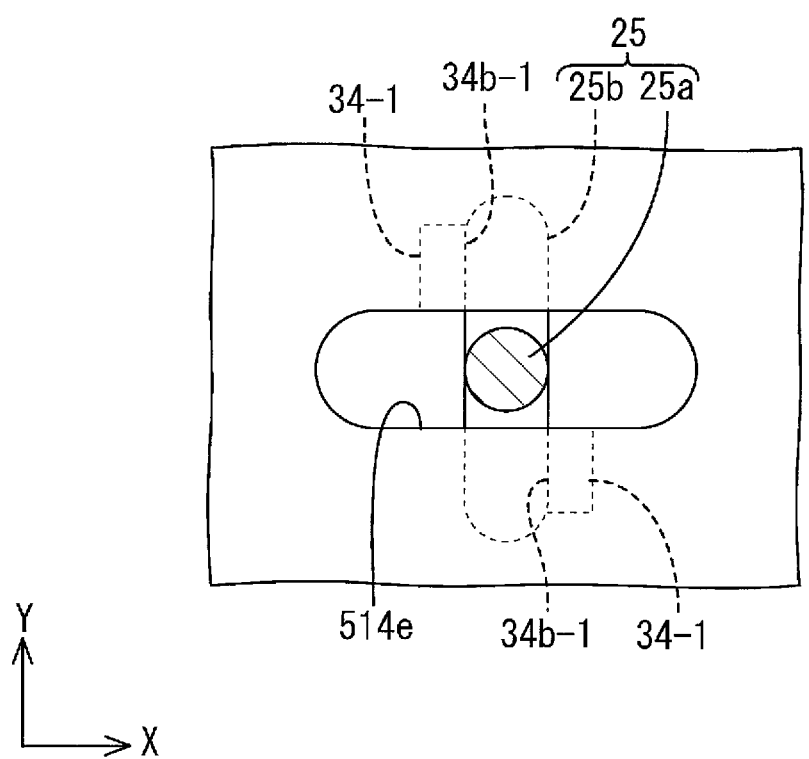
FIG. 54 is a plan sectional view showing the state where the board holding member is located at the holding position with respect to the chassis.

As shown in FIG. 53, each chassis-side rotation restricting portion 34-1 is substantially rectangular in a plan view, and its long-side direction aligns with the short-side direction of the attachment hole 514e. The chassis-side rotation restricting portion 34-1 is arranged adjacent to the center of the attachment hole 514e in the long-side direction in the circumference of the attachment hole 514e. Accordingly, as shown in FIG. 54, the long-side direction of the chassis-side rotation restricting portion 34-1 aligns with the long-side direction of the attachment portion 25 when the board holding member 20 is rotated from the non-holding position by 90 degrees to achieve the holding position, and a long-side side surface of the chassis-side rotation restricting portion 34-1 constitutes a second side surface 34b-1 engaged with the side surface of the holding portion 25b of the attachment portion 25. An end of the chassis-side rotation restricting portion 34-1 in the long-side direction is substantially in flush with an end of the holding portion 25b of the attachment portion 25 located at the holding position in the long-side direction. As described above, in this modification example, since the bottom end to the protruding end of the holding portion 25b of the attachment portion 25 is engaged with the second side surface 34b-1 of the chassis-side rotation restricting portion 34-1 and the engaging range is larger than that of the sixth embodiment, the rotation restricting function can be achieved more reliably.

<Seventh Embodiment>

A seventh embodiment of the present invention will be described with reference to FIGS. 55 to 60. In the seventh embodiment, the rotation restricting structure in the sixth embodiment is modified. Overlapping description of the same configuration, actions and effects as those in the sixth embodiment is omitted. For convenience of explanation, FIGS. 55 and 58 as plan views show the state where the LED board 18 and the reflection sheets 22 and 23 are removed from a chassis 614.

Figure 55:
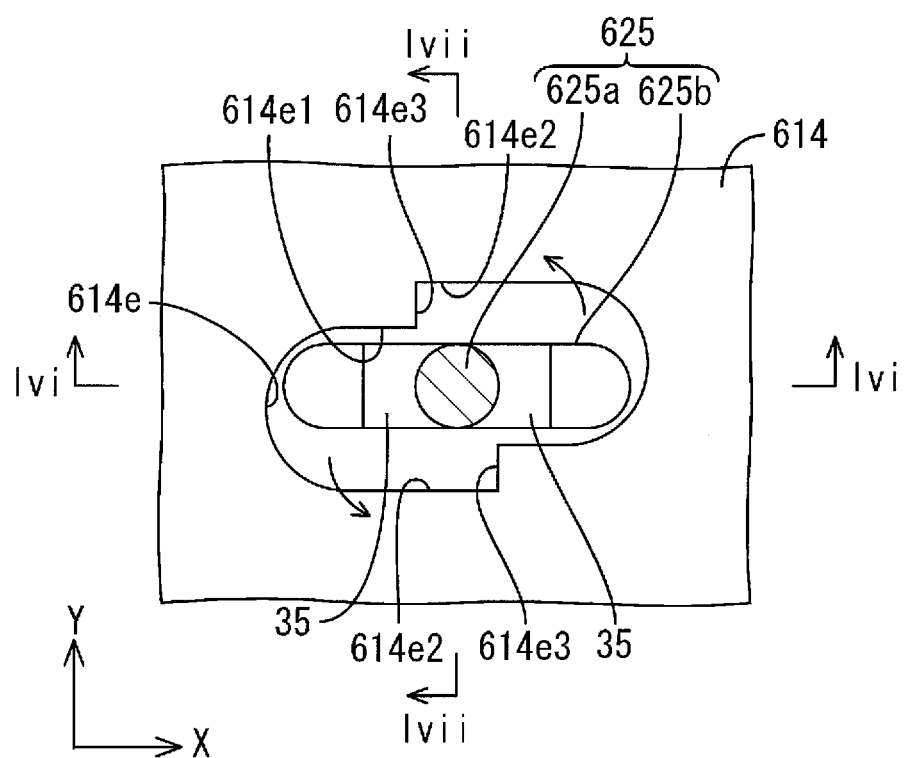
FIG. 55 is a plan sectional view showing the state where the board holding member is located at the non-holding position with respect to a chassis according to a seventh embodiment of the present invention.
Figure 56:
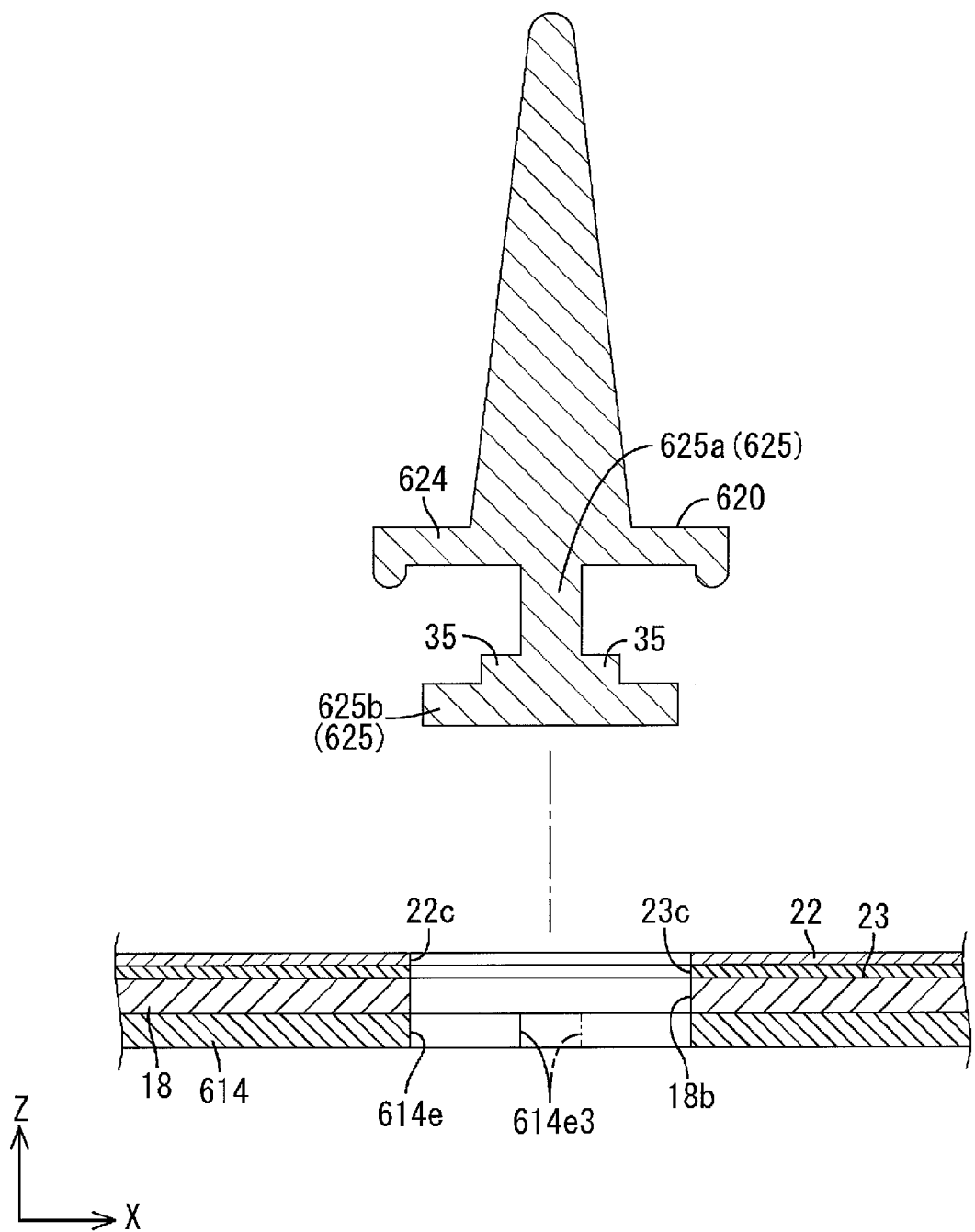
FIG. 56 is a sectional view taken along line lvi-lvi in FIG. 55 showing the state before the board holding member is attached to the chassis.
Figure 57:
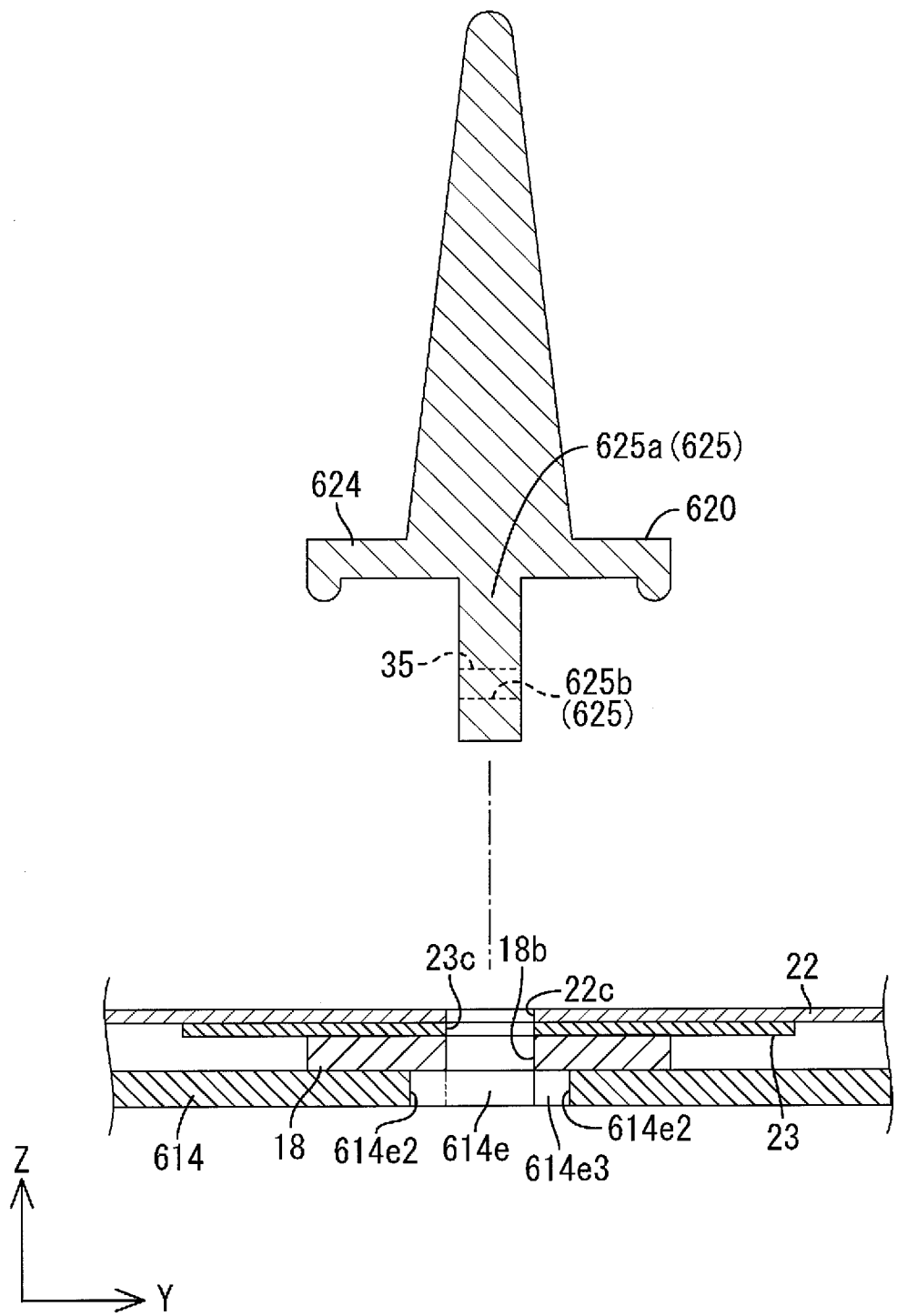
FIG. 57 is a sectional view taken along line lvii-lvii in FIG. 55 showing the state before the board holding member is attached to the chassis.

As shown in FIGS. 55 to 57, holding member-side rotation restricting portions 35 are provided in a region of a board holding member 620, which are arranged in an attachment hole 614e at both the holding position and the non-holding position. The holding member-side rotation restricting portions 35 communicate with both of an shaft portion 625a and a holding portion 625b of an attachment portion 625 and specifically, are coupled to a protruding front end of the shaft portion 625a from a body portion 624 and a protruding bottom end of the holding portion 625b from the shaft portion 625a. The pair of holding member rotation restricting portions 35 is arranged across the shaft portion 625a, that is, are symmetrically arranged at positions shifted from the rotating center. Each holding member rotation restricting portion 35 is substantially block-like and has the almost same width as the short-side dimension of the holding portion 625b (diameter of the shaft portion 625a). Since the holding member rotation restricting portions 35 are arranged closer to the front side than the holding portion 625b, in the state where the attachment portion 625 is inserted into the attachment hole 614e (the holding position and the non-holding position), the holding member rotation restricting portions 35 together with the shaft portion 625a enter into the attachment hole 614e at all times. The holding portion 625b is protruded from the chassis 614 toward the back side.

The attachment hole 614e is larger than the attachment portion 625 in a plan view. Describing in detail, the attachment hole 614e is constituted by an elliptical attachment hole body 614e1 of the almost same as the planar shape of the attachment portion 625 and a pair of extending portions 614e2 formed by cutting edges on both long sides of the attachment hole body 614e1, and is symmetrical about the center of the attachment hole body 614e1 as a point of symmetry. The extending portions 614e2 are formed so as to include a center part of the attachment hole body 614e1 in the long-side direction and reach ends of the attachment hole body 614e1 in the long-side direction, and are larger than the rotational track of the holding member rotation restricting portion 35 at least when the board holding member 620 is rotated from the non-holding position by 90 degrees. When the board holding member 620 is rotated from the non-holding position by 90 degrees, side surfaces of the extending portions 614e2 along the Y-axis direction in the inner circumferential surface is configured to be engaged with the side surfaces of the holding member rotation restricting portions 35, which constitute engaging surfaces 614e3. Thereby, the angle by which the board holding member 620 can be rotated from the non-holding position can be restricted up to about 90 degrees. In the state where the attachment portion 625 is inserted into the attachment hole 614e to attain the non-holding position, the part that is a center part of the inner circumferential surface of the attachment hole body 614e1 in the long-side direction and is adjacent to the extending portion 614e2 is opposed to the side surface of each holding member rotation restricting portion 35, thereby restricting the rotating direction from the non-holding position to only one direction (counterclockwise direction shown in FIG. 55). The through hole 18b in the LED board 18 and the communicating holes 22c and 23c in the reflection sheets 22 and 23 have the same planar shape as those in the first embodiment, but they may have the same planar shape as the attachment hole 614 according to this embodiment.

Figure 58:
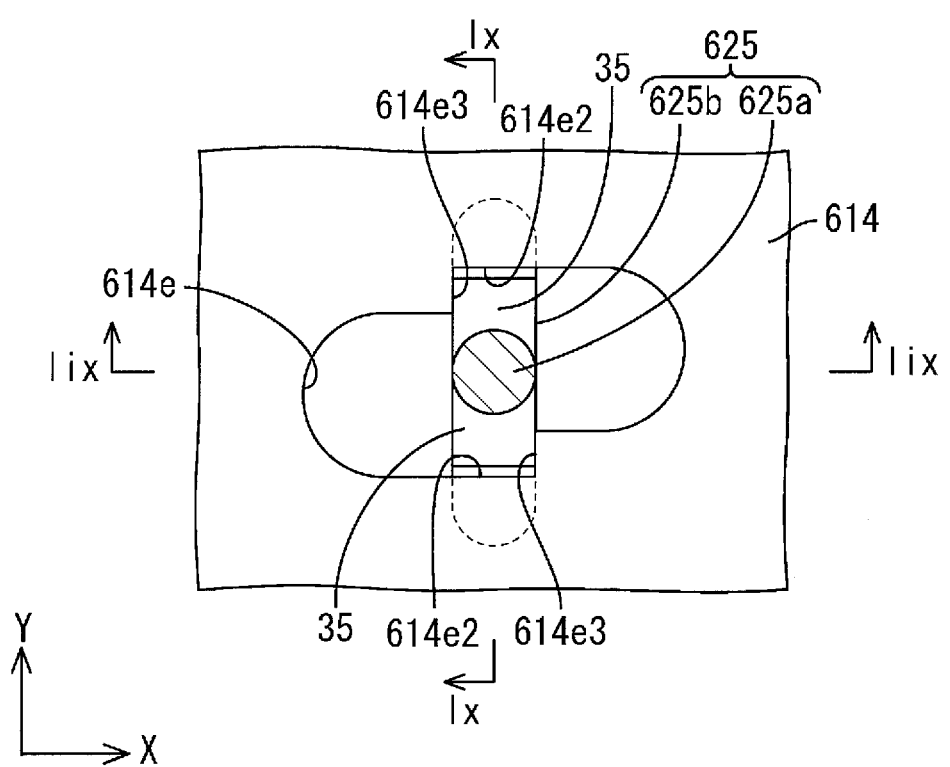
FIG. 58 is a plan sectional view showing the state where the board holding member is located at the holding position with respect to the chassis.
Figure 59:
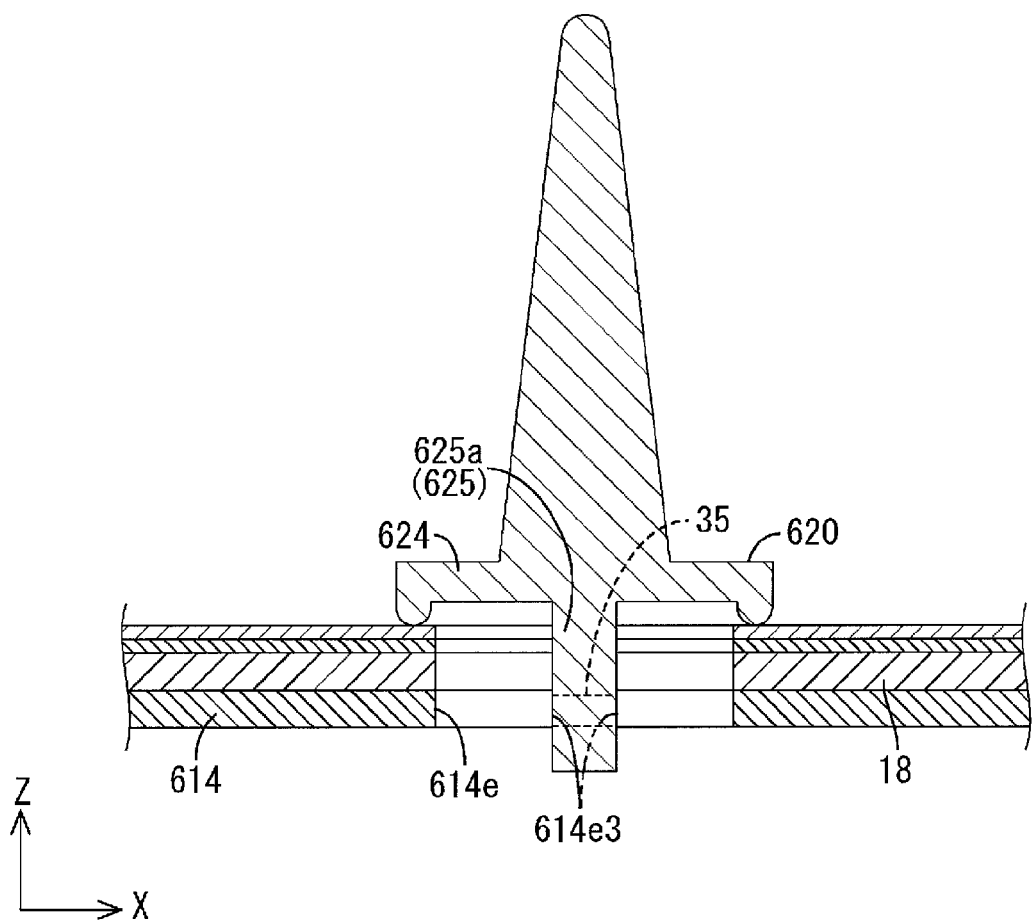
FIG. 59 is a sectional view taken along line lix-lix in FIG. 58 showing the state where the board holding member is located at the holding position with respect to the chassis.
Figure 60:
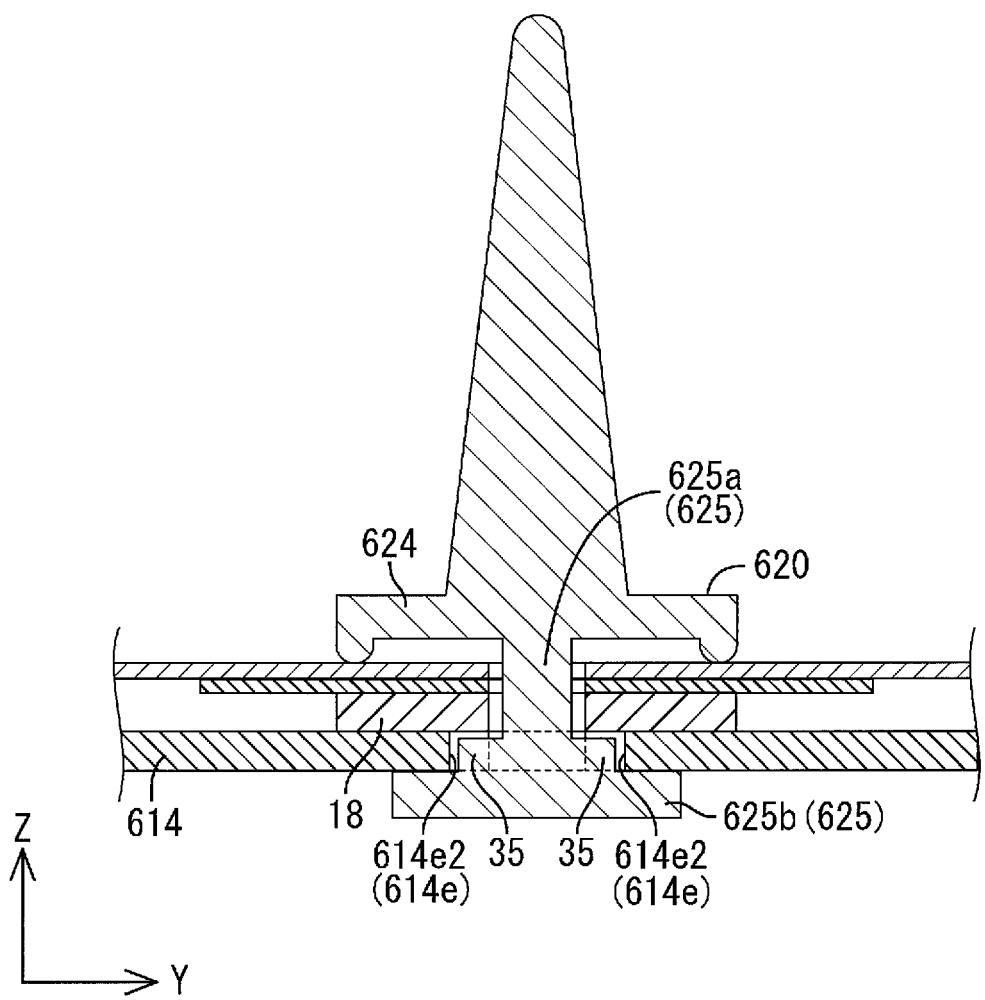
FIG. 60 is a sectional view taken along line lx-lx in FIG. 58 showing the state where the board holding member is located at the holding position with respect to the chassis.

When the board holding member 620 is rotated from the non-holding position in the counterclockwise direction shown in FIG. 55 and the rotational angle reaches 90 degrees, as shown in FIGS. 58 to 60, the holding member-side rotation restricting portions 35 are engaged with the engaging surfaces 614e3 of the extending portions 614e2 of the attachment hole 614e, thereby restricting further rotation in the counterclockwise direction. Since the operator only have to rotate the board holding member 620 until the rotating operation is restricted, the rotational angle of the board holding member 620 can reliably be set to about 90 degrees. Thereby, the rotational angle of the board holding member 620 from the non-holding position to the holding position can be made constant and therefore, the board holding member 620 can be stably held at the holding position. Although the multifunctional board holding member 620 is shown in FIGS. 55 to 60, the monofunctional board holding member can have similar configuration.

As described above, in this embodiment, the rotation restricting structure is provided in the board holding member 620 and is constituted by the holding member-side rotation restricting portions 35 arranged in the attachment hole 614e. The attachment hole 614e, on the other hand, is constituted by the attachment hole body 614e1 along the outer shape of the attachment portion 625 in a plan view and the extending portions 614e2 that extend from the attachment hole body 614e1 and allow rotational displacement of the holding member-side rotation restricting portions 35. When the board holding member 620 is rotated from the non-holding position by the predetermined angle, the holding member-side rotation restricting portions 35 are engaged with the engaging surfaces 614e3 as the inner surfaces of the extending portions 614e2, thereby restricting further rotation. With this configuration, when the board holding member 620 is rotated from the non-holding position, the holding member-side rotation restricting portions 35 allow rotational displacement in the extending portions 614e2 of the attachment hole 614e, and when the rotational angle reaches the predetermined rotational angle, the holding member-side rotation restricting portions 35 are engaged with the engaging surfaces 614e3 as the inner surfaces of the extending portions 614e2, thereby restricting further rotation of the board holding member 620. As a result, the board holding member 620 can reliably be brought into the holding position. As compared to the case where the chassis-side rotation restricting portions 34 as separated units are installed in the chassis 514 as in the sixth embodiment, in this embodiment, costs can be reduced by changing the shape of the board holding member 620 and the attachment hole 614e.

The attachment portion 625 includes the shaft portion 625a that is protruded from the body portion 624 toward the chassis 614 and serves as the rotational axis of the board holding member 620 and the holding portion 625b that is protruded from the shaft portion 625a in substantially parallel with the body portion 624 and is configured to sandwich the edge of the attachment hole 614e between the holding portion 625b and the body portion 624, and the holding member-side rotation restricting portions 35 communicate with both the shaft portion 625a and the holding portion 625b. With this configuration, the holding member-side rotation restricting portions 35 that communicate with both the shaft portion 625a and the holding portion 625b can reinforce the attachment portion 625.

The seventh embodiment of the present invention has been described and however, the present invention is not limited to the embodiment and may include following modification examples. In each of the following modification examples, the same members as those in the above-mentioned embodiment are given the same reference numerals and illustration and description thereof may be omitted.

<First Modification Example of Seventh Embodiment>

A first modification example of the seventh embodiment will be described with reference to FIGS. 61 to 63. Here, the installed number of holding member-side rotation restricting portions 35-1 is changed.

Figure 61:
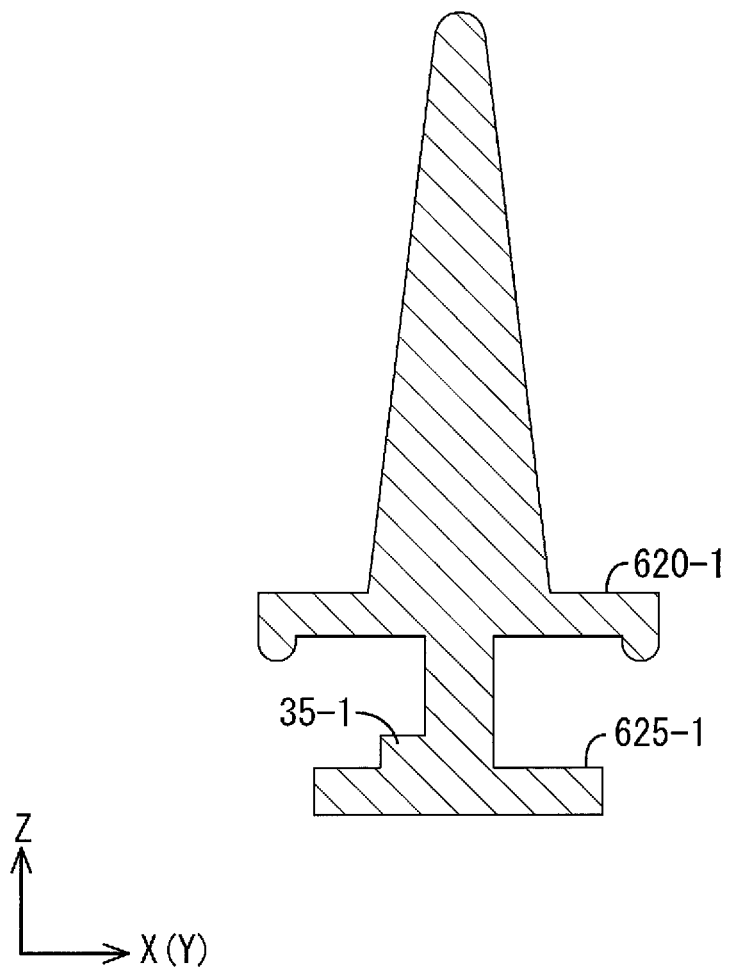
FIG. 61 is a side sectional view of a board holding member according to a first modification example of the seventh embodiment.
Figure 62:
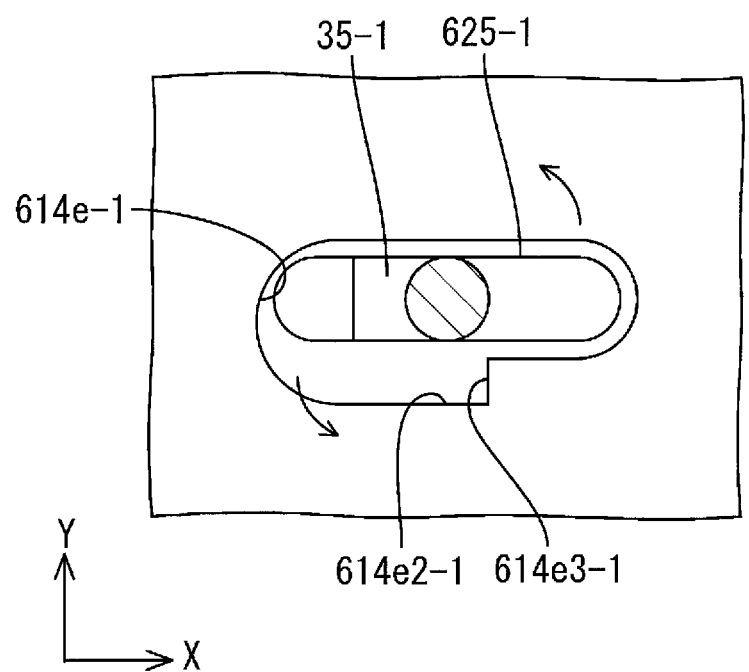
FIG. 62 is a plan sectional view showing the state where the board holding member is located at the non-holding position with respect to the chassis.
Figure 63:
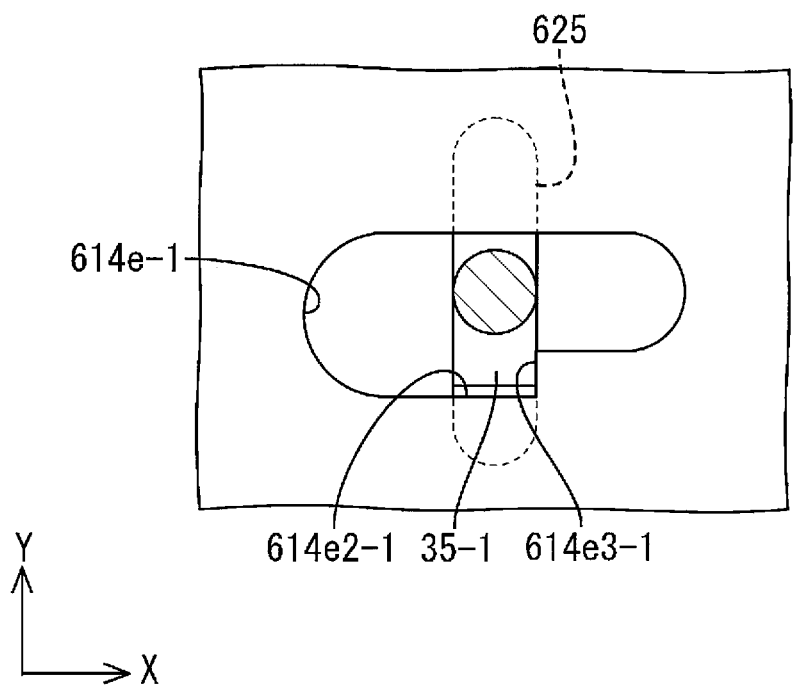
FIG. 63 is a plan sectional view showing the state where the board holding member is located at the holding position with respect to the chassis.

As shown in FIGS. 61 and 62, in this modification example, only one holding member-side rotation restricting portion 35-1 is provided at an attachment portion 625-1 at a position shifted from the rotating center. One extending portions 614e2-1 and one engaging surface 614e3-1a are provided in the attachment hole 614e-1. In inserting the attachment portion 625-1 into the attachment hole 614e-1, the holding member-side rotation restricting portion 35-1 is oriented so as to enter on the side of the extending portions 614e2-1 of the attachment hole 614e-1. The board holding member 620-1 is located at the non-holding position and subsequently, is rotated in the counterclockwise direction shown in FIG. 62. When the rotational angle reaches 90 degrees, as shown in FIG. 63, the holding member-side rotation restricting portion 35-1 is engaged with the engaging surface 614e3-1 of the extending portions 614e2-1, thereby restricting further rotation. Although the multifunctional board holding member 620-1 is shown in FIGS. 61 to 63, the monofunctional board holding member can have similar configuration.

<Second Modification Example of Seventh Embodiment>

A second modification example of the seventh embodiment will be described with reference to FIGS. 64 to 66. Here, holding member-side rotation restricting portions 35-2 of modified shape are shown.

Figure 64:
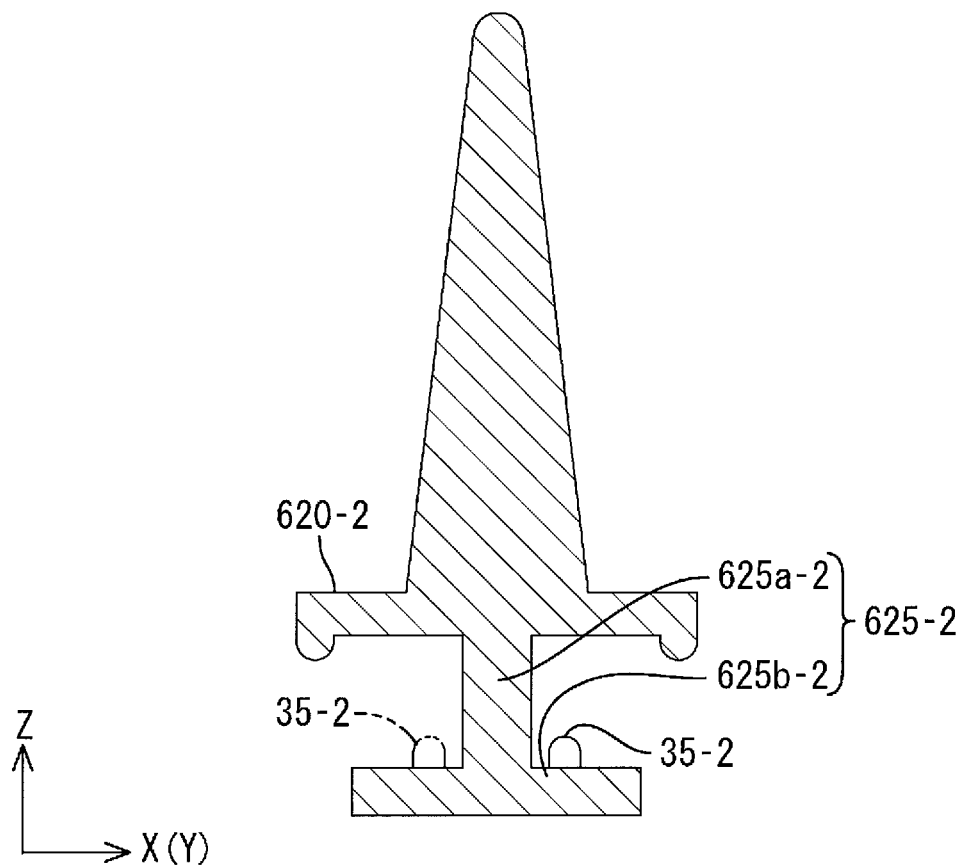
FIG. 64 is a side sectional view showing a board holding member according to a second modification example of the seventh embodiment.
Figure 65:
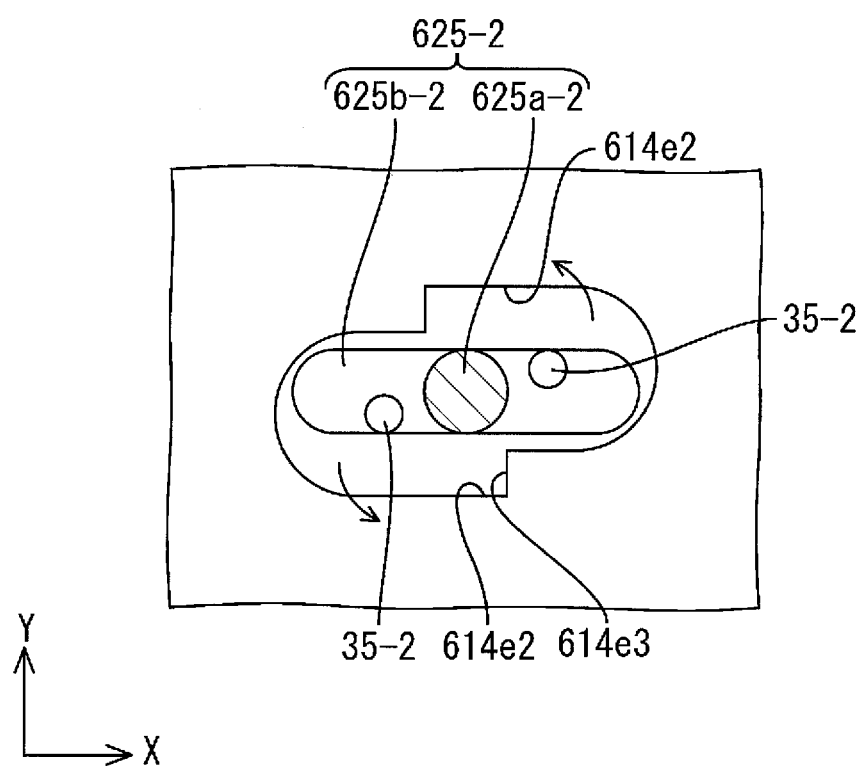
FIG. 65 is a plan sectional view showing the state where the board holding member is located at the non-holding position with respect to the chassis.
Figure 66:
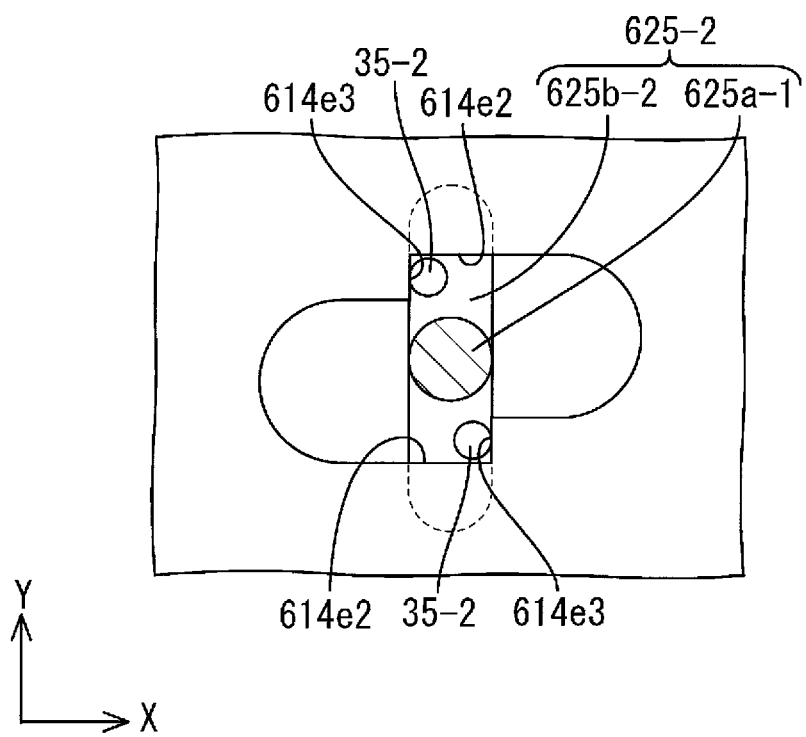
FIG. 66 is a plan sectional view showing the state where the board holding member is located at the holding position with respect to the chassis.

As shown in FIGS. 64 and 65, each holding member-side rotation restricting portion 35-2 in this modification example communicates with only the holding portion 625b-2 of the attachment portion 625-2. Describing in detail, each holding member-side rotation restricting portion 35-2 is circular in a plan view, and its diameter is smaller than the short-side dimension of the holding portion 625b-2. The pair of holding member-side rotation restricting portions 35-2 is arranged on a holding portion 625b-2 symmetrically about a bottom portion 625a-2 at positions separated from the bottom portion 625a-2. Each holding member-side rotation restricting portion 35-2 is arranged at a position that is substantially in flush with each outer side surface of the holding portion 625b-2 on the side of the long side. When the board holding member is rotated from the non-holding position in the counterclockwise direction shown in FIG. 65 and the rotational angle reaches 90 degrees, as shown in FIG. 66, the holding member-side rotation restricting portions 35-2 are engaged with the engaging surfaces 614e3 of the extending portions 614e2, thereby restricting further rotation. Although the multifunctional board holding member 620-2 is shown in FIGS. 64 to 66, the monofunctional board holding member can have similar configuration.

<Eighth Embodiment>

An eighth embodiment of the present invention will be described with reference to FIGS. 67 to 72. In the eighth embodiment, the rotation restricting structure in the sixth embodiment is modified. Overlapping description of the same configuration, actions and effects as those in the sixth embodiment is omitted. For convenience of explanation, FIGS. 67 and 70 as plan views show the state where the LED board 18 and the reflection sheets 22 and 23 are detached from the chassis 714.

Figure 67:
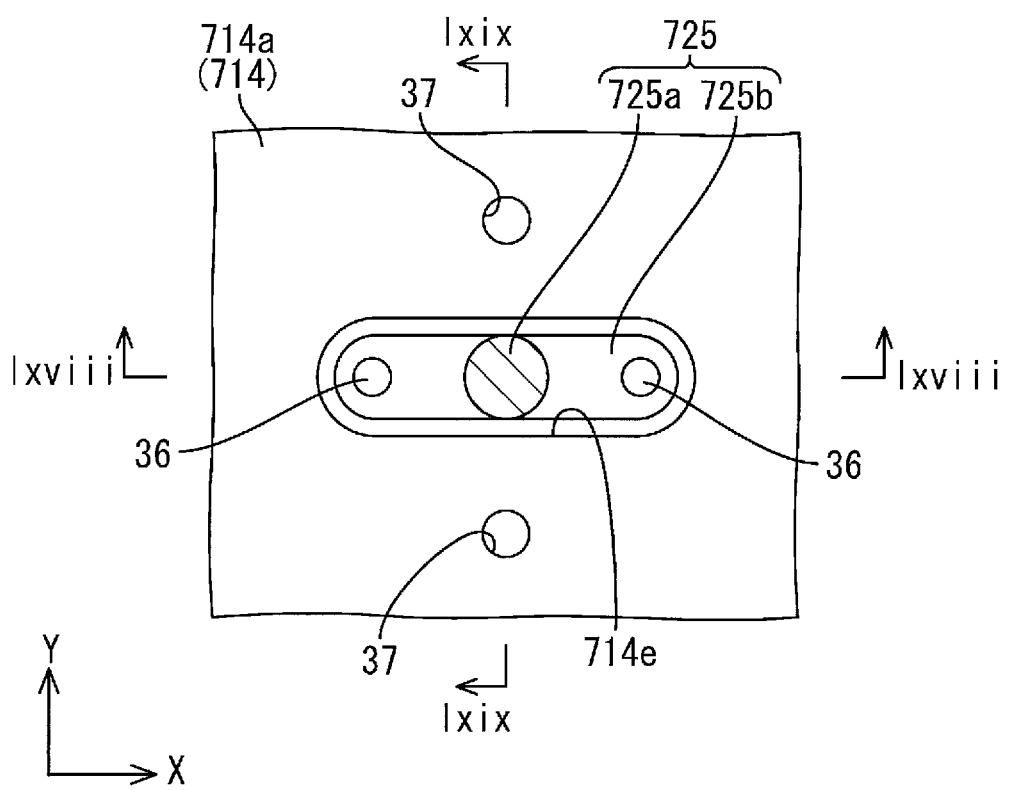
FIG. 67 is a plan sectional view showing the state where the board holding member is located at the non-holding position with respect to a chassis according to an eighth embodiment of the present invention.
Figure 68:
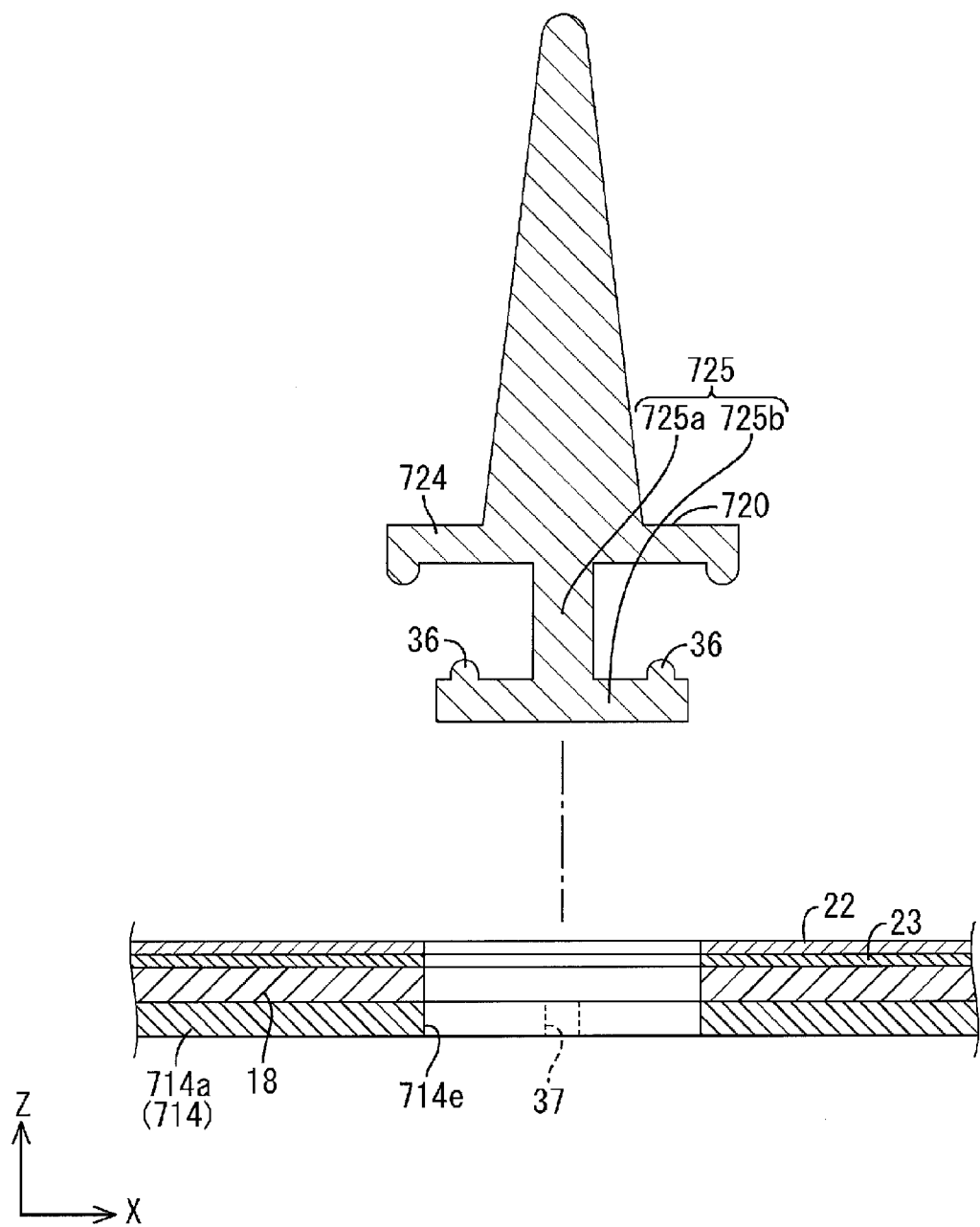
FIG. 68 is a sectional view taken along line lxviii-lxviii in FIG. 67 showing the state before the board holding member is attached to the chassis.
Figure 69:
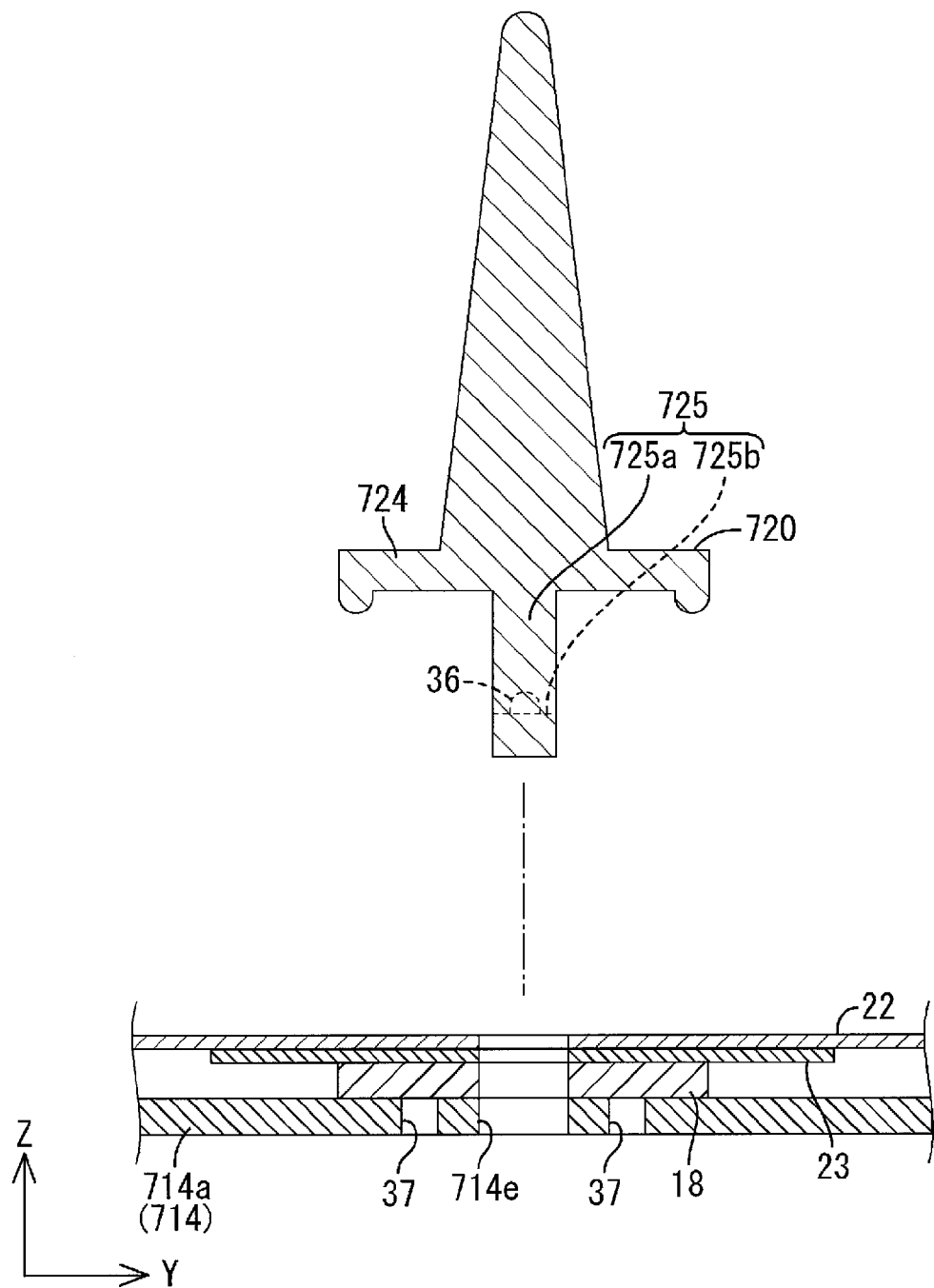
FIG. 69 is a sectional view taken along line lxix-lxix in FIG. 67 showing the state before the board holding member is attached to the chassis.

As shown in FIGS. 67 to 69, holding member-side engaging portions 36 are provided in an attachment portion 725 of a board holding member 720. Describing in detail, the holding member-side engaging portions 36 are protruded from a front side surface of a holding portion 725b of the attachment portion 725 toward the front side (body member 724 side) (protrusion). The pair of holding member-side engaging portions 36 is separated from a bottom portion 725a in the holding portion 725b and is arranged so as to sandwich the shaft portion 725a, that is, to be symmetrical about the rotating center. Each holding member-side engaging portion 36 is substantially circular in a plan view, has the diameter that is smaller than the short-side dimension of the holding portion 725b and is arranged at the center of the holding portion 725b in the short-side direction. Each holding member-side engaging portion 36 is substantially hemispherical and has a spherical circumferential surface. Chassis-side engaging portions 37 with which the holding member-side engaging portions 36 is configured to be engaged are provided at positions away from an attachment hole 714e in a bottom plate 714a of a chassis 714. Describing in detail, each chassis-side engaging portion 37 is shaped like a hole passing through the bottom plate 714a (recess), and like a circle having a larger diameter than that of the holding member-side engaging portion 36 in a plan view. The pair of chassis-side engaging portions 37 is symmetrically arranged so as to sandwich the attachment hole 714e in the short-side direction (Y-axis direction), and have the same center as that of the attachment hole 714e in the X-axis direction. A line connecting the chassis-side engaging portions 37 to each other crosses the center of the attachment hole 714e, aligns with the short-side direction of the attachment hole 714e and is orthogonal to the long-side direction of the attachment hole 714e.

Figure 70:
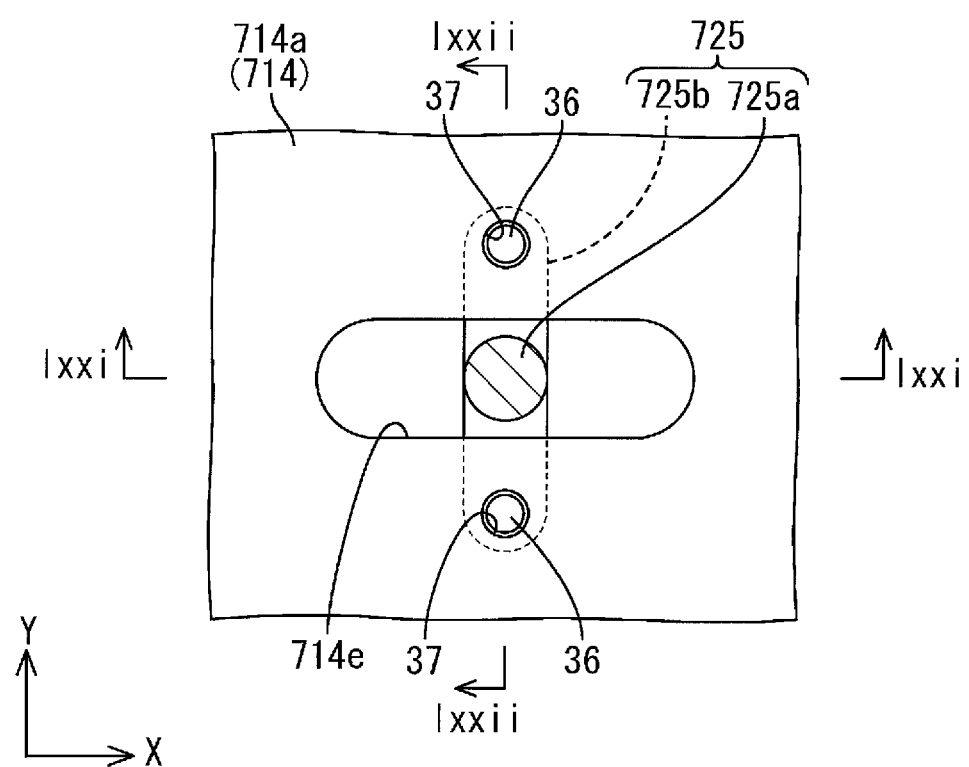
FIG. 70 is a plan sectional view showing the state where the board holding member is located at the holding position with respect to the chassis.
Figure 71:
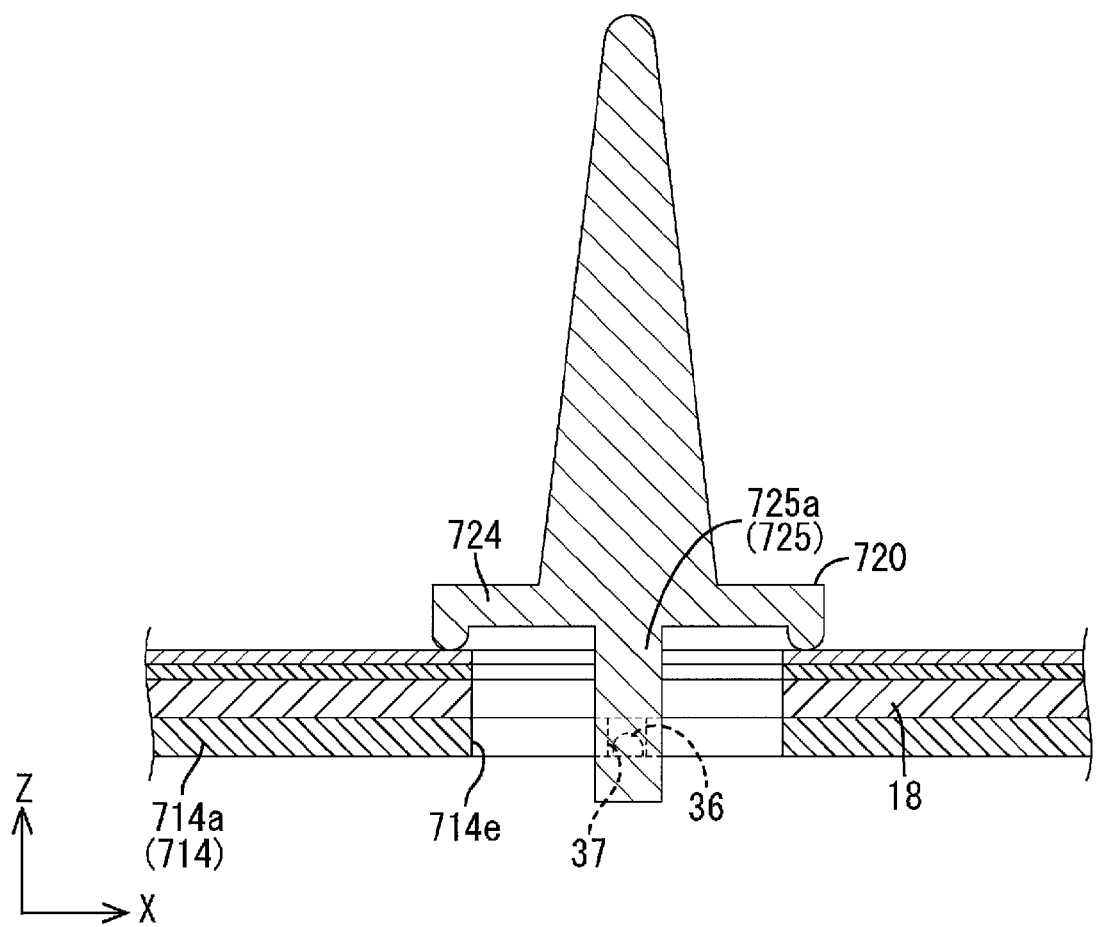
FIG. 71 is a sectional view taken along line lxxi-lxxi in FIG. 70 showing the state before the board holding member is attached to the chassis.
Figure 72:
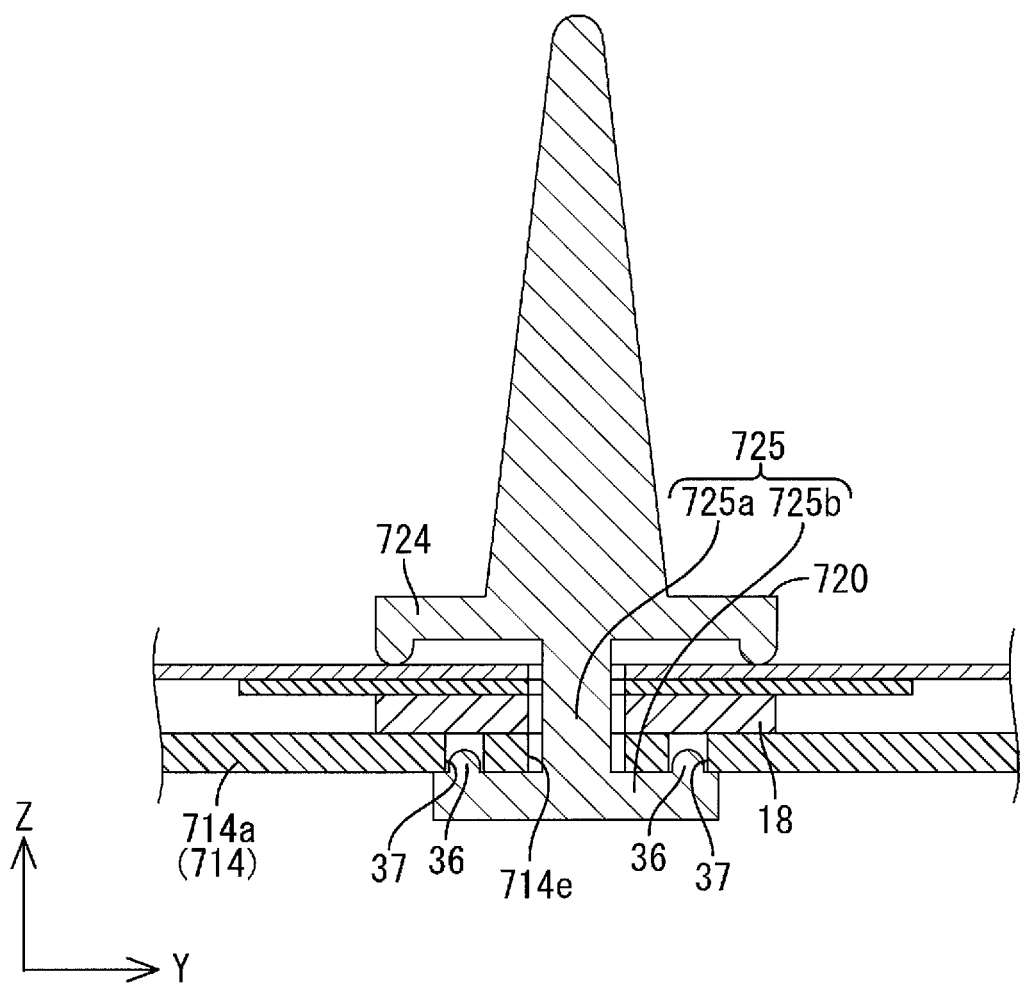
FIG. 72 is a sectional view taken along line lxxii-lxxii in FIG. 70 showing the state before the board holding member is attached to the chassis.

When the board holding member 720 is attached to the chassis 714, the attachment portion 725 is inserted into the attachment hole 714e to achieve the non-holding position. The board holding member 720 is rotated from the non-holding position in the counterclockwise direction or the clockwise direction in FIG. 67. Then, each holding member-side engaging portion 37 is in slide contact with the back surface of the bottom plate 14a, resulting that the holding portion 725b is elastically deformed once using the shaft portion 725a as a fulcrum. Then, when the rotational angle reaches 90 degrees, as shown in FIG. 70 to FIG. 72, each holding member-side engaging portion 37 is fitted into each chassis-side engaging portion 36, their counter circumferential surfaces are engaged with each other and the holding portion 725b elastically returns. In this manner, the board holding member 720 that is rotated from the non-holding position by 90 degrees and reaches the holding position is prevented from rotating in both the forward and backward directions and therefore, board holding member 720 can be stably held at the holding position. Although the multifunctional board holding member 720 is shown in FIGS. 67 to 72, the monofunctional board holding member can have similar configuration.

As described above, in this embodiment, the rotation restricting structure is provided in each of the chassis 714 and the attachment portion 725. Each restricting structure includes the engaging portions (the holding member-side engaging portions 36 and the chassis-side engaging portions 37) which are engaged with the protrusion fitted in the recess when the board holding member 720 is rotated from the non-holding position by the predetermined angle (90 degrees), thereby restricting rotation in the forward and backward directions. With this configuration, when the board holding member 720 is rotated from the non-holding position by the predetermined angle, the holding member-side engaging portions 36 and the chassis-side engaging portions 37 as the engaging portions provided in the chassis 714 and the attachment portion 725 are engaged with the protrusion fitted in the recess and thus, the board holding member 720 is prevented from rotating in both the forward and backward directions. Thereby, the board holding member 720 can reliably be brought into the holding position and the holding position can be stably maintained.

The eighth embodiment of the present invention has been described and however, the present invention is not limited to the embodiment and may include following modification examples. In each of the following modification examples, the same members as those in the above-mentioned embodiment are given the same reference numerals and illustration and description thereof may be omitted.

<First Modification Example of Eighth Embodiment>

A first modification example of the eighth embodiment will be described with reference to FIGS. 73 to FIG. 75. Here, the protrusion and the recess of the engaging portions are reversed.

Figure 73:
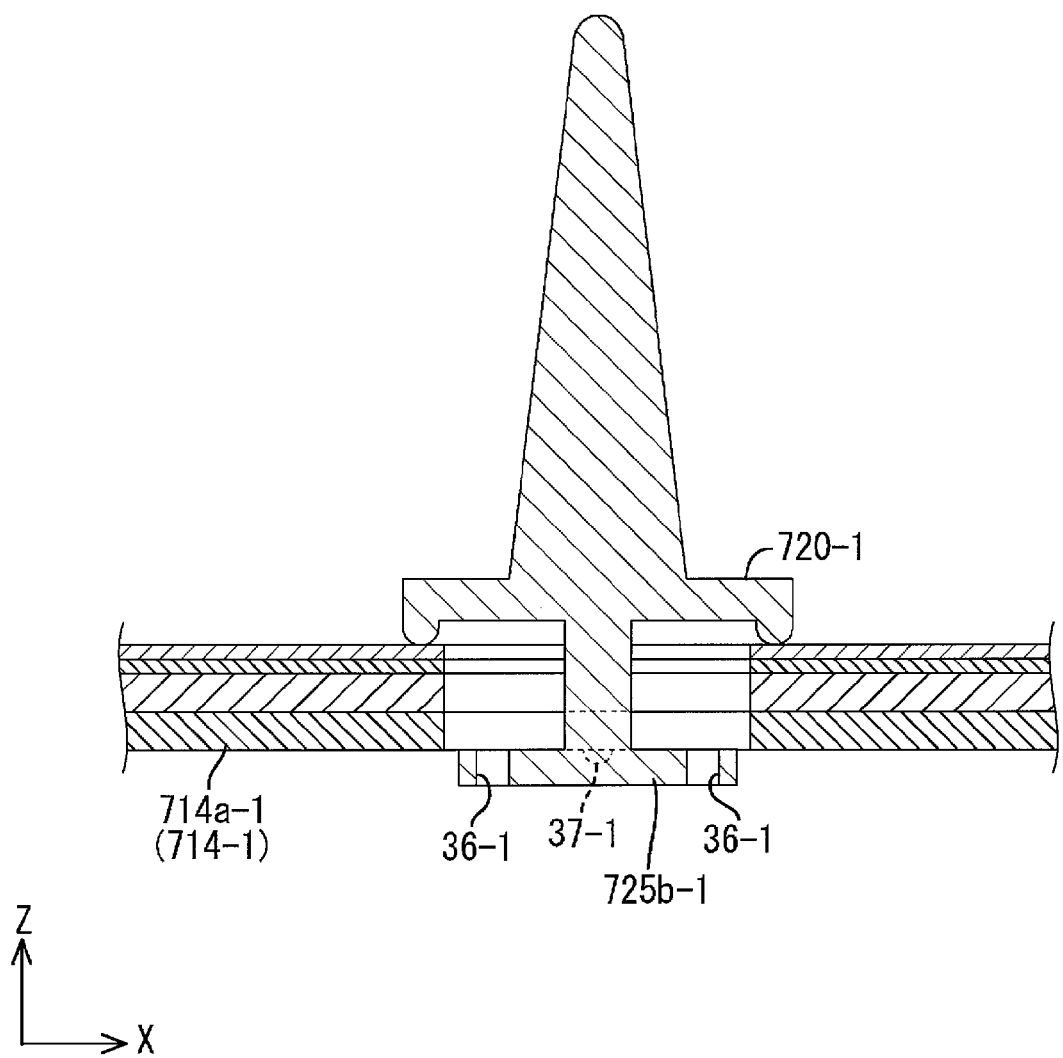
FIG. 73 is a sectional view along the X-axis direction showing the state where the board holding member is located at the non-holding position with respect to a chassis according to a first modification example of the eighth embodiment.
Figure 74:
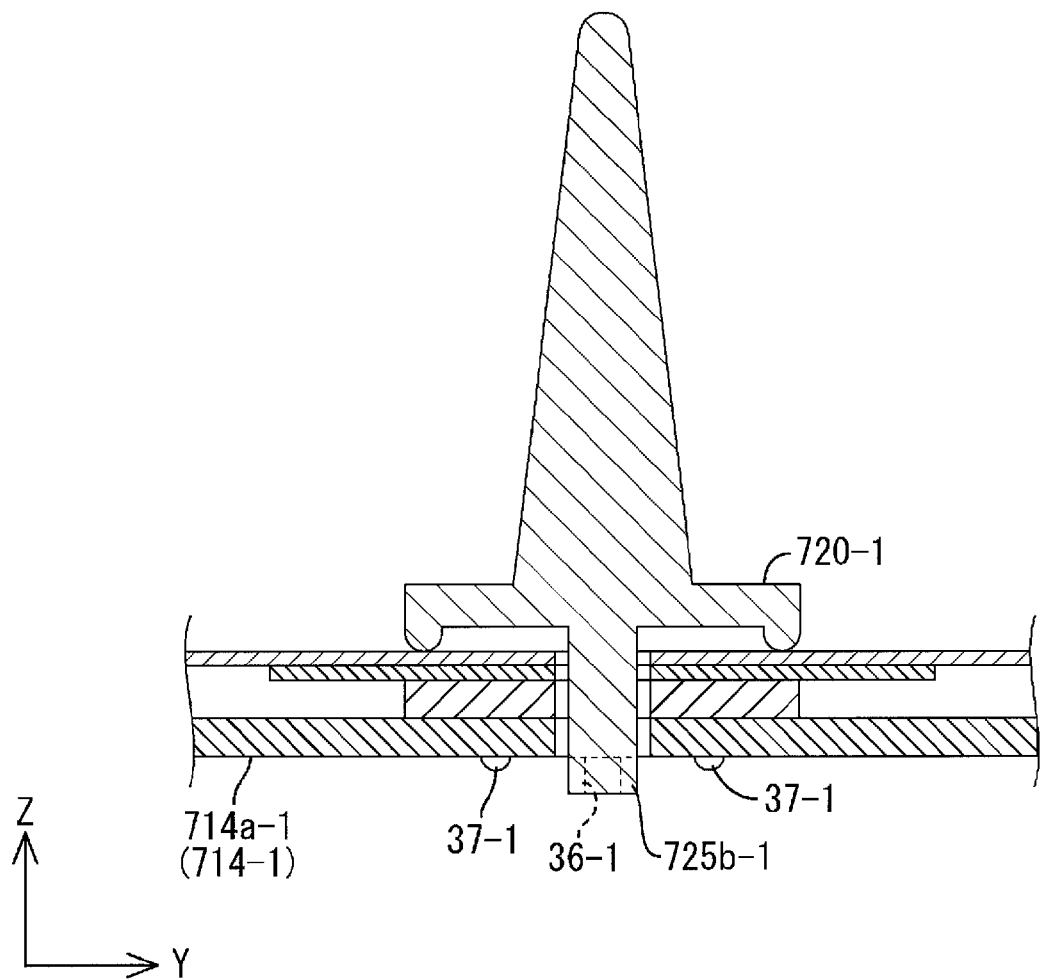
FIG. 74 is a sectional view along the Y-axis direction showing the state where the board holding member is located at the non-holding position with respect to the chassis.
Figure 75:
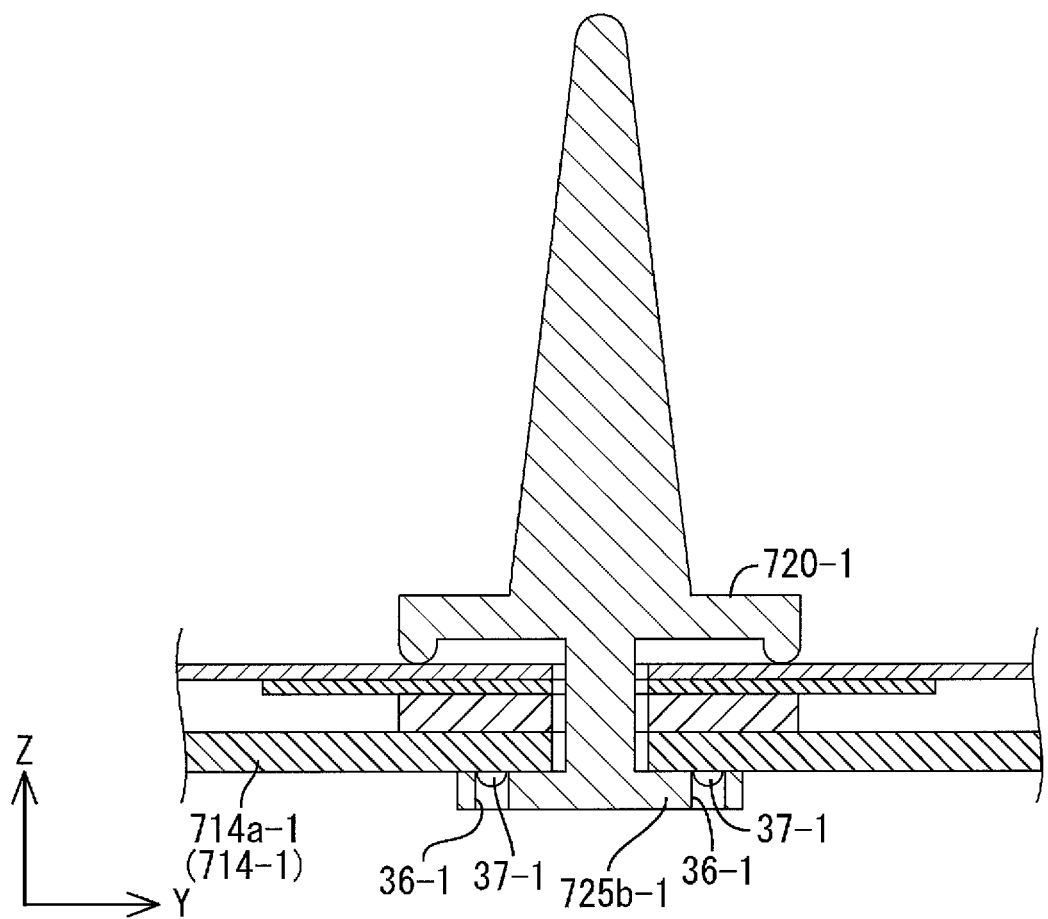
FIG. 75 is a sectional view along the Y-axis direction showing the state where the board holding member is located at the holding position with respect to the chassis.

As shown in FIGS. 73 and 74, each chassis-side engaging portion 37-1 is protruded from a back surface of a bottom plate 714a-1 of a chassis 714-1 toward the back side (protrusion). The chassis-side engaging portion 37-1 is formed by partially beating outward the bottom plate 714a-1 in an integral manner. The chassis-side engaging portion 37-1 may be an individual component separated from the chassis 714-1 and be fixedly attached to the chassis 714-1 through an adhesive layer or the like. The holding member-side engaging portion 36-1 is shaped like a hole passing through the holding portion 725b-1 in the Z-axis direction (concave), and like a circle having a larger diameter than that of the chassis-side engaging portion 37-1 in a plan view. When the board holding member 720-1 is rotated from the non-holding position by 90 degrees, as shown in FIG. 75, the chassis-side engaging portion 37-1 is fixed into the holding member-side engaging portion 36-1 and their opposed circumferential surfaces are engaged with each other, thereby holding the board holding member 720-1 at the holding position.

<Ninth Embodiment>

A ninth embodiment of the present invention will be described with reference to FIGS. 76 to 81. In the ninth embodiment, the rotation restricting structure in the seventh embodiment is modified. Overlapping description of the same configuration, actions and effects as those in the seventh embodiment is omitted. For convenience of explanation, FIGS. 76 and 79 as plan views show the state where the LED board 18 and the reflection sheets 22 and 23 are removed from a chassis 814.

Figure 76:
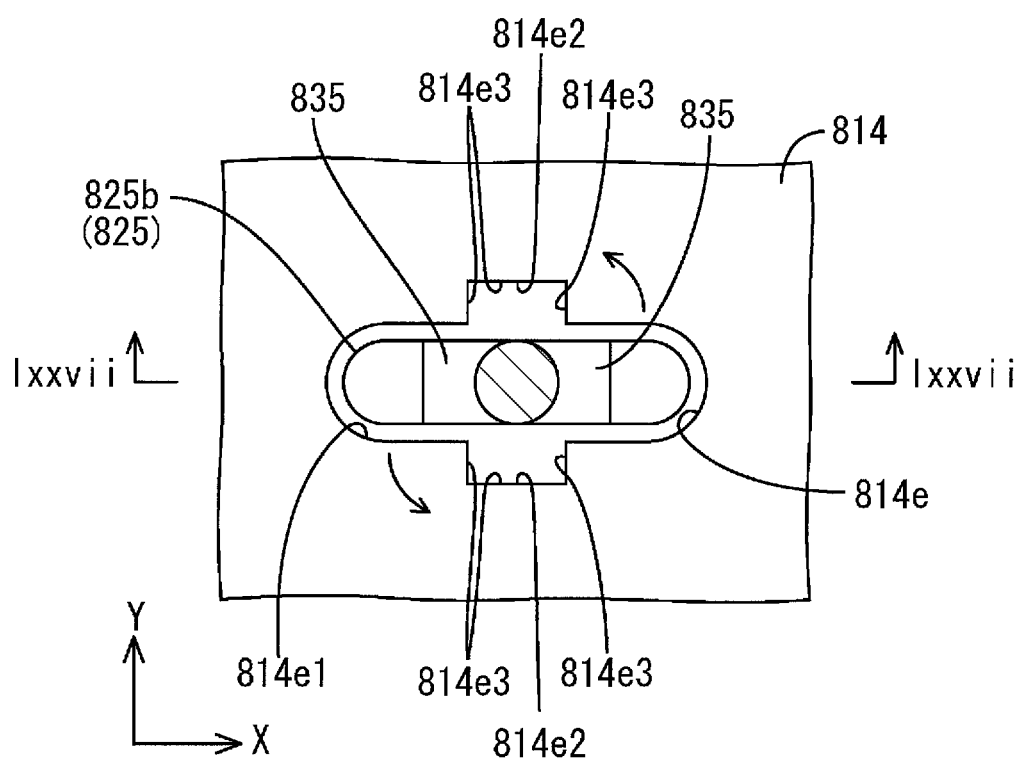
FIG. 76 is a plan sectional view showing the state where the board holding member is located at the non-holding position with respect to a chassis according to a ninth embodiment of the present invention.

An attachment portion 825 and a holding member-side rotation restricting portion 835 in a board holding member 820 have similar configuration to that in the seventh embodiment and thus, overlapping description thereof is omitted. As shown in FIG. 76, an attachment hole 814e is constituted by an attachment hole body 814e1 having the almost same elliptical shape as the planar shape of the attachment portion 825 and a pair of extending portions 814e2 formed by partially cutting a part of edges of the attachment hole body 814e1 on the side of the long side. Each extending portion 814e2 is arranged at the center of the attachment hole body 814e1 in the long-side direction, is rectangular in a plan view and has shape corresponding to the outer shape of the holding member-side rotation restricting portion 835. The holding member-side rotation restricting portion 835 is configured to be engaged with the extending portions 814e2, and an inner circumferential surface (a pair of side surfaces along the Y-axis direction and a side surface along the X-axis direction) of each extending portion 814e2 constitutes an engaging surface 814e3 that can be engaged with an outer side surface of the holding member-side rotation restricting portion 835 (FIG. 79).

Figure 77:
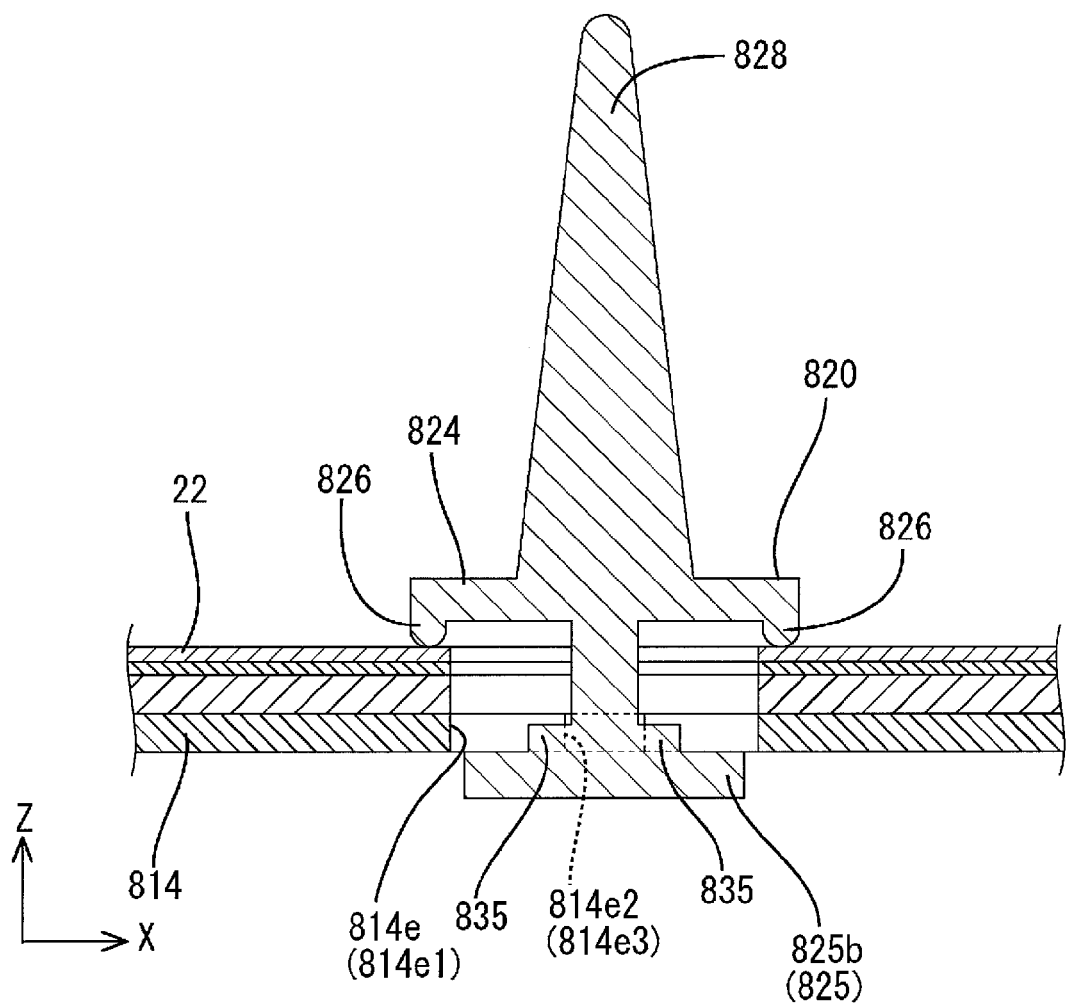
FIG. 77 is a sectional view taken along line lxxvii-lxxvii in FIG. 76 showing the state where the board holding member is located at the non-holding position with respect to the chassis and before a supporting portion is pressed downward.
Figure 78:
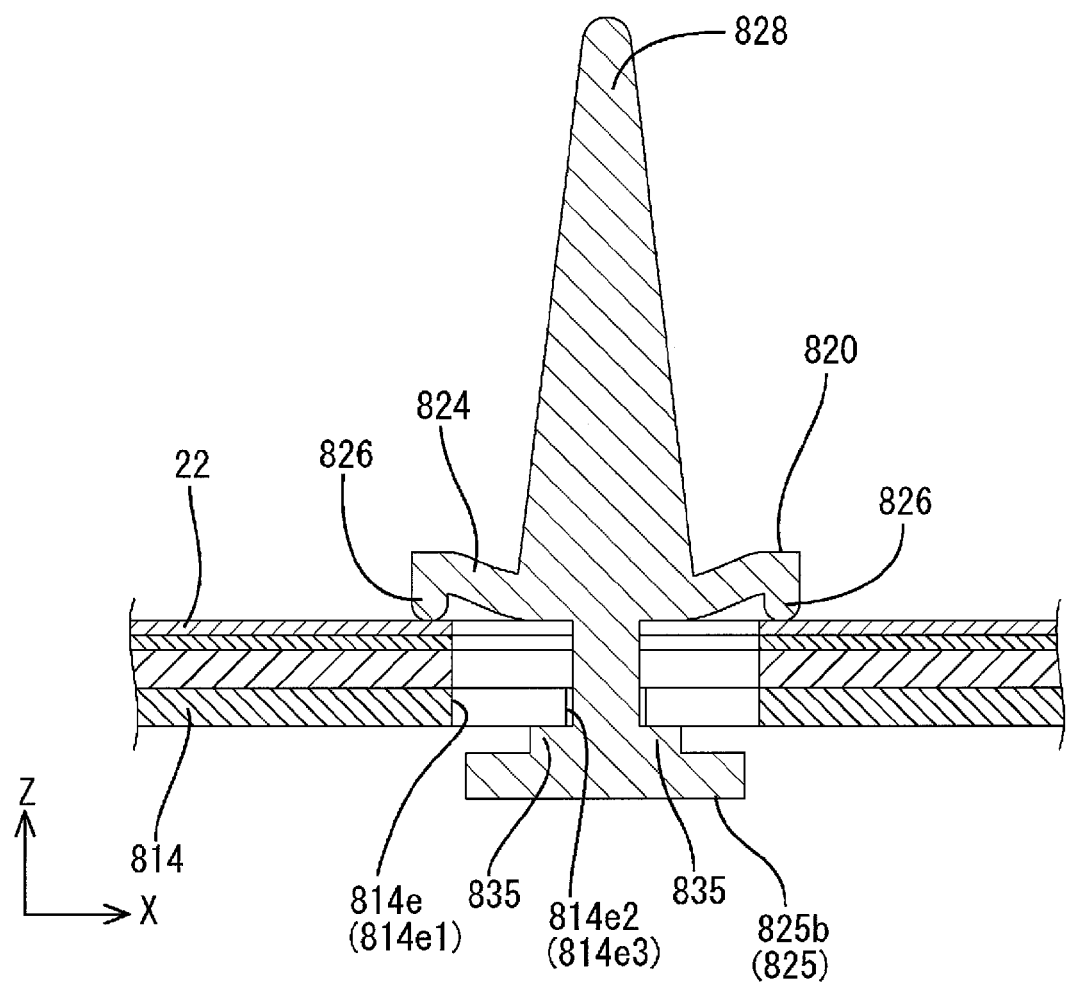
FIG. 78 is a sectional view taken along line lxxvii-lxxvii in FIG. 76 showing the state where the supporting portion is pressed downward to elastically deform the body portion.

To attach a board holding member 820 to a chassis 814, as shown in FIGS. 76 and 77, the attachment portion 825 is inserted into the attachment hole 814e to achieve the non-holding position. As shown in FIG. 77, in the state where each contact portion 826 is in contact with the chassis reflection sheet 22, when the supporting portion 28 is pressed downward (toward the chassis 814), a body portion 824 is elastically deformed in the shape of a bow using each contact portion 826 as a fulcrum. Then, the center part of the body portion 824, that is, the part where the attachment portion 825 is installed is displaced downward, and the attachment portion 825 and the holding member-side rotation restricting portion 835 are also displaced in the same direction. As shown in FIG. 78, the holding member-side rotation restricting portion 835 is protruded toward the back side of the chassis 814 and escapes from the attachment hole 814e. After that, the board holding member 820 is rotated. At this time, by performing the rotating operation while applying a pressing force to a supporting portion 828 (while elastically deforming the body portion 824), it can be prevented that the holding member-side rotation restricting portion 835 interferes with the inner circumferential surface of the attachment hole 814e (engaging surface 814e3), thereby blocking the rotating operation. The board holding member 820 may be rotated in both the forward and backward directions.

Figure 79:
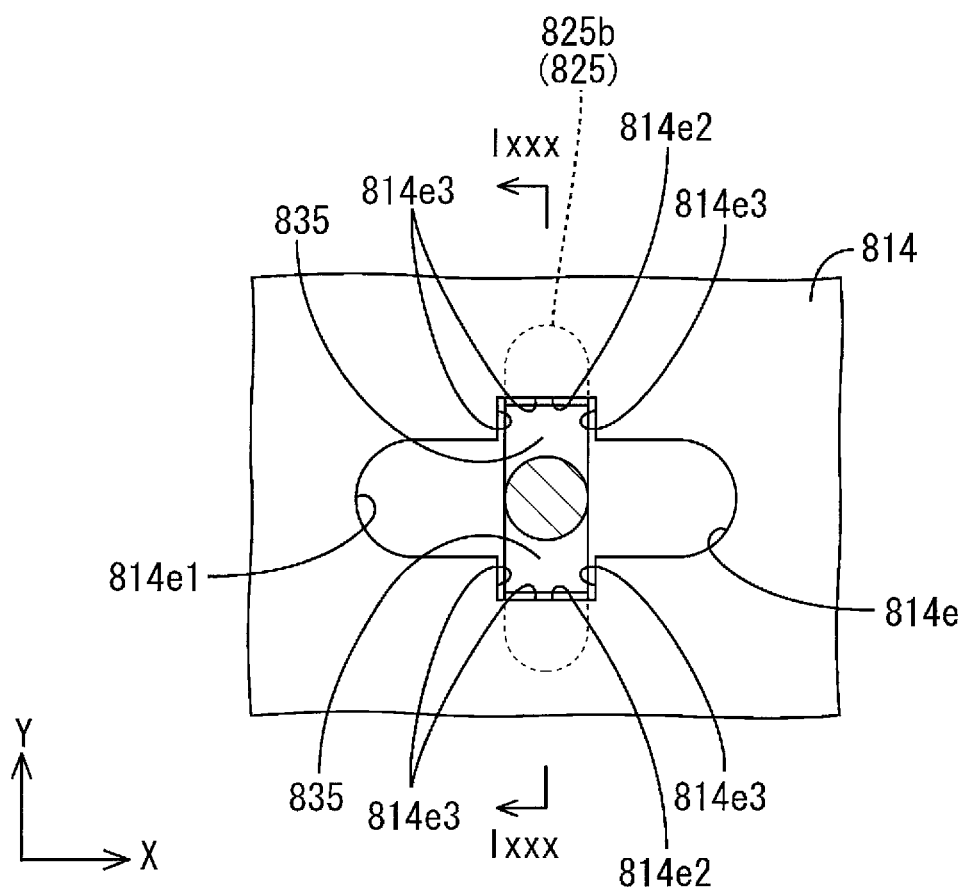
FIG. 79 is a plan sectional view showing the state where the board holding member is located at the holding position with respect to the chassis.
Figure 80:
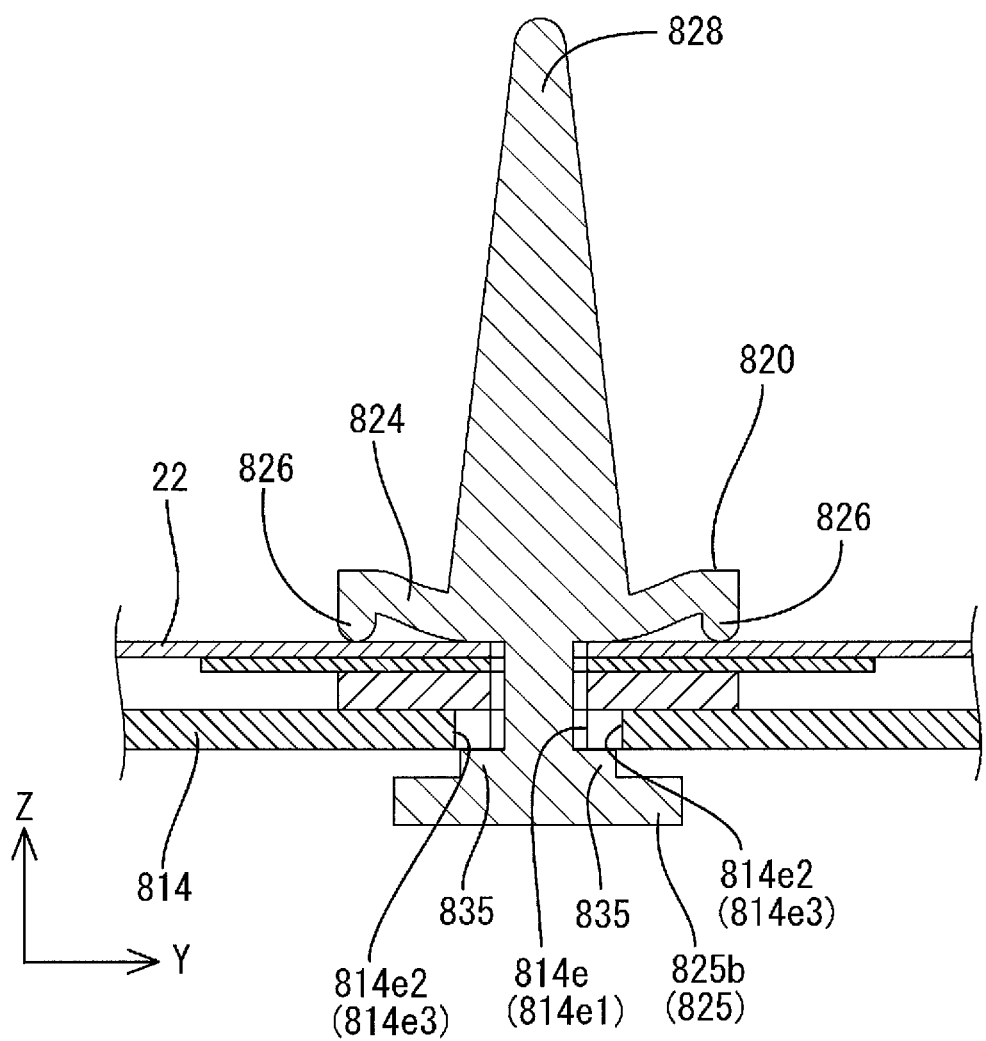
FIG. 80 is a sectional view taken along line lxxx-lxxx in FIG. 79 showing the state where the board holding member is located at the holding position with respect to the chassis while pressing the supporting portion downward.
Figure 81:
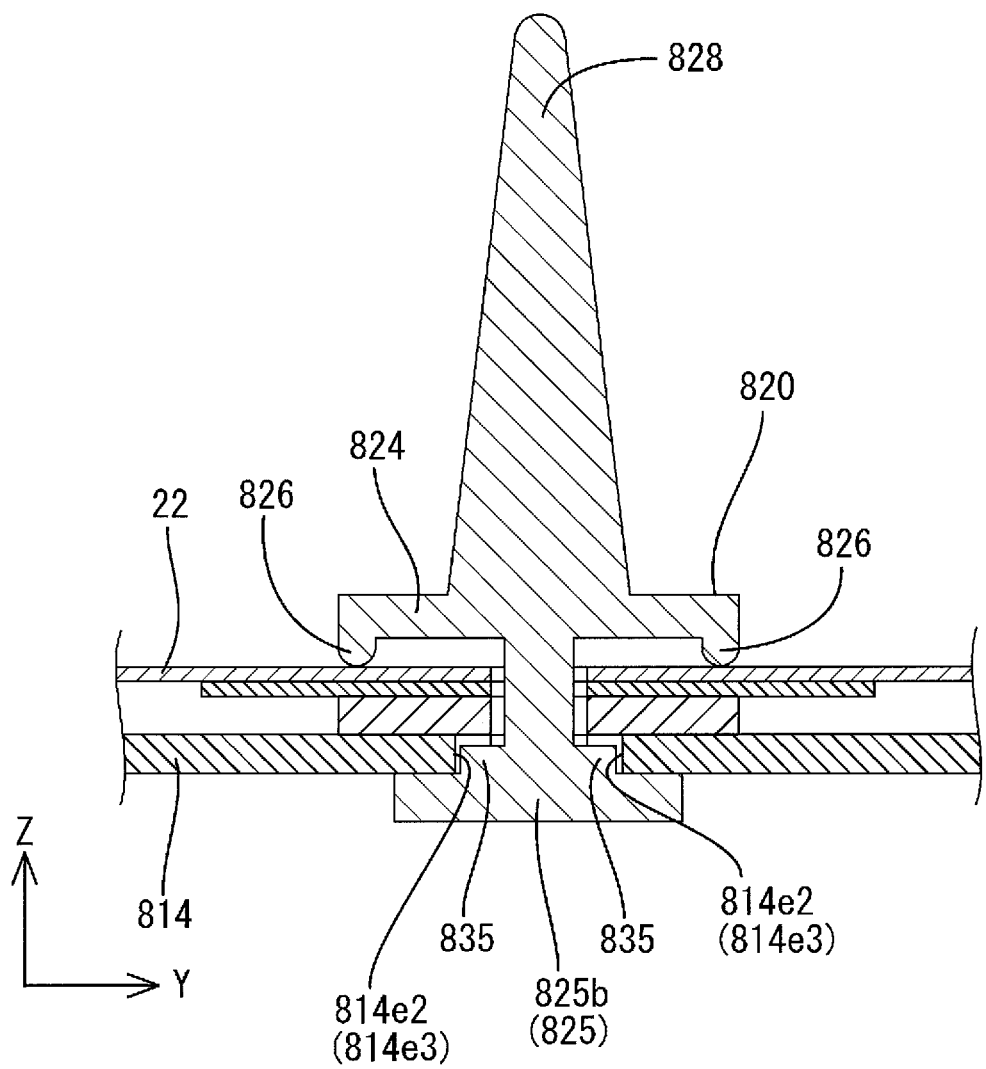
FIG. 81 is a sectional view taken along line lxxx-lxxx in FIG. 79 showing the state where pressing of the supporting portion is stopped, the body portion elastically returns and the holding member-side rotation restricting portion is engaged in the extending portion.

When the rotational angle of the board holding member 820 from the non-holding position reaches 90 degrees, as shown in FIGS. 79 and 80, each holding member-side rotation restricting portion 835 overlaps (aligns) with each extending portion 814e2 of the attachment hole 814e in a plan view. In this state, when pressing the supporting portion 828 downward is stopped (the pressing force is released), the body portion 824 elastically returns, and each holding member-side rotation restricting portion 835 is fitted in each extending portion 814e2. Then, as shown in FIGS. 79 and 81, since the outer side surfaces of the holding member-side rotation restricting portions 835 are engaged with the engaging surface 814e3 of the extending portions 814e2, it is prevented that the board holding member 820 is rotationally displaced from the holding position in both the forward and backward directions. Thereby, the board holding member 820 can be stably held at the holding position obtained by rotation from the non-holding position by 90 degrees. When the rotational angle from the non-holding position is less than 90 degrees or more than 90 degrees, the holding member-side rotation restricting portions 835 do not match the extending portions 814e2, and the body portion 824 remains to be elastically deformed, which represents that the rotational angle is too little or too much. In this case, the rotating operation is performed until the body portion 824 elastically returns. Although the multifunctional board holding member 820 is shown in FIGS. 76 to 81, the monofunctional board holding member can have similar configuration.

The ninth embodiment of the present invention has been described and however, the present invention is not limited to the embodiment and may include following modification examples. In each of the following modification examples, the same members as those in the above-mentioned embodiment are given the same reference numerals and illustration and description thereof may be omitted.

<First Modification Example of Ninth Embodiment>

A first modification example of the ninth embodiment will be described with reference to FIGS. 82 to 87. Here, an attachment hole 814e-1 of modified shape is shown.

Figure 82:
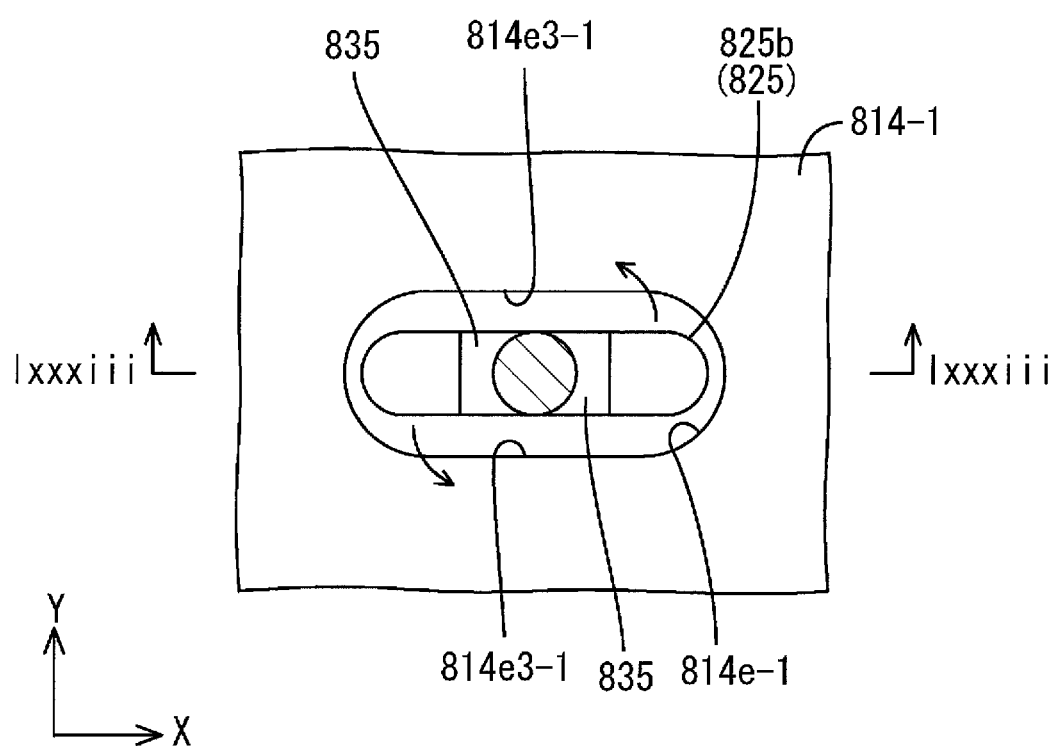
FIG. 82 is a plan sectional view showing the state where the board holding member is located at the non-holding position with respect to a chassis according to a first modification example in the ninth embodiment.

As shown in FIG. 82, an attachment hole 814e-1 is substantially rectangular in a plan view, its long-side dimension is the almost same as the long-side dimension of the attachment portion 825 and its short-side dimension is larger than the short-side dimension of the attachment portion 825. Describing in detail, the short-side dimension of the attachment hole 814e-1 substantially aligns with the length of the attachment portion 825 in both the holding member-side rotation restricting portions 835 in the long-side direction (the X-axis direction in FIG. 82 and the Y-axis direction in FIG. 85). A surface along the long-side direction (X-axis direction) in the inner circumferential surface of the attachment hole 814e-1 constitutes an engaging surface 814e3-1 that can be engaged with the outer side surface of the attachment portion 825 of each holding member-side rotation restricting portion 835 in the short-side direction.

Figure 83:
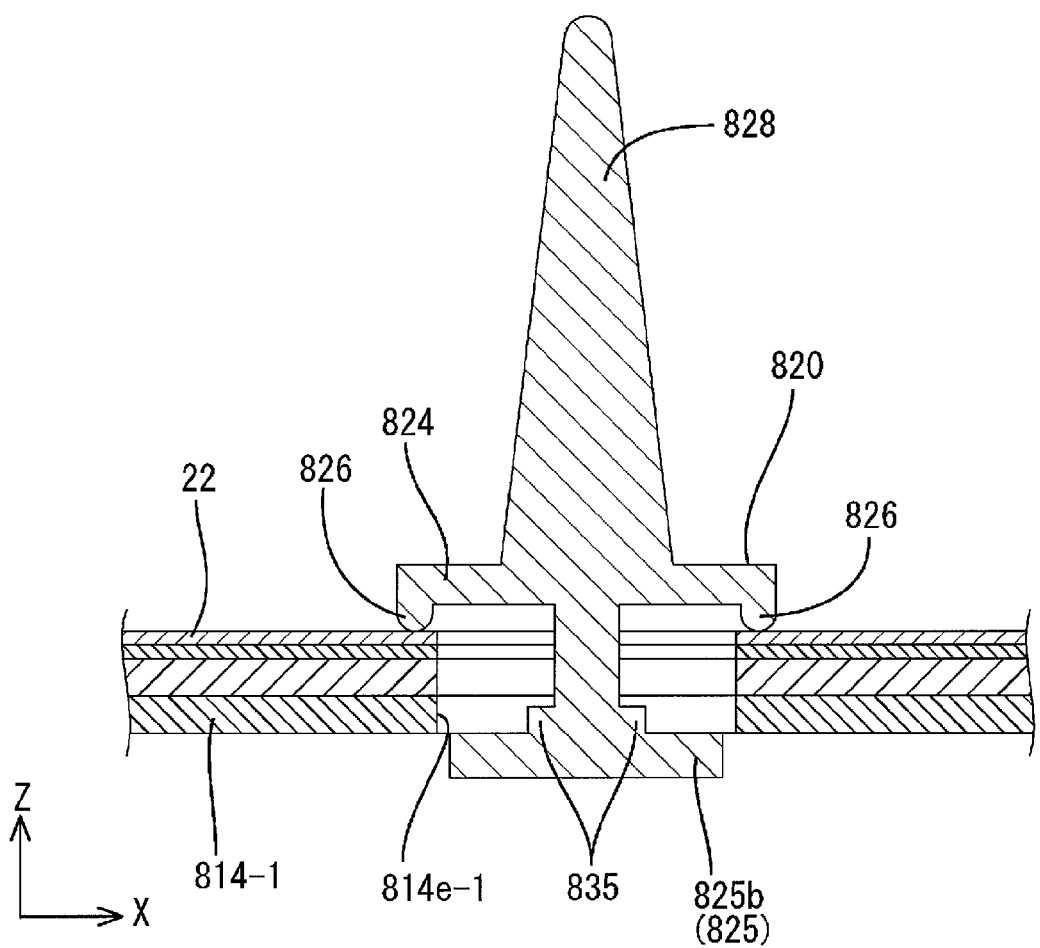
FIG. 83 is a sectional view taken along line lxxxiii-lxxxiii in FIG. 82 showing the state where the board holding member is located at the non-holding position with respect to the chassis and before the supporting portion is pressed downward.
Figure 84:
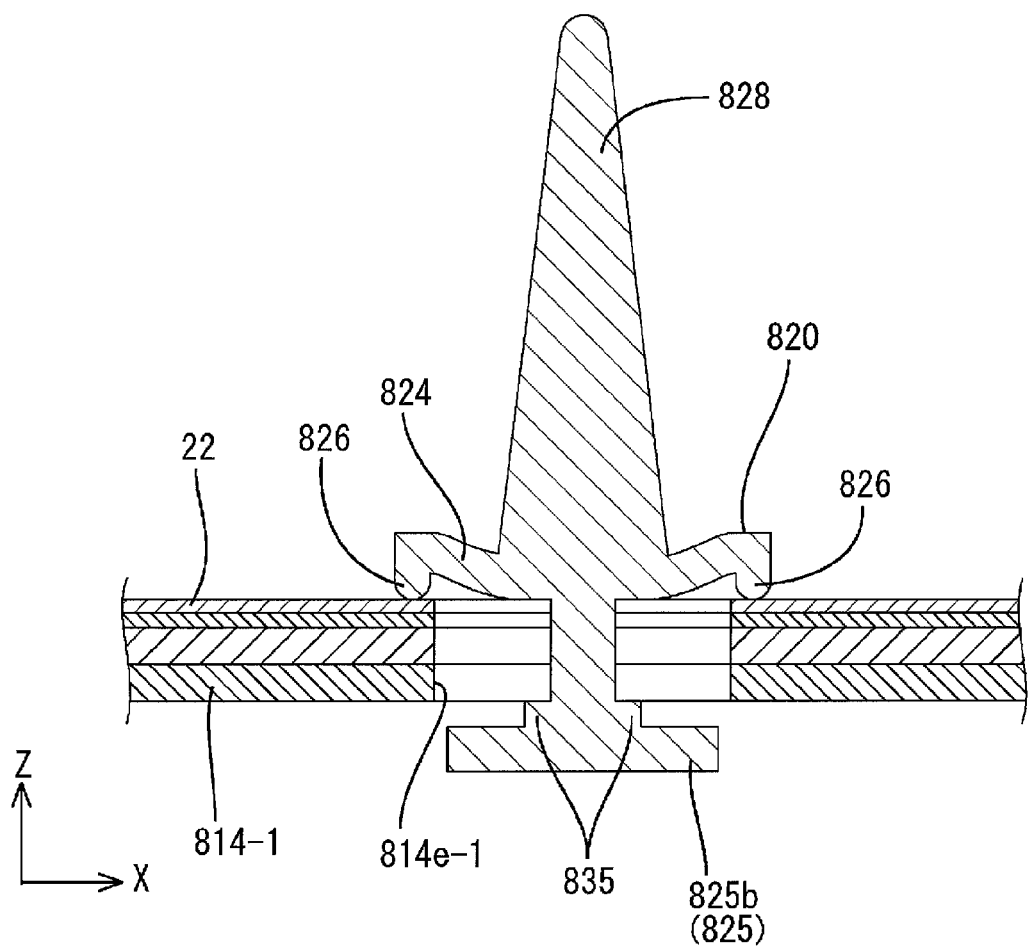
FIG. 84 is a sectional view taken along line lxxxiii-lxxxiii in FIG. 82 showing the state where the supporting portion is pressed downward to elastically deform the body portion.
Figure 85:
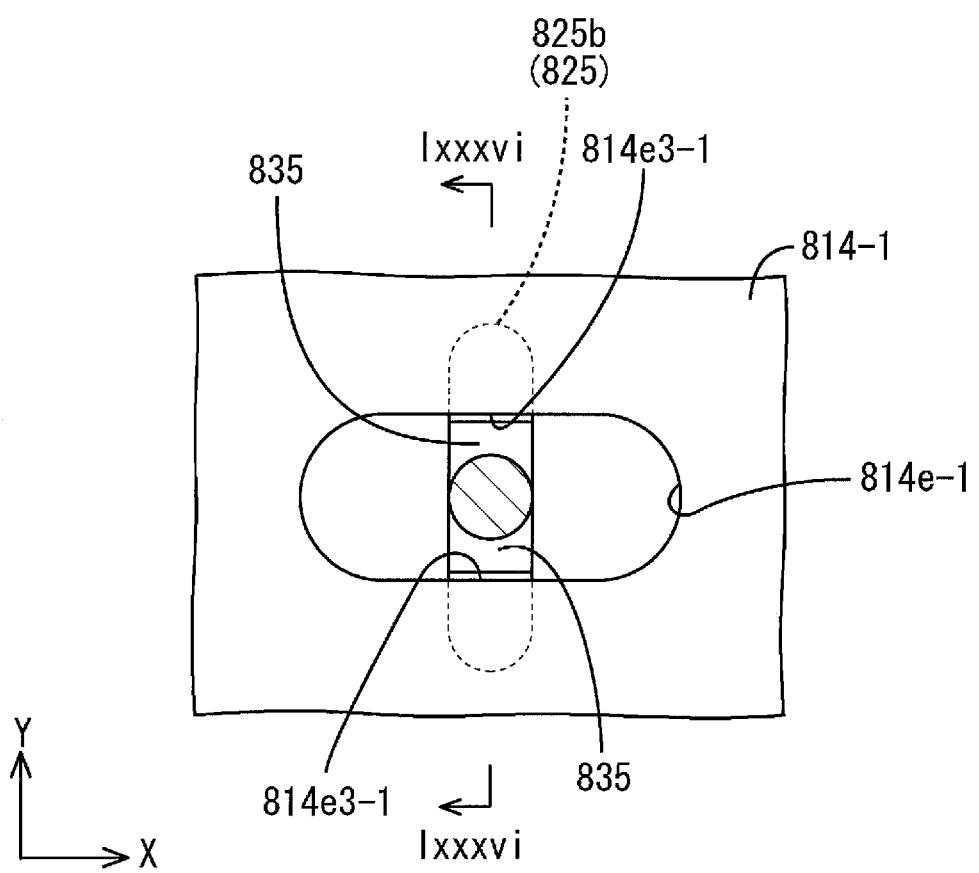
FIG. 85 is a plan sectional view showing the state where the board holding member is located at the holding position with respect to the chassis.
Figure 86:
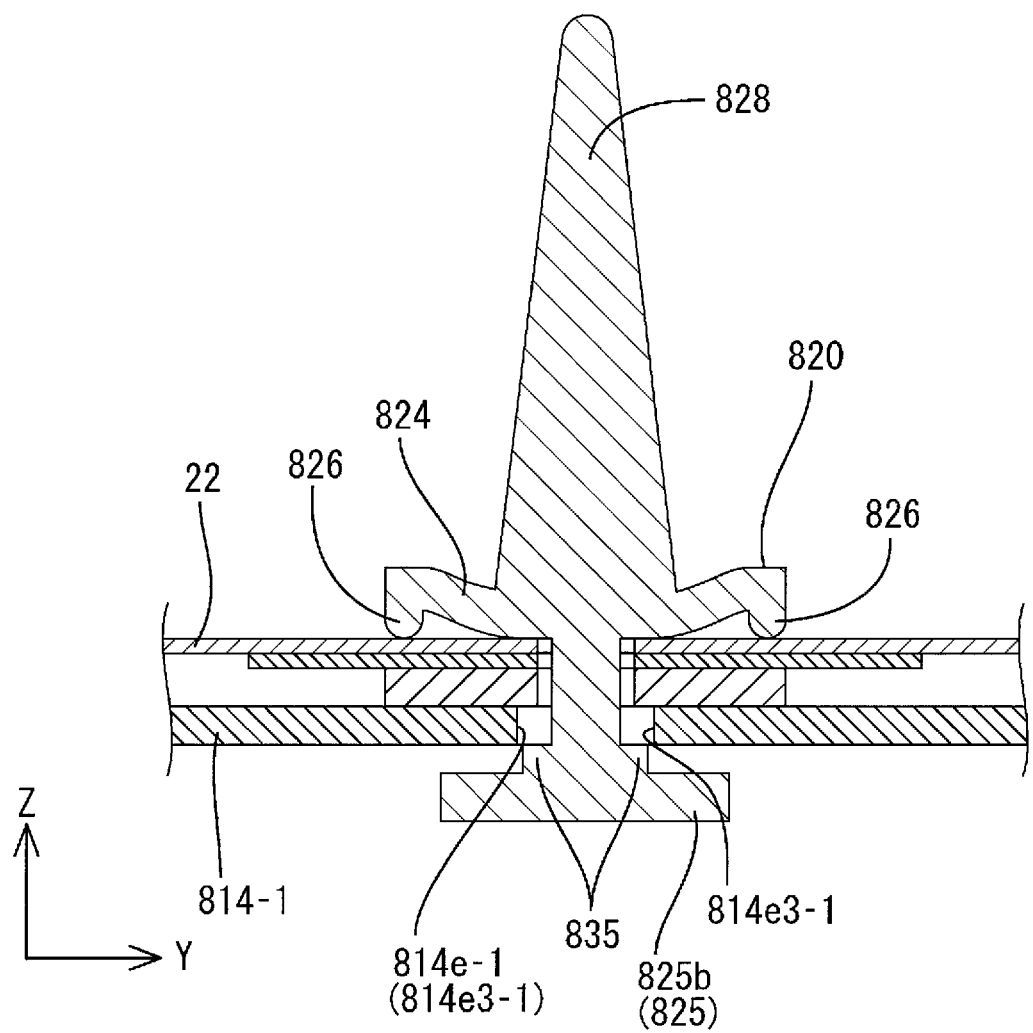
FIG. 86 is a sectional view taken along line lxxxvi-lxxxvi in FIG. 85 showing the state where the board holding member is located at the holding position with respect to the chassis while pressing the supporting portion downward.
Figure 87:
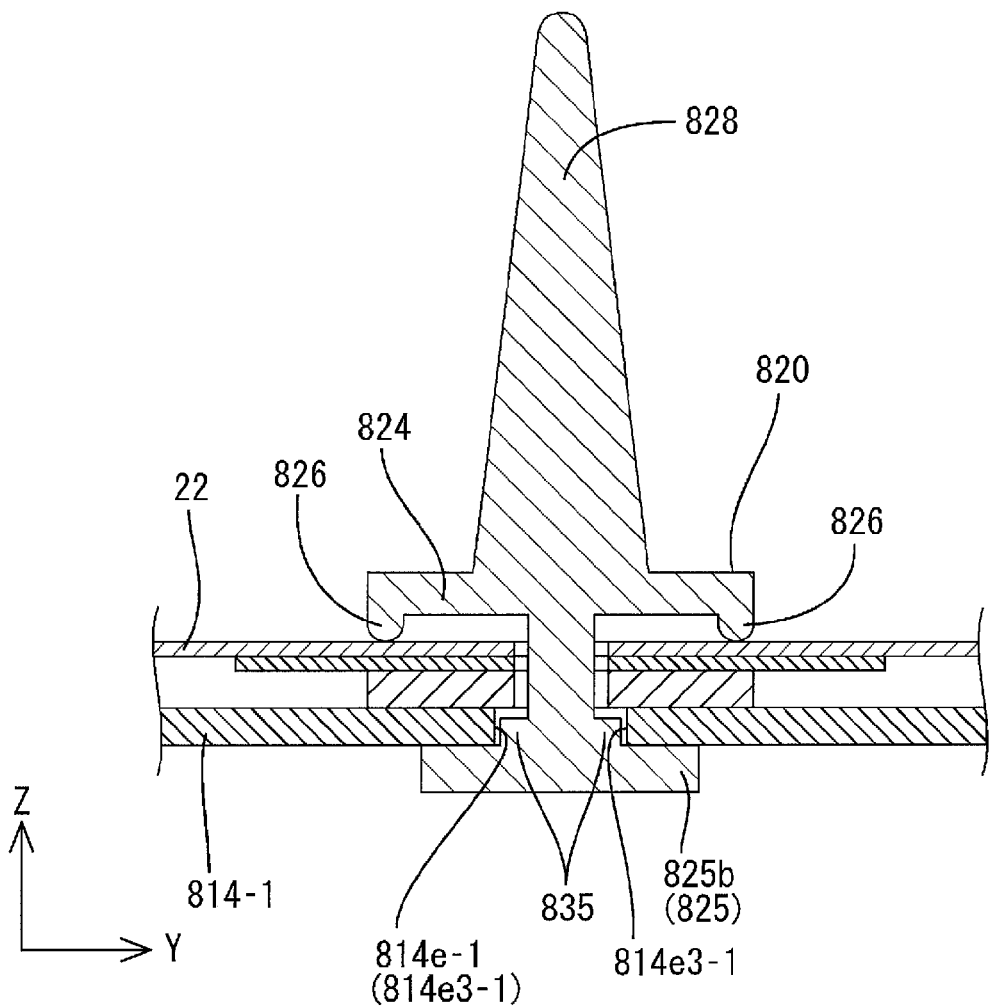
FIG. 87 is a sectional view taken along line lxxxvi-lxxxvi in FIG. 85 showing the state where pressing of the supporting portion is stopped, the body portion elastically returns and the holding member-side rotation restricting portion is engaged in the attachment hole.

As shown in FIGS. 82 and 83, the attachment portion 825 is inserted into the attachment hole 814e-1 to achieve the non-holding position. Then, in the state where each contact portion 826 is in contact with the chassis reflection sheet 22, when the supporting portion 28 is further pressed downward (toward the chassis 814-1), the body portion 824 is elastically deformed in the shape of a bow using each contact portion 826 as a fulcrum. As shown in FIG. 84, the holding member-side rotation restricting portion 835 is protruded toward the back side of the chassis 814-1 and escapes from the attachment hole 814e-1 and then, the board holding member 820 is rotated. When the rotational angle of the board holding member 820 from the non-holding position reaches 90 degrees, as shown in FIGS. 85 and 86, the outer side surface of each holding member-side rotation restricting portion 835 along the short-side direction of the attachment portion 825 is parallel to the X-axis direction, that is, the long-side direction of the attachment hole 814e-1. In this state, when pressing the supporting portion 828 downward is stopped (the pressing force is released), the body portion 824 elastically returns, and each holding member-side rotation restricting portion 835 enters into the attachment hole 814e-1. Then, as shown in FIGS. 85 and 87, since the outer side surface of each holding member-side rotation restricting portion 835 along the short-side direction of the attachment portion 825 is engaged with the engaging surface 814e3-1 of the attachment hole 814e-1, it is prevented that the board holding member 820 is rotationally displaced from the holding position in both the forward and backward directions. Thereby, the board holding member 820 can be stably held at the holding position rotated from the non-holding position by 90 degrees. Although the multifunctional board holding member 820 is shown in FIGS. 82 to 87, the monofunctional board holding member can have similar configuration.

<Other Embodiments>

The present invention is not limited to the embodiments described in the above description and figures, and for example, following embodiments fall within the technical scope of the present invention.

(1) In embodiments other than each of the above-mentioned embodiments, the planar shape of the attachment portion and the attachment hole maybe appropriately changed. Describing in detail, the planar shape of the attachment portion and the attachment hole only needs to be noncircular, and is preferably longitudinal shape such as rectangle, rhomboid and ellipse. Alternatively, the planar shape of the attachment portion and the attachment hole may be regular polygon (including square, regular triangle, regular hexagon and the like). The planar shape of the attachment portion and the attachment hole may be shaped like a substantially perfect circle and then, changed to be a non-perfect circle by forming a protrusion on the outer edge or a recess in the outer edge. The shape of the through hole and the communicating hole may be changed so as to correspond to the shape of the attachment hole.

(2) In embodiments other than each of the above-mentioned embodiments, the planar shape of the body portion may be appropriately changed. Describing in detail, the planar shape of the body portion may be, for example, rectangle, rhomboid, ellipse, regular polygon (including square, regular triangle, regular hexagon and the like). When the planar shape of the body portion is a polygon, the body portion can easily be rotated and therefore, the gripping portion or the supporting portion may be omitted.

(3) In embodiments other than each of the above-mentioned embodiments, the planar shape of the gripping portion and the supporting portion may be appropriately changed. The planar shape of the gripping portion may be, for example, rhomboid, ellipse, regular polygon (including square, regular triangle, regular hexagon and the like). The planar shape of the supporting portion may be, for example, rhomboid, ellipse, regular polygon (including square, regular triangle, regular hexagon and the like).

(4) Although the diameter of the shaft portion of the attachment portion is the almost same as the short-side dimension of the holding portion in each of the above-mentioned embodiments, it is possible to set the diameter of the shaft portion to be smaller than the short-side dimension of the holding portion or to be larger than the short-side dimension of the holding portion. When the diameter of the shaft portion is set to be larger than the short-side dimension of the holding portion, since the shaft portion is partially projected from the outer edge of the holding portion, the planar shape of the attachment hole needs to reflect the projected part of the shaft portion. With this configuration, the projected part of the shaft portion contacts with the edge of the attachment hole, thereby positioning the board holding member with respect to the chassis.

(5) Although the long-side direction of the through hole formed in the LED board aligns with the extending direction of the wiring pattern in each of the above-mentioned embodiments, for example, configuration in which the short-side direction of the through hole aligns with the extending direction of the wiring pattern also falls within the scope of the present invention.

(6) Although the holding portion of the attachment portion is symmetrical about the shaft portion in each of the above-mentioned embodiments, the asymmetrically shaped holding portion also falls within the scope of the present invention.

(7) Although the board holding member is rotated from the non-holding position to the holding position by about 90 degrees in each of the above-mentioned embodiments, the rotational angle between these positions maybe any angle other than 90 degrees except for an integral multiple of 180 degrees.

(8) Although the shaft portion (rotating center) of the attachment portion is concentric with the body portion in each of the above-mentioned embodiments, the shaft portion (rotating center) located so as not to be concentric with the body portion also falls within the scope of the present invention.

(9) Although the gripping portion and the supporting portion are concentric with the shaft portion (rotating center) of the attachment portion in each of the above-mentioned embodiments, the gripping portion or the supporting portion that is located so as not to concentric with the shaft portion (rotating center) also falls within the scope of the present invention.

(10) Although the long-side direction of the gripping portion aligns with the long-side direction of the attachment portion in each of the above-mentioned embodiments, configuration in which the long-side direction of the gripping portion crosses (including, orthogonal to) the long-side direction of the attachment portion also falls within the scope of the present invention.

(11) Although in the first embodiment, the line connecting the diagonally located contact portions to each other aligns with the long-side direction or the short-side direction of the attachment portion, the line that crosses the long-side direction or the short-side direction of the attachment portion also falls within the scope of the present invention.

(12) Although the long-side direction of the body portion is orthogonal to the long-side direction of the attachment portion in the second embodiment, arrangement in which the long-side direction of the body portion aligns with the long-side direction of the attachment portion also falls within the scope of the present invention.

(13) Although the line connecting a pair of the indicating portions to each other aligns with the long-side direction of the attachment portion in the third embodiment, the line may cross (be orthogonal to) the long-side direction of the attachment portion.

(14) Although the indicating portions are formed by partially cutting the body portion in the third embodiment, the indicating portions may be formed by partially protruding the body portion. Alternatively, the indicating portions as colored portions or marks in the body portion also fall within the scope of the present invention.

(15) Although the indicating portions are arranged in the outer edge of the body portion in the third embodiment, the position of the indicating portions may be appropriately changed to any position other than the outer edge except for the center of the body portion. The number of indicating portions may be changed from two.

(16) Although both the body portion and the holding portion of the attachment portion are elastically deformed in the fourth embodiment, only the body portion may be elastically deformed or only the holding portion may be elastically deformed by appropriately changing rigidity (strength) of the body portion and the holding portion.

(17) Although almost the entirety of the guiding protrusions constitutes the inner part in the fourth embodiment, configuration in which only a part of the guiding protrusions constitutes the inner part and the remainder constitutes the outer part also falls within the scope of the present invention.

(18) Although the guide surface of each guiding protrusion is a spherical surface in the fourth embodiment, the guide surface may be a tapered surface or a curved surface other than the spherical surface. The number of and arrangement of the guiding protrusions of the holding portion body may be appropriately changed.

(19) Although the guide surface is the tapered surface in the fifth embodiment, the guide surface maybe a spherical surface or a curved surface other than the spherical surface.

(20) Although the board holding member has only one attachment portion in each of the above-mentioned embodiments, the board holding member having the plurality of attachment portions also falls within the scope of the present invention. In this case, when the number of attachment portions is an even number, the shaft portion of the attachment portion does not coincide with the rotational axis of the board holding member.

(21) Although the body portion of the board holding member is arranged at the midpoint between the adjacent LEDs in the X-axis direction in each of the above-mentioned embodiments, the body portion arranged closer to either of the adjacent LEDs also falls within the scope of the present invention. Similarly, in addition to the body portion arranged at the center of the LED board in the short-side direction, the body portion displaced from the center of the LED board in the short-side direction also falls within the scope of the present invention.

(22) Although the through hole is formed in the LED board in each of the above-mentioned embodiments, by arranging the attachment portion at the non-holding position so as not to overlap with the LED board in a plan view, the through hole may be omitted from the LED board.

(23) Although the two types of large and small attachment holes in the chassis and large and small communicating holes in each reflection sheet are provided in each of the above-mentioned embodiments, dimension of the attachment hole and the communicating hole may have one type or three or more types.

(24) Although the monofunctional board holding member and the multifunctional board holding member are simultaneously used in each of the above-mentioned embodiments, the configuration using only the monofunctional board holding member or only the multifunctional board holding member also falls within the scope of the present invention. The ratio of the monofunctional board holding member to the multifunctional board holding member, which is simultaneously used, may be appropriately changed.

(25) To distinguish the two types of board holding members from each other, in each of the above-mentioned embodiments, the board holding members are classified into "monofunctional" and "multifunctional". However, the term "monofunctional" does not mean that the board holding member has no function other than the function of holding the LED board. The terms "monofunctional" and "multifunctional" are named based on presence/absence of the supporting function for the optical member for convenience of explanation, and do not preclude the possibility that the "monofunctional" board holding member has a function accompanying the holding function (for example, positioning function with respect to the LED board) and other additive functions.

(26) In embodiments other than each of the above-mentioned embodiments, the specific shape, arrangement and number of contact portions installed may be appropriately changed. Specifically, the contact portion shaped like a cylinder, a rectangular column, a cone, a pyramid or the like, and the contact portion having an angular (triangular) or elliptic cross section also fall within the scope of the present invention. The contact portion may be arranged in the body portion at a position other than the outer edge. The three or less or five or more contact portion may be installed in the body portion.

(27) Although the part of the body portion between the shaft portion of the attachment portion and the contact portion has elasticity in each of the above-mentioned embodiments, the body portion does not necessarily have elasticity, and the body portion that is hardly elastically deformed or is not elastically deformed at all also falls within the scope of the present invention. Even in this case, since the positions where the pressing force is exerted to each reflection sheet from the front side and the back side are shifted from each other in a plan view, stress concentration on each reflection sheet can be preferably mitigated and therefore, the degree of freedom in expansion and contraction is improved.

(28) Contrary to the (27), in assigning elasticity to the part of the body portion between the shaft portion of the attachment portion and the contact portion, for example, by designing the body portion so as to be easily flexed and thus, increasing the protruding dimension of the contact portion from the body portion, even when no dimensional error occurs, the body portion can be elastically deformed.

(29) Although the diffuser lens that diffuses light from the LED is used in each of the above-mentioned embodiments, an optical lens other than the diffuser lens (for example, a collective lens) falls within the scope of the present invention. Configuration without the diffuser lens also falls within the scope of the present invention. In this case, with omission of the diffuser lens, the board reflection sheet may also be omitted.

(30) Although the metal chassis is used in each of the above-mentioned embodiments, the chassis may be made of synthetic reason.

(31) Although the color of the surface of the board supporting member is white in each of the above-mentioned embodiments, the color of the surface of the board supporting member may be creamy white or silver. Color of the surface may be set by applying paint of a desired color on the surface of the board supporting member.

(32) Although the five-mounted type, the six-mounted type and the eight-mounted type of LED boards are combined as appropriate in each of the above-mentioned embodiments, an LED board that mounts the number of LEDs other than five, six and eight LEDs falls within the scope of the present invention.

(33) Although the LED that includes the LED chip that emits only blue light and emits white light by means of the phosphor is used in each of the above-mentioned embodiments, an LED that includes the LED chip that emits only ultraviolet light and emits white light by means of the phosphor falls within the scope of the present invention.

(34) Although the LED that includes the LED chip that emits only blue light and emits white light by means of the phosphor is used in each of the above-mentioned embodiments, an LED that has three types of LED chips that emit R, G, B, respectively, falls within the scope of the present invention. Moreover, an LED that has three types of LED chips that emit C (cyan), M (magenta), and Y (yellow), respectively, also falls within the scope of the present invention.

(35) Although the LED that emits white light is used in each of the above-mentioned embodiments, an LED that emits red light, an LED that emits blue light and an LED that emits green light may be combined as appropriate.

(36) Although the LED is used as the light source in each of the above-mentioned embodiments, a point light source other than the LED also falls within the scope of the present invention.

(37) Also in embodiments other than each of the above-mentioned embodiments, screen size and aspect ratio of the liquid crystal display device may be changed as appropriate.

(38) Although the liquid crystal panel and the chassis are arranged in the longitudinally mounted state so that the short-side direction matches the vertical direction in each of the above-mentioned embodiments, the configuration in which the liquid crystal panel and the chassis are arranged in the longitudinally mounted state so that the long-side direction matches the vertical direction also falls within the scope of the present invention.

(39) Although the TFT is used as the switching component of the liquid crystal display device in each of the above-mentioned embodiments, the present invention can also be applied to a liquid crystal display device using a switching component (for example, a thin film diode (TFD)) other than TFT and the monochrome liquid crystal display device other than the color liquid crystal display device.

(40) Although the liquid crystal display device using the liquid crystal panel as the display panel is illustrated in each of the above-mentioned embodiments, the present invention can be applied to a display device using the other type of display panel.

(41) Although the television receiver having a tuner is illustrated in each of the above-mentioned embodiments, the present invention can be applied to a display device having no tuner.

(42) Although a pair of the chassis-side rotation restricting portions is provided in the sixth embodiment and its modification example, only one chassis-side rotation restricting portion or three or more chassis-side rotation restricting portions also fall within the scope of the present invention.

(43) Although the chassis-side rotation restricting portion is in flush with the inner circumferential surface of the attachment hole and the rotating direction of the board holding member from the non-holding position is restricted to one direction in the sixth embodiment and its modification example, the chassis-side rotation restricting portion located so as not be in flush with the inner circumferential surface of the attachment hole (the chassis-side rotation restricting portion located away from the attachment hole) also falls within the scope of the present invention.

(44) Although the holding member-side rotation restricting portion communicates with the holding portion of the attachment portion in the seventh embodiment and its modification example, the holding member-side rotation restricting portion that communicates with only the shaft portion of the attachment portion also falls within the scope of the present invention.

(45) Although the holding member-side rotation restricting portion is provided in the attachment portion in the seventh embodiment and its modification example, the holding member-side rotation restricting portion may be provided in the body portion. In this case, the holding member-side rotation restricting portion protruded from the body portion toward the back side may enter into the attachment hole at the non-holding position and the holding position.

(46) Although a pair of the holding member-side engaging portions and a pair of the chassis-side engaging portions are provided in the eighth embodiment and its modification example, configuration in which one holding member-side engaging portion and one chassis-side engaging portion are provided, or three or more holding member-side engaging portions and three or more chassis-side engaging portions are provided also falls within the scope of the present invention. The number of holding member-side engaging portions does not need to be equal to the number of chassis-side engaging portions installed, and the number of holding member-side engaging portions and chassis-side engaging portions on the protrusion side may be smaller than that of holding member-side engaging portions and chassis-side engaging portions on the hole (recess) side.

(47) Although the chassis-side engaging portion passes through the chassis in the eighth embodiment and the holding member-side engaging portion passes through the holding portion in its modification example, the concave chassis-side engaging portion formed by being partially dented without passing through the chassis, or the concave holding member-side engaging portion formed by being partially dented without passing through the holding portion also falls within the scope of the present invention. In forming such concave holding member-side engaging portion, the holding member-side engaging portion may be formed in the shape of a line extending in the short-side direction of the holding portion.

(48) Although the rotation restricting structure restricts the rotational angle of the board holding member from the non-holding position to about 90 degrees in the sixth to the ninth embodiments and their modification examples, for example, by setting arrangement and shape of the rotation restricting structure, the rotational angle from the non-holding position may be restricted to any angle other than 90 degrees, and the specific value of the rotational angle may be appropriately changed.

The invention claimed is:

1. A lighting device, comprising:
a light source;
a light source board on which the light source is mounted;
a chassis having an attachment hole and storing light source board; and
a board holding member including a body portion and an attachment portion, the body portion holding the light source board such that the light source board is sandwiched between the body portion and the chassis, the attachment portion protruding from the body portion toward the chassis and arranged inside the attachment hole, wherein the board holding member is configured to be rotatable between a holding position and a non-holding position along a plate surface of the chassis, the holding position at which the attachment portion overlaps an edge of the attachment hole in a plan view and the edge of the attachment hole is sandwiched between the attachment portion and the body portion, the non-holding position at which the attachment portion does not overlap the edge of the attachment hole in a plan view and attaching and detaching of the attachment portion from the attachment hole is allowed; wherein
both the attachment portion and the attachment hole have a longitudinal shape; and
each of the attachment portion and the attachment hole has a periphery including an arch-shaped surface that forms an arc in a plan view.

2. A lighting device, comprising:
a light source;
a light source board on which the light source is mounted;
a chassis having an attachment hole and storing light source board; and
a board holding member including a body portion and an attachment portion, the body portion holding the light source board such that the light source board is sandwiched between the body portion and the chassis, the attachment portion protruding from the body portion toward the chassis and arranged inside the attachment hole, wherein the board holding member is configured to be rotatable between a holding position and a non-holding position along a plate surface of the chassis, the holding position at which the attachment portion overlaps an edge of the attachment hole in a plan view and the edge of the attachment hole is sandwiched between the attachment portion and the body portion, the non-holding position at which the attachment portion does not overlap the edge of the attachment hole in a plan view and attaching and detaching of the attachment portion from the attachment hole is allowed; wherein
the body portion has an arc shape in a plan view.

3. The A lighting device, comprising:
a light source;
a light source board on which the light source is mounted;
a chassis having an attachment hole and storing light source board; and
a board holding member including a body portion and an attachment portion, the body portion holding the light source board such that the light source board is sandwiched between the body portion and the chassis, the attachment portion protruding from the body portion toward the chassis and arranged inside the attachment hole, wherein the board holding member is configured to be rotatable between a holding position and a non-holding position along a plate surface of the chassis, the holding position at which the attachment portion overlaps an edge of the attachment hole in a plan view and the edge of the attachment hole is sandwiched between the attachment portion and the body portion, the non-holding position at which the attachment portion does not overlap the edge of the attachment hole in a plan view and attaching and detaching of the attachment portion from the attachment hole is allowed; wherein
the body portion further includes an indicating portion at a position off a rotating center of the board holding member, the indicating portion being configured to move as the board holding member rotates.

4. The lighting device according to claim 3, wherein the indicating portion is formed by partially cutting the body portion.

5. The lighting device according to claim 3, wherein the indicating portion is arranged in the outer edge of the body portion.

6. The lighting device according to claim 3, wherein the indicating portion includes at least a pair of indicating portions arranged in areas of the body portion symmetrical about the rotating center of the board holding member.

* * * * *